United States Patent
Nevins

(10) Patent No.: US 8,739,019 B1
(45) Date of Patent: May 27, 2014

(54) COMPUTER-IMPLEMENTED METHODS AND COMPUTER PROGRAM PRODUCTS FOR INTEGRATING AND SYNCHRONIZING MULTIMEDIA CONTENT, INCLUDING CONTENT DISPLAYED VIA INTERACTIVE TELEVISIONS, SMARTPHONES, ELECTRONIC BOOK READERS, HOLOGRAPHIC IMAGERY PROJECTORS, AND OTHER COMPUTERIZED DEVICES

(76) Inventor: Joel Nevins, Vero Beach, FL (US)

( * ) Notice: Subject to any disclaimer, the term of this patent is extended or adjusted under 35 U.S.C. 154(b) by 7 days.

(21) Appl. No.: 13/135,399

(22) Filed: Jul. 1, 2011

(51) Int. Cl.
  *G06F 17/00* (2006.01)
  *G06F 3/048* (2013.01)

(52) U.S. Cl.
  USPC .......................................... 715/203; 715/785

(58) Field of Classification Search
  USPC .................. 715/205, 200, 203, 234, 785–786
  See application file for complete search history.

(56) References Cited

U.S. PATENT DOCUMENTS

| | | | |
|---|---|---|---|
| 5,363,481 A * | 11/1994 | Tilt | 715/814 |
| 5,524,193 A | 6/1996 | Covington | |
| 5,623,589 A | 4/1997 | Needham | |
| 5,850,211 A * | 12/1998 | Tognazzini | 345/158 |
| 6,067,069 A | 5/2000 | Krause | |
| 6,222,541 B1 * | 4/2001 | Bates et al. | 715/786 |
| 6,263,507 B1 | 7/2001 | Ahmad | |
| 6,269,238 B1 | 7/2001 | Iggulden | |
| 6,351,273 B1 * | 2/2002 | Lemelson et al. | 715/786 |
| 6,370,535 B1 | 4/2002 | Shapiro | |
| 7,114,170 B2 | 9/2006 | Harris | |
| 7,308,653 B2 * | 12/2007 | Lin-Hendel | 715/785 |
| 7,509,575 B2 | 3/2009 | Makela | |
| 7,610,358 B2 | 10/2009 | Benschoter | |
| 7,870,488 B2 * | 1/2011 | Kirkpatrick | 715/720 |
| 7,913,155 B2 * | 3/2011 | Basson et al. | 715/203 |
| 8,185,543 B1 * | 5/2012 | Choudhry et al. | 707/767 |
| 8,379,053 B1 * | 2/2013 | Phillips et al. | 345/619 |
| 2002/0049783 A1 | 4/2002 | Berk | |
| 2003/0059758 A1 | 3/2003 | Cohen | |
| 2004/0078814 A1 | 4/2004 | Allen | |
| 2004/0080541 A1 | 4/2004 | Saiga | |
| 2004/0175095 A1 | 9/2004 | Freeman | |
| 2006/0286528 A1 | 12/2006 | Harshman | |
| 2007/0006079 A1 | 1/2007 | Jewsbury | |
| 2007/0198655 A1 | 8/2007 | Stuckman | |
| 2008/0109750 A1 | 5/2008 | Lin-hendel | |
| 2008/0247128 A1 | 10/2008 | Khoo | |
| 2009/0172986 A1 | 7/2009 | Fuchsberg | |

(Continued)

OTHER PUBLICATIONS

Wise, "Pogue-O-matic," www.nytimes.com, Nov. 18, 2008, published on the Internet by The New York Times, New York, NY.

(Continued)

*Primary Examiner* — Manglesh M Patel

(57) ABSTRACT

Computer-implemented methods and computer program products wherein a user's reviewing of select text in a synchronized news story, article, or electronic book generates a changed presentation of associated multimedia content, including photographs, videos, and computerized graphics. User's reviewing of select text is detected automatically or managed manually, with select embodiments integrating touch-screen controls. This process of changing multimedia continues with the user's reviewing of additional select text segments. Select multimedia is modified instead of completely replaced as the user advances to an additional select text segment, leading to uniquely flowing presentations. Multimedia is visually modified through zooming, panning, resizing, highlighting, and/or other approaches. Select embodiments include similarly modified holographic imagery, advertisements, securities charts, and shifted text. In select embodiments, the user's reading speed adjusts visual modifications.

36 Claims, 36 Drawing Sheets

(56) References Cited

U.S. PATENT DOCUMENTS

| | | | |
|---|---|---|---|
| 2009/0191531 A1 | 7/2009 | Saccocci | |
| 2009/0259927 A1* | 10/2009 | Fisher | 715/205 |
| 2009/0307721 A1* | 12/2009 | Afram et al. | 725/34 |
| 2010/0146387 A1* | 6/2010 | Hoover | 715/702 |
| 2010/0333016 A1* | 12/2010 | Attwood | 715/784 |
| 2011/0087955 A1 | 4/2011 | Ho | |
| 2012/0310751 A1* | 12/2012 | Kim | 705/14.72 |

OTHER PUBLICATIONS

Fredin, "Rethinking the News Story for the Internet," Journalism and Mass Communications, Sep. 1997, pp. 1-47, #163, Association for Education in Journalism, SC.

Huesca and Dervin, "Hypertext and Journalism: Audiences Respond to Competing News Narratives," http://web.mit.edu, Oct. 31, 1999, Media in Transition Conference, MIT, MA.

Lowrey, "More Control, but not Clarity in Non-Linear Web Stories," Newspaper Research Journal, Spring 2004, U. of Memphis, TN.

Tremayne, "Manipulating Interactivity with Thematically Hyperlinked News Texts," New Media and Society, 2008, vol. 10(5), pp. 703-727. Sage Publications, Los Angeles, CA.

Canavilhas, "Hypertext Newswriting Effects on Satisfaction, Comprehension and Attitudes," 12th ISOJ, Apr. 2008, pp. 1-17, U. Texas, Austin, TX.

Brain, "How Electric Motors Work," http://www.howstuffworks.com/motor.htm, undated, published on the Internet by Discovery Communications based in Silver Spring, MD.

* cited by examiner

FIG. 2

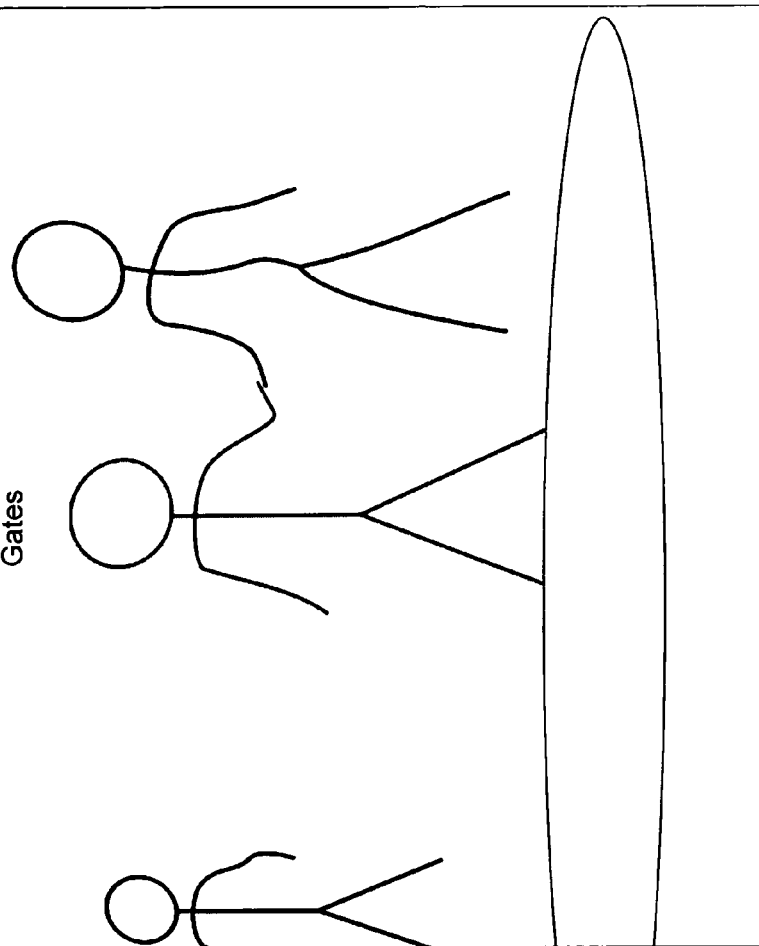

210 — Gates in Istanbul for Afghan Talks – 04 February 10

230

240 ⇨ NewsFli — U.S. Defense Secretary Robert Gates joins NATO counterparts in Turkey for their quarterly meeting.

250

- Afghanistan is the main topic.
- Senior Afghan officials will attend, along with General Stanley McChrystal, NATO commander for Afghani operations.
- President Obama had announced a new Afghan war strategy in December. Implementation of that strategy will be discussed.
- The strategy includes an increase of 30,000 American troops and 7,000 allied troops, along with boosting the size of the Afghan army and police.
- After Istanbul, Gates will travel to Ankara, Rome, and Paris for rare bilateral talks for "nurturing" relations.

270 — Print  Email  Diggit  Reddit  Facebook

Gates in Istanbul for Afghan Talks

- NewsFli — U.S. Defense Secretary Robert Gates joins NATO counterparts in Turkey for their quarterly meeting.
- Afghanistan is the main topic.
- Senior Afghan officials will attend, along with General Stanley McChrystal, NATO commander for Afghani operations.

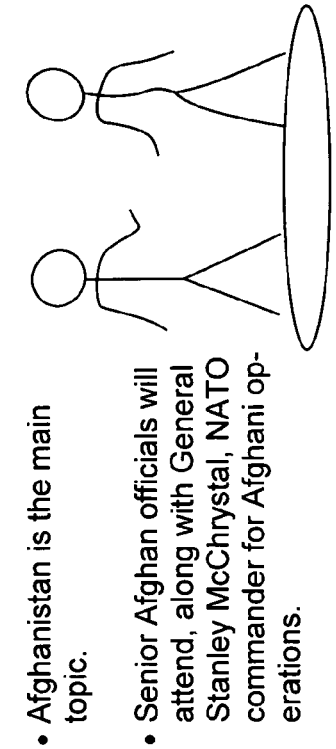

- President Obama had announced a new Afghan war strategy in December. Implementation of that strategy will be discussed.
- The strategy includes an increase of 30,000 American troops and 7,000 allied troops, along with boosting the size of the Afghan army and police....

FIG. 25B

Gates in Istanbul for Afghan Talks

- NewsFli — U.S. Defense Secretary Robert Gates joins NATO counterparts in Turkey for their quarterly meeting.
- Afghanistan is the main topic.
- Senior Afghan officials will attend, along with General Stanley McChrystal, NATO commander for Afghani operations.

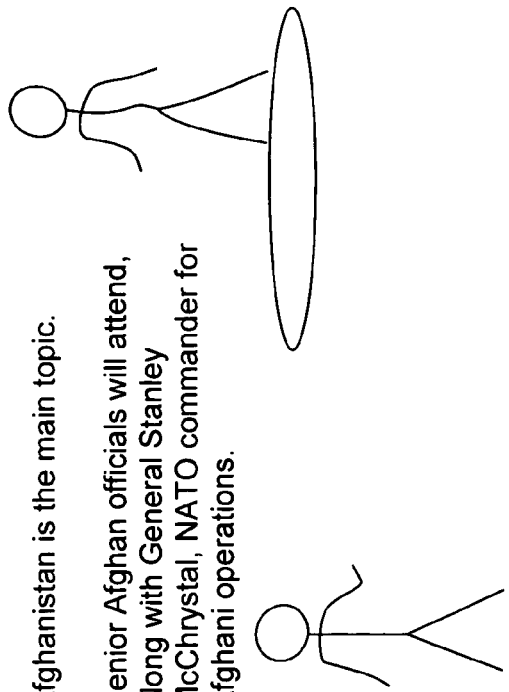

- President Obama had announced a new Afghan war strategy in December. Implementation of that strategy will be discussed.
- The strategy includes an increase of 30,000 American troops and 7,000 allied troops, along with boosting the size of the Afghan army and police.
- After Istanbul, Gates will travel to Ankara, Rome, and Paris for rare bilateral talks for "nurturing" relations.

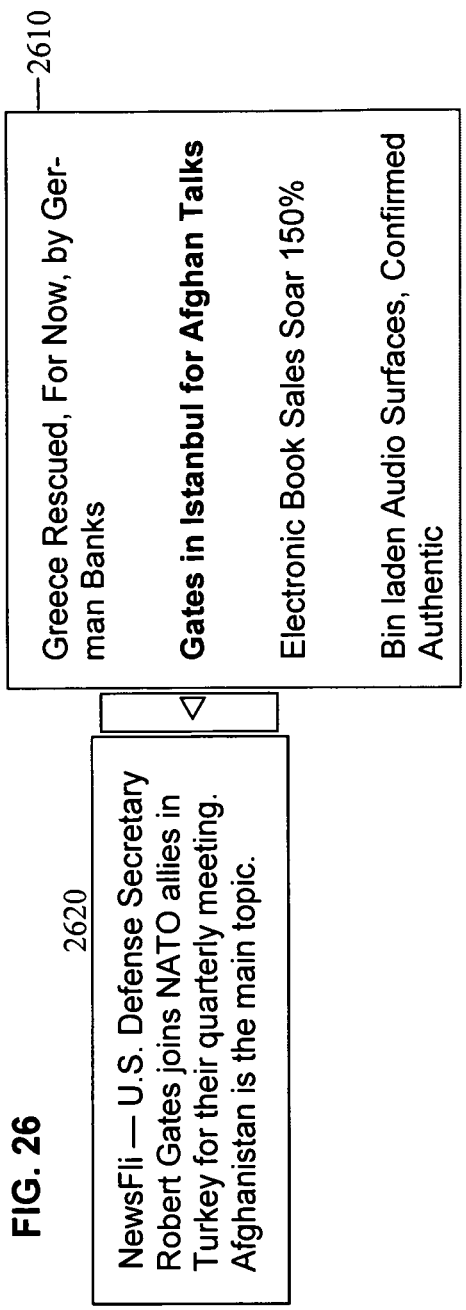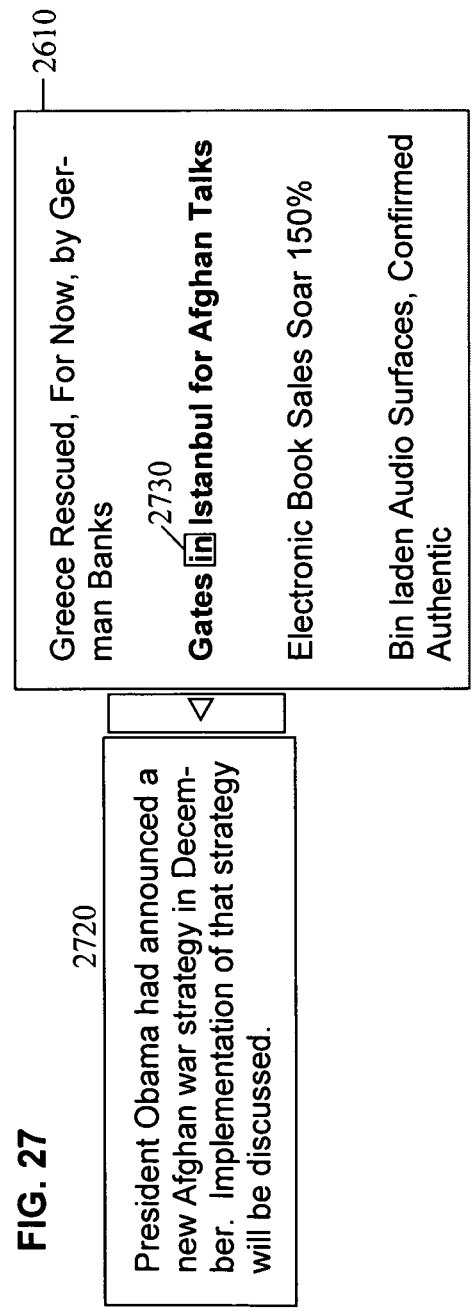

FIG. 28
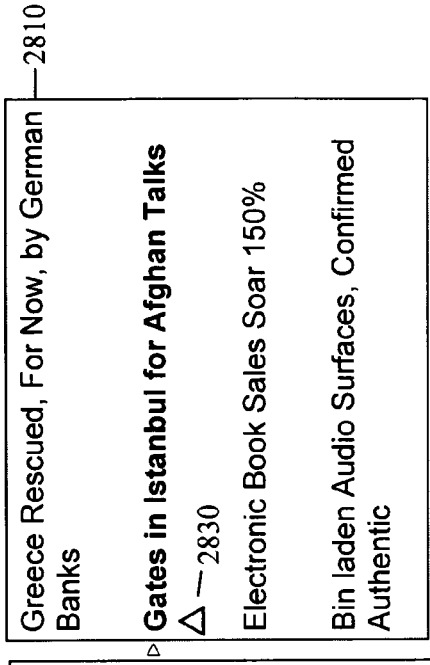
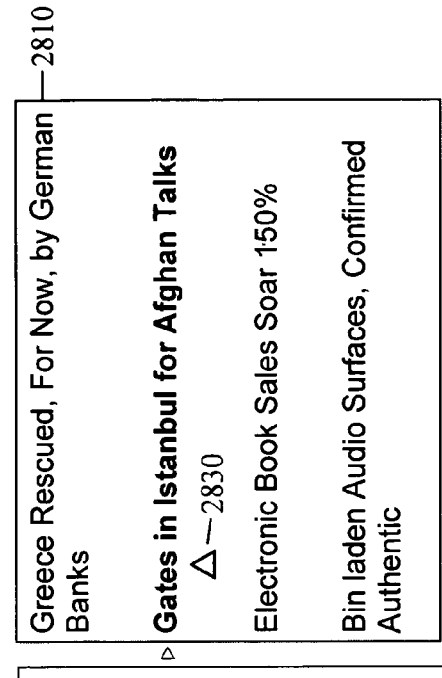
FIG. 29

US 8,739,019 B1

COMPUTER-IMPLEMENTED METHODS AND COMPUTER PROGRAM PRODUCTS FOR INTEGRATING AND SYNCHRONIZING MULTIMEDIA CONTENT, INCLUDING CONTENT DISPLAYED VIA INTERACTIVE TELEVISIONS, SMARTPHONES, ELECTRONIC BOOK READERS, HOLOGRAPHIC IMAGERY PROJECTORS, AND OTHER COMPUTERIZED DEVICES

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office files or records, but otherwise reserves all copyrights whatsoever.

CROSS-REFERENCE TO RELATED APPLICATIONS

This patent application relates to provisional patent application U.S. 61/400/152 ("Method and System for Integrating and Synchronizing Multimedia Content"), filed on Jul. 24, 2010, and to provisional patent application U.S. 61/458,819 ("Methods and Systems for Randomly Generating Presentations, and [Supplemental] Method and System for Presenting Interactive Content"), filed on Dec. 2, 2010.

FEDERALLY SPONSORED RESEARCH

Not applicable.

SEQUENCE LISTING OR PROGRAM

Not applicable.

BACKGROUND

1. Field

This application relates to the electronic presentation of news, advertising, and informational content, where the written content is integrated and synchronized in a distinct manner with other forms of multimedia content.

2. Prior Art

Readers of news stories and other informational content have benefited from technological advancements in the presentation of articles in print and especially in the presentation of articles via computer-implemented methods and computer program products.

In print, and for news content in particular, the inverted pyramid structure of journalism has remained the mainstay since the 19$^{th}$ century. In fact, one of the first inverted pyramid stories was purportedly an Associated Press story drafted in 1865 to report the assassination of Abraham Lincoln. Although often considered outdated, the inverted pyramid remains the principal format for stories published by such dominant news organizations as The Associated Press and Reuters. In simple terms, the inverted pyramid structure requires expressing first the key issue of a news story or other informational article, followed by supplementary information of lesser significance and lesser interest so that inverted pyramid stories often conclude anticlimactically by describing detailed minutiae or background information. Most often, the inverted pyramid story is published alone or with an accompanying static photograph.

At the same time, the intermittent use of "alternative story formats" in print journalism in recent decades has served to enhance the appeal of news content in newspapers and magazines by incorporating visuals that aide a user's comprehension and enjoyment of a given story. News content based on the "alternative story format" innovation often incorporates charts, graphs, colorful designs, bulleted points, and other similar features.

Electronically, the presentation of news and other informational content has changed far more dramatically and quickly. Internet aggregators such as Google, Yahoo, and Microsoft's Bing, as well as online publishers such as WashingtonPost.com and TheWallStreetJournal.com, are now able to present hyperlinked titles of news stories and informational articles that users can click-on or otherwise select to review an entire news story or other piece of content in an electronic display. Some aggregators, such as Yahoo, have leads that pop-up when the user's cursor hovers over a particular story's headline, helping the user to determine whether to skip that story or click on the hyperlink to review the content in depth. Similarly, publishers and aggregators have integrated multimedia content into their electronic presentations of news and other content, whereby digital photographs, video, and audio are mixed with the written content and whereby users can click to review a slideshow of digitized photos related to any given piece of content, whether it's news related or a "how to" informational article.

The current leading online newspaper for interactive innovations is likely The New York Times. Their online newspaper offers several cutting-edge, interactive news presentations and The Times has won multiple awards for their interactive efforts. Their interactive news presentations, however, are heavily focused on graphics, rather than on written articles that incorporate multimedia in the manners described in this patent application featuring "synchronized news stories" and "synchronized informational articles."

Furthermore, the digital age has led to a blurring of the boundaries between newspapers, television, and other media. In recent decades, broadcast, cable, and satellite television had merely allowed the user to watch broadcasts with simple text overlays that serve to clarify the images portrayed in the video presentations. More recently, however, the Internet has led to a commingling of content in new ways. Video, graphics, and text are able to be integrated so that, for example, a user can read a CNN article on the Internet, then click on a nearby, related video clip, and then click again to review an audio segment that further expands that same written article.

Yet, no other news articles or informational articles have been found that combine written content with other forms of media in the manner described in the embodiments contained within this patent application. The closest electronic news concept uncovered in published media pertains to displays of photographic slide shows on CNN and other news websites; in those examples, the reader clicks the next arrow to see a new photo and to read the accompanying captions. But the "synchronized articles" embodiments taught herein are not primarily about displaying small, isolated captions of text—most of the embodiments contained herein focus on uniquely matching visual and other media to the main text of a given news story or similar news content.

On a different note, the U.S. Patent and Trademark Office reveals other prior art innovations that have been created to further innovate the electronic creation and display of content.

In U.S. Pat. No. 7,610,358 (2009), Benschoter teaches how to present electronic media content, primarily video content, that is retrieved from a database. Benschoter's method, assigned to Time-Warner Cable, seeks to separate news content into headlines, summaries, and full text or video, allowing the user to incrementally determine whether to move forward with reviewing a particular news story or other content. It is not intended to focus on synchronizing written content with other forms of multimedia in the manner taught herein.

A patent application by Stuckman (2007/0198655) helps users to navigate in a linear manner from one website to another website. Stuckman's approach differs in that it's not focused on news stories, news commentaries, or other articles, but rather on creating a way for users to move quickly from one website to another.

U.S. Pat. No. 5,524,193 issued to Covington is titled "Interactive Multimedia Annotation Method and Apparatus." Covington allows a reader of a text story to view or bypass multimedia by manually selecting a highlighted link. In Covington's patent, the reader has to decide to select each text link separately in order to show the next photo, video, etc., rather than having these multimedia elements, or a majority of these elements, stream automatically as the user reviews a particular article. Covington's purpose is to allow the "annotating [of] a text document" by authors in a quick manner and to then give readers the ability to choose or bypass accessing various presentations of multimedia. The multimedia selected then appears in pop-up windows overlaying the text. In addition, this Covington patent has extra steps along with other elements that make it different from the embodiments taught herein.

A patent application by Freeman (2004/0175095) synchronizes images and audio narratives to a written text. This audio-oriented concept is meant for full-length books on-tape, which differs from the embodiments described herein.

A patent application by Allen (2004/0078814) intends to provide a customized ticker for televisions. This intriguing multimedia application by Paul G. Allen, a founder of Microsoft, allows the user to customize ticker data within a television broadcast, utilizing multiple displays to present tickers while continuing to watch a sports broadcast, for example.

A patent application by Jewsbury of Microsoft Corporation (2007/0006079) focuses on identifying a "state change in a structured representation of a declarative markup language document" to trigger the playing of a component of an interactive multimedia presentation.

A patent application by Saiga (2004/0080541) seems to enable electronic books to incorporate a timed presentation of information.

A patent application by Saccocci (2009/0191531) seems confusing, but appears to want to combine a printed book or periodical with stimulation coming from an audio-visual product (such as a stereo or a TV or a computer). Saccocci's key approach is to have the reader hold the physical book in hand and then present sound effects or visual effects as the reader reads a page from that traditional book.

In U.S. Pat. No. 6,269,248, Iggulden seeks to augment a printed book with computerized multimedia content. The physical book contains printed visual cues, and the reader may manually access "indicia" on a computer corresponding with those visual cues to play supplementary audio or other multimedia content.

A patent application by Cohen (2003/0059758) similarly seeks to integrate a printed book with "associated interactive electronic data," with the book likewise containing "indicia" to help the user access corresponding electronic data.

A patent application by Harshman (2006/0286528) focuses on an "interactive multimedia reading method." As with Iggulden and Cohen, Harshman seeks to have the user read a printed book, text, or manual. Coding buried within the printed text then allows the user the option to access related movie or other video segments "on demand." Harshman's patent application's legal claims section seem to focus almost entirely on readers of conventional, printed books; in this regard, electronically reproduced documents are mentioned once in the entire application, and is excluded from the claims. Most importantly, as with Covington, Harshman requires the reader to decide to select each particular text link to show the next video segment, rather than having these multimedia elements, or a majority of these elements, stream automatically as the user reviews the book. With Harshman, the reader has to choose each time to "actuate a code or icon and the like" to access each particular video "on demand" segment. In another part of his application, Harshman discusses "pointing and clicking" to access each video on demand. The reason for this approach is that Harshman is offering the user of a book the opportunity to further augment their reading of a book with video segments whenever the reader feels a need. Additionally, although Harshman claims a broad variety of printed and written material, his patent application does not refer to "news" or "news stories." Next, while Harshman indicates that the printed materials can be "financial reports . . . charts, and graphs," he never suggests that the multimedia materials can be charts or photographs or graphics; his teaching focuses solely on movies or videos. In contrast, multimedia depictions of stock charts, financial pie charts, and similar graphics are essential to the original embodiments described herein that pertain to financial news content. In turn, the incorporation of photographs and graphics is a key feature of other embodiments depicted herein.

In U.S. Pat. No. 7,114,170, Harris teaches a "Method and Apparatus for Providing Interactive Media Presentation." Harris combines presenting interactive and non-interactive photos, videos, and other media to a user over a computer in combination with a stored "user profile." Harris's patent claims seem unclear, but it appears that this patent is intended to prompt the user to watch a non-interactive video and to then make interactive selections based on the information presented in that non-interactive video. The user's choices are then coupled with information stored in their "user profile," which then jointly leads to the presentation of follow-up information. It should be noted that Harris's visually-oriented media patent is not focused on news content; instead, it's mostly related to shopping. Nor is Harris's patent related to articles that have a text orientation; as such, Harris does not intend to change the graphics in his presentation as the user reads or scrolls down a block of text, as is taught in the "synchronized news stories" and "synchronized informational articles" patent application herein. Moreover, whereas Harris's patent is completely dependent upon user profiles, implementing user profiles is an element of only certain embodiments described herein.

Relating to scrolled content, in U.S. Pat. No. 6,067,069, Krause teaches a helpful method of scrolling text at variable speeds by attending to the user's eye or head movements.

In turn, a patent application by Lin-Hendel (2008/0109750) teaches an automatic scrolling method via the use of a highly-flexible electronic scrolling tool.

3. Additional Prior Art Uncovered in Academia

Additional research has been uncovered pertaining to unique news presentations and hypermedia theories propounded by advanced academic researchers in the U.S., Latin America, and Europe.

In the September 1997 edition of *Journalism and Mass Communications*, Professor Eric Fredin published a monograph entitled, "Rethinking the News Story for the Internet: Hyperstory Prototypes and a Model of the User." At the time of authorship, Fredin was an associate professor in the school of journalism at Ohio State University. In his monograph, Fredin proposed several concepts for creating non-linear news stories. Yet Fredin's focus was to have a "main story" presented sequentially, while displaying "related files" in a separate window. A different set of related files corresponds to individual portions of the displayed main news story. Differing from the embodiments described herein, Fredin's goal was to allow a reader to see headlines of other news stories that relate to specific portions of a given "main story," and to also allow each of those related stories to become the new "main story" with its own set of related headlines. Fredin's goal was to allow readers to shift from one news story to another news story in a fluid manner, rather than to completely transform the inner workings of a news story or other informational articles.

In 1999 Assistant Professor Robert Huesca of Trinity University and Professor Brenda Dervin of Ohio State University presented an intriguing and helpful paper at the "Media in Transition Conference" at the Massachusetts Institute of Technology. The paper was entitled, "Hypertext and Journalism: Audiences Respond to Competing News Narratives." The paper was based on a previous experiment in which these researchers had "selected existing news stories and redesigned them ourselves using basic principles of hypertext." Huesca and Dervin took traditional news stories from the Los Angeles Times and configured them for presentation so that the "redesigned versions contained no new material; rather, they were simply broken into thematic parts that had to be activated by clicking on links running along the left side of the computer screen . . . Aside from slight changes in transitional phrases, the hypertext content was identical to the original article; only the form was altered—from a unified, linear story versus a non-sequential narrative with reader controlled links." Huesca and Dervin's experiment focused on non-linear presentations of news content. Their method differed widely from the embodiments described in this patent application, in large part because the professors' methods do not offer stories which progress linearly through the precise synchronizing of written content with other forms of media.

Similar to the research presented by Huesca and Dervin at MIT, Wilson Lowrey published an interesting research paper in the Spring 2004 edition of the *Newspaper Research Journal*. The research paper was entitled, "More Control, but not Clarity in Non-Linear Web Stories." Lowrey also discussed and compared a similar approach in another paper, "The Applicability of Cognitive Flexibility Theory to the Production of Hypermedia News Stories." This latter research paper was presented by Lowrey in New Orleans on May 27, 2004 at an annual conference hosted by the International Communication Association. Lowrey is an associate professor of journalism in the College of Communication and Information Sciences at The University of Alabama. In "More Control, but not Clarity in Non-Linear Web Stories," Lowrey describes the creation of a non-linear news story where "the non-linear story was segmented into four different topics and was overlaid with a navigational scheme. Links to each of the four topics were available in a vertical frame on the left side of each page." Like Huesca and Dervin, Lowrey appears to permit the user to skip from one news story portion to another portion in any sequence desired. Also like Huesca and Dervin, Lowrey's methods do not offer stories which progress linearly based on the "synchronized news stories" computer-implemented methods and computer program products taught herein.

In a 2008 edition of *New Media and Society*, Mark Tremayne, Assistant Professor of Journalism at the University of Texas at Austin, published an article about an unusual hypertext prototype he developed. The article was entitled: "Manipulating Interactivity with Thematically Hyperlinked News Texts: a media learning experiment." Tremayne stated his prototype is not "a purely non-linear one" as is taught herein; instead he focused on a "hierarchical hypertext" that contained multiple layers of portions which could only be accessed via a specific manner. Tremayne's prototype is also distinct from that described herein.

Finally, João Canavilhas of Universidade da Beira Interior in Portugal presented a helpful research piece at the International Symposium of Online Journalism in 2008 at the University of Texas at Austin. The symposium is sponsored in part by the Knight Center for Journalism and UNESCO. Canavilhas's article is entitled "Hypertext Newswriting Effects on Satisfaction, Comprehension and Attitudes." Canavilhas's prototype for a non-linear news story includes the initial presentation of a news story title coupled with its lead. Contained within this lead are links the user may select to navigate to other portions of the news story. Canavilhas's method of navigation and presentation differs from the embodiments described herein. As just one example, Canavilhas embeds his hyperlinks in various places of the lead itself (to encourage non-linear reading) rather than in the main text or in another manner that lends itself to a linear presentation of the news story. Also, and as with the other prior art examples, Canavilhas's approach doesn't allow the reader to synchronize written content with other forms of media in the streaming method and product taught herein.

A surprisingly large volume of additional research has been undertaken on this subject, and the Association for Computerized Machinery has even formed a special interest group dedicated to the research of "hypertext, hypermedia, and the web." This special interest group sponsors annual conferences where university professors from across the globe publish and discuss academic research on advanced methods of presenting news content. Yet, despite the sizable volume of research and experiments undertaken, the inventor has not encountered models that specify the embodiments detailed in this application's appended claims.

SUMMARY

In accordance with one embodiment described, a computer-implemented method and computer program product are provided for the electronic presentation of a multimedia news story or informational article (both collectively termed "synchronized article"), wherein the written content is integrated and synchronized in a distinct manner with related media content, including any desired combination of photographs, videos, audios, or financial or other graphics.

As the user advances to select phrases, lines, paragraphs, or other predetermined segments of written text in the synchronized article the related media content changes, allowing for new, associated presentations of videos, photos, or other media. Moreover, the user's reading speed helps to control the speed of changes in the related media content, putting the user in charge, creating a distinctively entertaining presentation, and allowing the user the option to review content at a higher rate of speed than is the case with traditional news broadcasts.

A current presentation of the synchronized article contains at least one "multimedia control" that serves to present additional or changed media content that corresponds to a select segment of text the user seeks to review. The multimedia control can, for example, be comprised of, or work in conjunction with, at least one interactive button, electronic scrollbar, or electronic touch screen control, or a combination thereof. Alternatively, the multimedia control can be associated with an automatic eye-tracking or body-movement tracking device (an "automatic tracking component") to cause the automatic changing of related media content. If the multimedia control is expressly scrolling-oriented, it can be more specifically termed a "scrolling-oriented multimedia control." If it is scrolling-oriented while also incorporating more traditional hyperlink controls that can similarly cause the presentation of related media content, it can be more specifically termed a "hybrid scrolling-oriented multimedia control."

By maneuvering the multimedia control in the current presentation while reviewing the text, or by maneuvering elements associated with the multimedia control, the user causes the related media content to change in synchronization with the user's review of select phrases, lines, entire paragraphs, or other predetermined segments of written text. Additional presentations can similarly synchronize the related media content with text content.

The main text can be presented either within, or adjacent to, one or more displays of synchronized media content. The currently synchronized text can be highlighted or otherwise differentiated. In select instances, audio-visual presentations can be muted or at low volume while the text is read, with the user provided the option to change the sound volume. In select cases, related media content can consistently be presented in the same place on a given display or the media can shift down or across an electronic page in conjunction with the user's reviewing of associated text. More than one component of related media can be presented simultaneously or can appear and disappear at various intervals as the reader reviews the corresponding text. The main news story can be accompanied by the presentation of one or more sidebar news stories which appear and optionally disappear as the reader reviews select segments of the main article's text; in addition, the sidebar articles can have their own select segments of text synchronized with the display of related media content. Conversely, the user's review of select components of related media can lead to a changing in the presentation of the article's text. Stock charts and other financial graphics can be modified in a highly-advantageous manner as the user advances through the accompanying text of a financial news story. The text itself can shift across the page, or have its appearance changed, as the user scrolls down the page.

Related media content can be zoomed in or out, or certain parts can be highlighted, augmented, or otherwise modified as the user advances to a select new segment of text. For instance, the reviewing of a select new segment of text could lead to a change in perspective of a video or other visual image already displayed. This leads to an unusually fluid manner in which to present visual and other supportive media in association with the text content.

Time delay devices for presenting related media content can likewise be incorporated. Article presentations can change from displaying one type of media to another type of media. Select photographs, graphics, videos, or segments of videos can be skipped or replaced by alternative versions to accommodate the needs of faster readers. Select media content can optionally be bypassed unless specifically chosen by the user.

Users can be informed in advance as to when visual, audio, or other media changes will take place. Users can also be allowed to bypass using the multimedia control yet still be permitted to progress forward to review the written text and accompanying visual or audio images.

Users can be guided in select instances to embed their own comments within the synchronized articles, and the articles accompanied by the embedded user comments can be shared on social platforms, including Facebook and MySpace. Additional users can likewise add comments, including comments that critique previous comments.

Advertising content can likewise be integrated and synchronized with the articles, with the advertising presentation able to change as the user advances to select segments of the articles.

Moreover, advertising content can itself be designed to work in a similar synchronized format, where the user's reviewing of synchronized advertising text changes the presentation of the corresponding visual, audio, or other media content presented.

Synchronized multimedia can be presented as interactive games so that, for instance, the user's reaching a predetermined point in the associated text leads to an invitation to play an interactive game presented.

Synchronized articles can be presented in a traditional linear story format, or the content can be presented in a non-linear format. If presenting the article linearly, as an alternate approach the initial presentation can commence by showing, for example, just one text segment of the story. Selecting the multimedia control then causes a second presentation containing a second text segment to be displayed within or adjacent to the first segment (or in lieu of the first segment). In turn, the related media content can change as the user selects each additional presentation comprised of each additional text segment.

Multiple article summaries or whole articles can be integrated together into a single, cohesive display using this "synchronized article" approach. As such, in one variation the user can scroll down the text of one article, thereby causing its graphics to shift as described previously, while the graphics for other displayed articles remain unaffected.

Pauses in reading, or pauses in maneuvering the multimedia control, can lead to additional changes in the article's presentation, to changes in advertising, or both. The type and amount of synchronized presentations can be matched with individual preferences by incorporating user profiles. Text captions can be placed within synchronized articles, with the user's review of said captions causing the continued, modified presentation of related media.

The processes described in this summary can likewise be implemented to change the synchronized presentation of multimedia in electronic books, leading to a new way for users to interact with ebooks.

Other embodiments and details are described and shown.

BRIEF DESCRIPTION OF THE DRAWINGS

The accompanying drawings, in which like reference numerals represent like parts, are incorporated into and constitute a part of the specification. The present embodiments are illustrated by way of example, and not limitation, in the figures. With the exception of FIG. 1, the diagrams noted below are all illustrations of computerized displays, also called screenshots. The illustrations of computerized displays in this application depict stick figures to comply with patent office instructions to the inventor.

FIG. 2 is an example of a computerized display furnished by the server depicting a first preferred embodiment. In this example, a first article that includes a primary body of text is presented. The primary body of text is coupled with related media content and a scroll bar operated as part of a multimedia control. When activated by a scrolling process, the multimedia control can more specifically be labeled as a "scrolling-oriented multimedia control." The media displayed may be any combination of a photograph, a video, a graphic, or another form of media.

FIG. 15 illustrates the results of the user's choosing to skip to the third sub-headline selector, revealing that button's synchronized text and related media content.

FIG. 19 also shows a different presentation of a scrolling process in the primary body of text; this presentation may be used for either manual or automatic scrolling and can be incorporated into many of the other embodiments illustrated herein.

FIGS. 25A and 25B jointly illustrate one way in which an article's text can be shifted in conjunction with the presentation of related graphics.

FIGS. 26 and 27 jointly illustrate a way to enable readers to access entire news stories through electronic headline controls.

FIGS. 28 and 29 jointly illustrate a second way to allow readers to access entire news stories through electronic headline controls. These two diagrams also demonstrate how multimedia can change while accessing the news stories through the electronic headline controls.

DETAILED DESCRIPTION

Several Key Terms Defined

Figure 1:
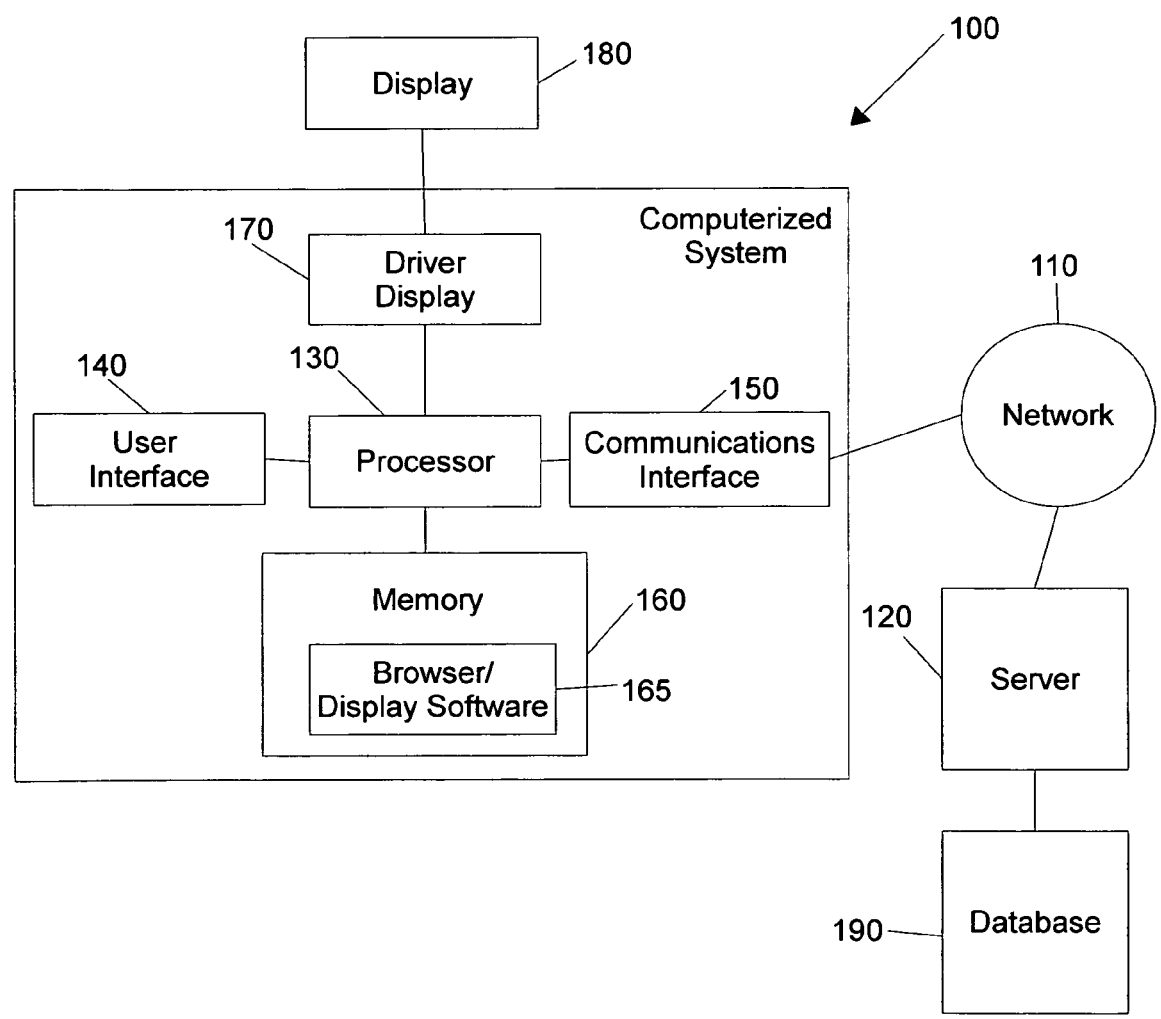
FIG. 1 illustrates an arrangement for accessing a server and database providing news stories, news commentaries, informational articles, press releases, electronic books, or other informational content for user presentation in accordance with the preferred and alternative embodiments.

Computer-implemented methods and computer program products are described for presenting synchronized multimedia news stories and informational articles in an electronic format. A computer-implemented system may alternatively be referred to herein as a computerized system or, as just mentioned, a computer program product.

The general term "news story" includes a top news story, breaking news story, feature story, commentary, and news release; it further includes a news story relating to politics, crises, business, finance, sports, entertainment, technology, or any other story typically considered newsworthy.

The term "informational article" refers to informational articles on a wide variety of subjects that would not normally be considered news. "How to" articles, advertorials, and Wikipedia encyclopedia entries are three examples of informational articles.

The "news story" and "informational article" described above are further referred to in this patent application as being comprised of written (text-based) content united in a unique manner with any combination of photographs, video, audio, computerized graphics, holographic images, or other forms of media content. This integrating and synchronizing is what transforms the content into "synchronized news stories" and "synchronized informational articles." The collective term used in this patent application for both (synchronized news stories and synchronized informational articles) is "synchronized articles." In turn, the collective term used in this patent application for both "electronic informational articles" and "electronic books" is "informational electronic documents." Also related to definitions, videos, photographs, and financial charts are collectively referred to in this patent application as "visual images."

The term "related media content" refers to supportive media displayed alongside text in a news story, informational article, or electronic book, leading to the collective display of "multimedia content." Related media content includes photographs, videos, audios, graphics, and other forms of media that help illustrate the text. When referring to two or more forms of related media content, they may collectively be called multimedia content. Similarly, when referring to text and any one or more forms of related media content (such as text and a visual image), they may also collectively be called multimedia content.

The term "multimedia control" is defined as being comprised of at least one electronic control that helps the user to choose, or otherwise activate, at least one select segment of text within a particular news story or informational article. Once that select segment is chosen or otherwise activated via the multimedia control, or via a component of the multimedia control, then new or changed visual, audio, and/or other related media content is presented that relates to that select segment of text. The multimedia control can be chosen manually through, for example, electronic scrolling or an electronic "button" or another computerized control, in which case it could be referred to as a "manually manipulated electronic control." Or it can be activated automatically by the computerized system through eye-tracking or other body-tracking software, and can therefore be referred to as an "automatic tracking multimedia control." In the case of an automatic control, when the user reviews a news story, for instance, eye-tracking software can evaluate and report back to the computer-implemented system which new select segment of text the user is presently reviewing. That reporting back then serves to activate the multimedia control which, in turn, advances the related media content so that it is associated with the new select segment of text presently viewed by the user.

The term "scrolling-oriented multimedia control" is defined as at least one electronic control that specifically uses one or more scrolling processes to help the user to manually choose a select segment of text within a particular news story or informational article. Once that select segment is chosen or is otherwise activated via the scrolling-oriented multimedia control, or via a component of the scrolling-oriented multimedia control, then new or changed illustrative media content is presented that relates to that select segment of text.

In turn, the term "hybrid scrolling-oriented multimedia control" is defined as combining the features offered by the scrolling-oriented multimedia control described above with the ability to select hyperlinks to advance related media content in a particular synchronized article.

The term "electronic touch screen control," or simply "touch screen," refers to an electronic control that presents text manually through the user's conscious manipulating of at least one finger, hand, stylus, or a similar instrument on or very near a computerized display screen. Additional text may, for example, be "pushed up" or "pulled down" into view on the display by the tip of the user's finger with this electronic touch control. Once selected text is presented via the electronic touch screen control, then new or changed visual or other illustrative media content is likewise presented that relates to that selected text. Although the user may activate a touch-screen control in an iPhone, for example, by pressing on a small button on the computerized display screen, the specific phrase "maneuvering of said electronic touch screen control" in this patent application specifically refers to the user's moving of their finger, hand, stylus, or similar instrument across a predetermined part of the display screen to cause a change in presentation, rather than simply pressing on a single area such as a button. This "maneuvering of said electronic touch screen control" therefore helps to "drag" text in the display screen, pushing-it-up, pulling-it-down, or dragging it sideways.

Unless otherwise defined, the term "changed component" may refer to: 1.) a component of media content that was previously displayed but then changed in a subsequent presentation; or 2.) a component of media content that was not previously displayed but was then added anew to said subsequent presentation.

First Preferred Embodiment

FIG. 1 depicts a computer or other electronic device for displaying the synchronized news stories and other informational electronic documents such as informational articles and electronic books.

The network 110 utilized can be the Internet or it can be an interactive satellite, cable, or broadcast television network, a cell phone network, or other such communications network.

If the Internet is the chosen network, the server 120 can be connected to the Internet by way of a uniform resource locator (URL).

The computerized system 100 includes a computer processor 130, a user interface 140, and a communications interface 150. It further includes a computer memory 160, which utilizes a browser or other display software 165, and a display driver 170, which is connected to a computer display device 180, also referred to in this patent application as a computer output device (or a computerized display). The processor 130 is a central processing unit, a microprocessor, and/or other such processor that is customarily utilized by a computer-implemented system.

User interface 140 serves as an interface for exchanging information between the computerized system and the user and includes at least one of the following: a mouse, cursor, keyboard, touchpad, eye movement sensors, body movement sensors, brain activity sensors, microphone, audio circuitry, or speakers. Communications interface 150 includes a modem and broadband device, a transmitter and receiver coupled to Bluetooth or wireless local area networks (WLAN) or other such networks for wireless devices, or any combination thereof. This communications interface 150 allows the user to communicate with servers such as server 120 through a network 110 such as the Internet or through another such network 110, including proprietary networks operated through, for example, interactive television systems or cellular telecommunications systems.

Computer memory 160, also referred to in this patent application as a computer-useable storage medium, may include non-volatile memory (e.g., ROM), volatile memory (e.g., RAM), and hard drive and flash drive memory. In this instance, the memory may store, among other features, a web browser 165, several examples of which are Microsoft Internet Explorer, Mozilla FireFox, and Google Chrome. Or the computer-useable storage medium may store proprietary browser or other display software 165 related to the specific computer-implemented system or its corresponding network or both.

Computerized system 100 outputs synchronized articles and related content to display driver 170 which formats the articles for display on computer output device 180, which may be a computer monitor, an interactive television screen, a computerized screen made for tablet computers or smartphones, including an iPad, an iPhone, an Android device, or a BlackBerry device, or another computer output device.

In this specific example, server 120 has access to a database 190 of at least one synchronized article, with each article ready to be presented in a first presentation. This first presentation may include, for example, a primary body of text for a written news story, coupled with the presentation of one or more related media content components, such as a visual image (consisting of photograph, a video, or a financial chart). Server 120 also includes, or can access, a computer processor 130 that, for instance, allows the user to scroll down the primary body of text; this scrolling activates select segments of text which, in turn, leads to the presentation of changed related media content, as is demonstrated in the illustrations to follow. In addition, server 120 can include an interface for indicating to the user which segments of text are currently being selected by the user from the database 190.

After the user of the computerized system 100 causes communications interface 150 to establish a network connection through the network to server, and via the URL if the network is the Internet, server 120 then transmits the first display, such as the first presentation of the news story, to the computerized system 100 via the established connection. If preferred, the first display can be presented automatically whenever, for example, the user first selects a particular application or web page, such as a CNN "app" or home page, a CNN entertainment page, an eHow page for how-to articles, a blogger's page for commentaries, or a featured news stories section of "MyYahoo" or "iGoogle." Alternatively, the user can manually request the same first display.

FIG. 2 illustrates a screenshot of a current presentation displayed by the web browser 165 or other display software 165 (depicted earlier in FIG. 1). The "current presentation" may be a first presentation in an article, as is depicted here, or it may be a subsequent presentation in a given article. In this current presentation example, a news story headline 210 is depicted, along with a primary body of text 220, a scroll bar 230, and a cursor 240 that informs the user which segment of text is currently being reviewed. The first selected text 250 within the primary body of text 220 is additionally differentiated through bolding in this current presentation example, giving the reader an easy way to verify the activated written passage. In turn, the related media content presented 260 is synchronized to the subject matter of the first selected text 250. The related media presented 260 in FIG. 2 represents U.S. Secretary of Defense Robert Gates meeting with a Turkish general in Istanbul in advance of a NATO conference. The scroll bar 230 and embedded cursor 240 in this example operate together as components of a multimedia control, which can also be more specifically labeled as a "scrolling-oriented multimedia control." When the user advances to the next select segment of text by moving the cursor down the scroll bar, the multimedia control is activated, causing the display of at least one changed component of related media content. Moreover, instead of working behind-the-scenes through cursors 240 affiliated with scroll bars 230, the multimedia control can alternatively be operated through electronic buttons, interactive graphics, other types of scrolling functions, or other computerized interfacing that lead users to additional presentations of news or informational content. Also shown in FIG. 2 is an area allowing the user to access a series of extra features 270 related to the news story, including for printing and emailing.

Figure 3:
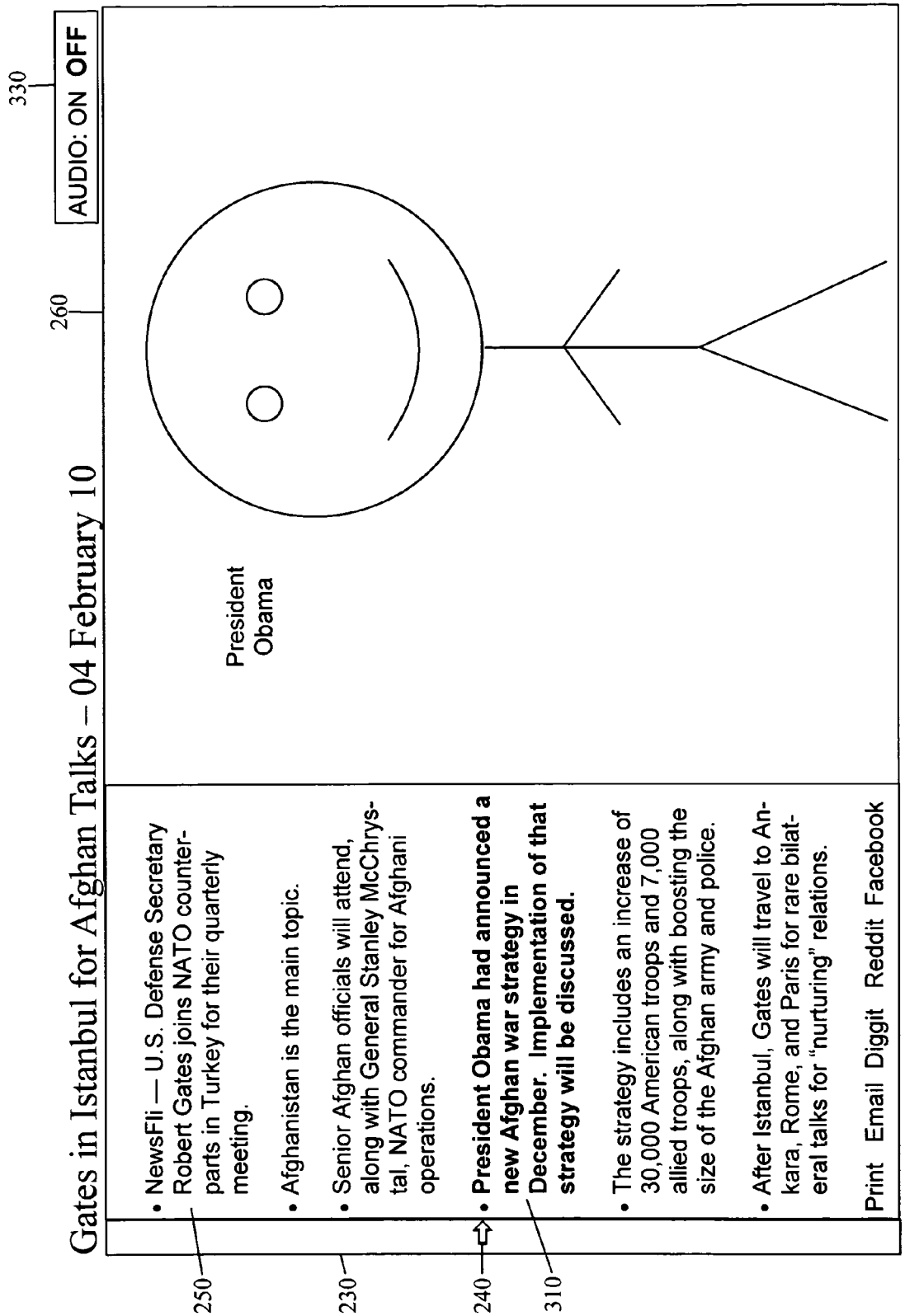
FIG. 3 illustrates the results of the user's choosing of select text from the same first article, causing a change in the presentation of the synchronized multimedia.

FIG. 3 illustrates a computerized display of the same first article, expanding it in a new presentation, wherein the user has caused the cursor 240 in the scroll bar 230 to select the fourth select segment of text 310, which introduces President Obama's role in relation to the subject matter of the article. The choosing of that fourth select segment of text 310 can be accomplished manually, through the user's moving of the computerized cursor 240 in the scroll bar 230, which together operate the respective manually manipulated electronic multimedia control. Alternatively, and as mentioned previously, eye-tracking or body-tracking component can automatically sense that the user is now reviewing the fourth select segment of text 310, causing the automatic tracking multimedia control to differentiate that fourth select segment of text 310 while simultaneously causing the presentation of new, associated multimedia 260. Or a combination of manual and automatic controls can be implemented. Either way, the choosing of that fourth select segment of text 310 changes the related media content 260 from a depiction of Secretary of Defense Gates meeting with a Turkish general in the FIG. 2 illustration of a screenshot to a video or photographic visual image of President Obama delivering a speech about Afghanistan in FIG. 3. Note that stick figures are substituted for video and photographic visual images in each illustration in order to comply with patent application rules.

Once chosen in the FIG. 3 illustration of a screenshot, the fourth select segment of text 310 is now differentiated via bold text, though other variations are equally feasible, including color-coding, highlighting, or other such differentiation. In turn, the first select segment of text 250 is no longer differentiated via bolding.

In addition, the new presentation of the first article shown in FIG. 3 allows the reader to select an audio control 330 button. In this case, the audio of President Obama delivering a speech at West Point is muted until the user selects that audio control 330; alternatively, the speech could be set at a low decibel level, and then increased to a higher level upon the user's selection of that audio control 330. While audio levels can be kept at normal volumes in many cases, in other situations it is advantageous to keep the audio at a low level or even to mute it so that it doesn't disturb the user's reading of the text that accompanies the multimedia. Also, instead of the simple illustration for patent purposes of an "on/off" audio control 330, the actual audio control 330 implemented could instead be comprised of an adjustable volume control, giving the user more control over the sound volume.

Furthermore, as is demonstrated with the above audio example in FIG. 3, additional supportive media content can be withheld from presentation unless specifically chosen to be reviewed by the user through additional activating of a component of the multimedia control. Moreover, one or more supplementary media components can optionally be presented to the user via a time-delay component; for example, in the first five seconds following the user's choosing of the fourth select segment of text 310, a still photograph (instead of a video) can be displayed in the related media presentation 260. Unless the user has moved on to a different segment of text once five seconds passes, the still photograph corresponding to the fourth select segment of text 310 can then automatically convert to a video of President Obama delivering his speech.

Each article in this first preferred embodiment should be created in at least a first presentation and a second presentation, with there being flexibility in how one constructs each presentation. In addition, each synchronized article can continue forward with as many additional presentations as is needed to entertain or to complete the article in a satisfactory manner. Moreover, most articles will be comprised of more than two presentations, with some articles being comprised of at least five to ten presentations. Furthermore, some new presentations may lead to little or no change in the related media content, while other presentations may lead to a complete altering of the related media. Likewise, each of the presentations can contain one or even multiple components of multimedia.

If a given presentation does contain multiple components of multimedia (e.g., a presentation consisting of two photographs embedded in a silent video coupled with computerized graphic), the next presentation displayed could optionally result in some, but not all, of the multiple components being changed.

Related media content can optionally be altered for faster or slower readers, or even for users who have paused reading. For example, if the user is reviewing quickly the first three segments of text in FIG. 2, then the presentation 260 of the video in FIG. 2 can be sped-up to accommodate the user's fast reading speed, or the video can be kept at the same speed and then halted and replaced once the reader reaches the fourth select segment of text 310 shown in FIG. 3, where a video or photo of President Obama replaces the previous media. In contrast, for slower readers—or for readers who have paused their reading or scrolling of an article—the video could be slowed-down, repeated, replaced by a "filler" piece of media, or even be replaced by an advertisement until the user finally reaches the fourth select segment of text 310.

Figure 4:
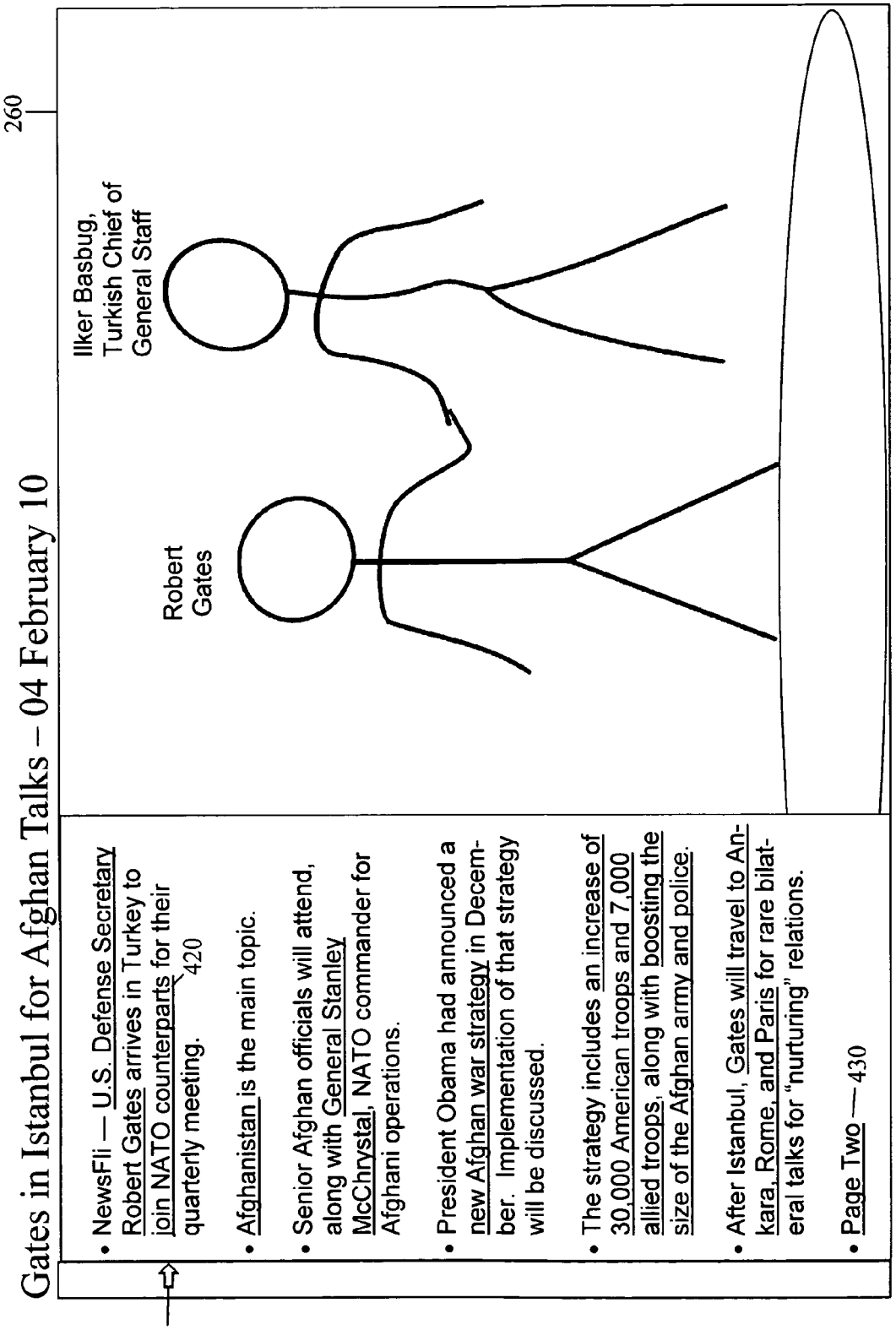
FIG. 4 illustrates additional available features, including combining the scrolling control taught herein with hyperlinks to create a "hybrid scrolling-oriented multimedia control." This FIG. 4 illustration also demonstrates in juxtaposition to FIG. 2 how a photograph, video, or other graphic can change in perspective as the user reviews additional text.

FIG. 4 is a computerized display illustrating an alternative to the embodiment illustrated by FIG. 2. As such, FIG. 4 utilizes a "hybrid scrolling-oriented multimedia control" to help change the media associated with selected text. In simple terms, this means the user can either scroll up and down the text utilizing the cursor 240 in the scroll bar 230 (as is shown in FIG. 2), or the user may instead choose to engage the article by way of hyperlinks 420, each of which can be enabled to cause the presentation of at least one changed component of related media content.

As a variation on FIG. 4, instead of using traditional underlined hyperlinks to create the hybrid alternative outlined above, the hyperlinks in the "hybrid scrolling-oriented multimedia control" can be structured to allow the entire first bullet point (or a first select paragraph in a more traditionally structured news story) to be clicked-on or otherwise selected to cause the presentation of at least one changed component of related media content. Therefore, for example, the user may place their cursor, finger, stylus, or other control device anywhere on the whole "bullet point" of text to cause the presenting of relevant synchronized visual images and to cause that bullet point of text to be differentiated via bolding. In this case, differing from traditional hyperlinks, there isn't necessarily a need for underlining the hyperlinks or highlighting key words of text.

In addition, FIG. 4 helps to demonstrate some interesting advantages of the embodiments contained herein. Note that the images of the two figures depicted in the visual media presentation 260 shown in FIG. 4 are the same as those depicted in the visual media presentation 260 shown in FIG. 2, except that those in FIG. 4 are larger in size. In turn, note that the cursor 240 in FIG. 4 is further down the paragraph than the equivalent cursor shown in FIG. 2. This is to indicate that the user has already reviewed the first two sentences in that first segment of text and has already scrolled down the text to the third sentence. This, in turn, hasn't led to a complete changing of the related media content since the subject matter remains nearly the same. It has, however, allowed the visual presentation in this example to zoom in on the two key figures being discussed. This is a key point for the various embodiments detailed herein. The reason is, the embodiments described in this patent application allow for a continuous flow of changing images to accompany the user's reviewing of text, which is a unique feature not seen in prior art. Therefore, as the reader scrolls through the associated text or otherwise reviews the text (manually, or automatically via an automatic tracking component of a multimedia control) in some instances the related media changes completely; in other instances, however, it doesn't change at all (or only certain components change completely); while, in still other instances elements of the related media content change in a flowing manner by zooming in or out or by changing camera perspectives on the subjects.

FIG. 4 also shows one way to access a second page of the primary body of text by clicking on a "page two" hyperlink 430 or by scrolling to that same area on the display via the cursor 240.

Figure 5:
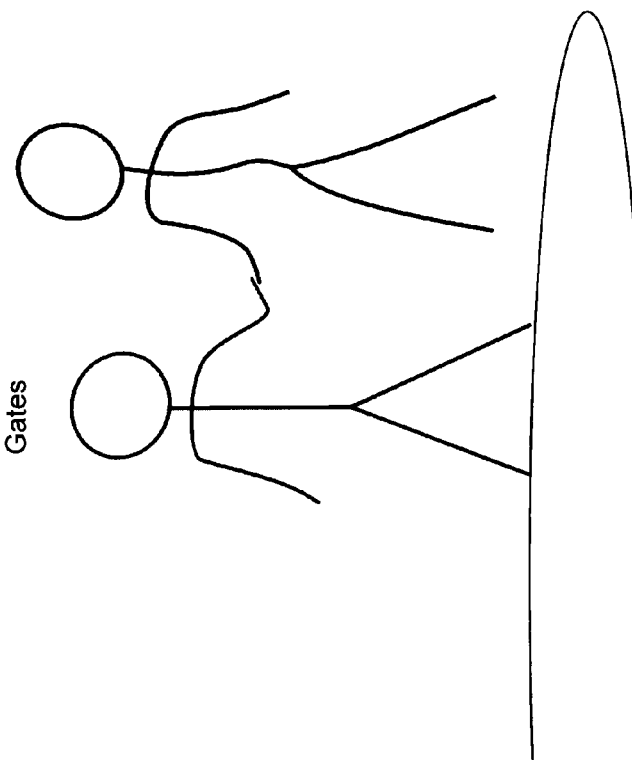
FIG. 5 illustrates a version of the same first article in which the primary body of text and the associated multimedia control are placed within the visual media's display.

FIG. 5 shows a variation of the first preferred embodiment in which the primary body of text 220 is embedded within the presentation of visual media 260. FIG. 5's screenshot integrates the text with the photos, videos, or any other media presented in a highly immersive manner. It may work especially well with shorter articles, although longer articles can likewise be incorporated into the framework by, for instance, including a "next page" control.

Second Preferred Embodiment

Figure 6:
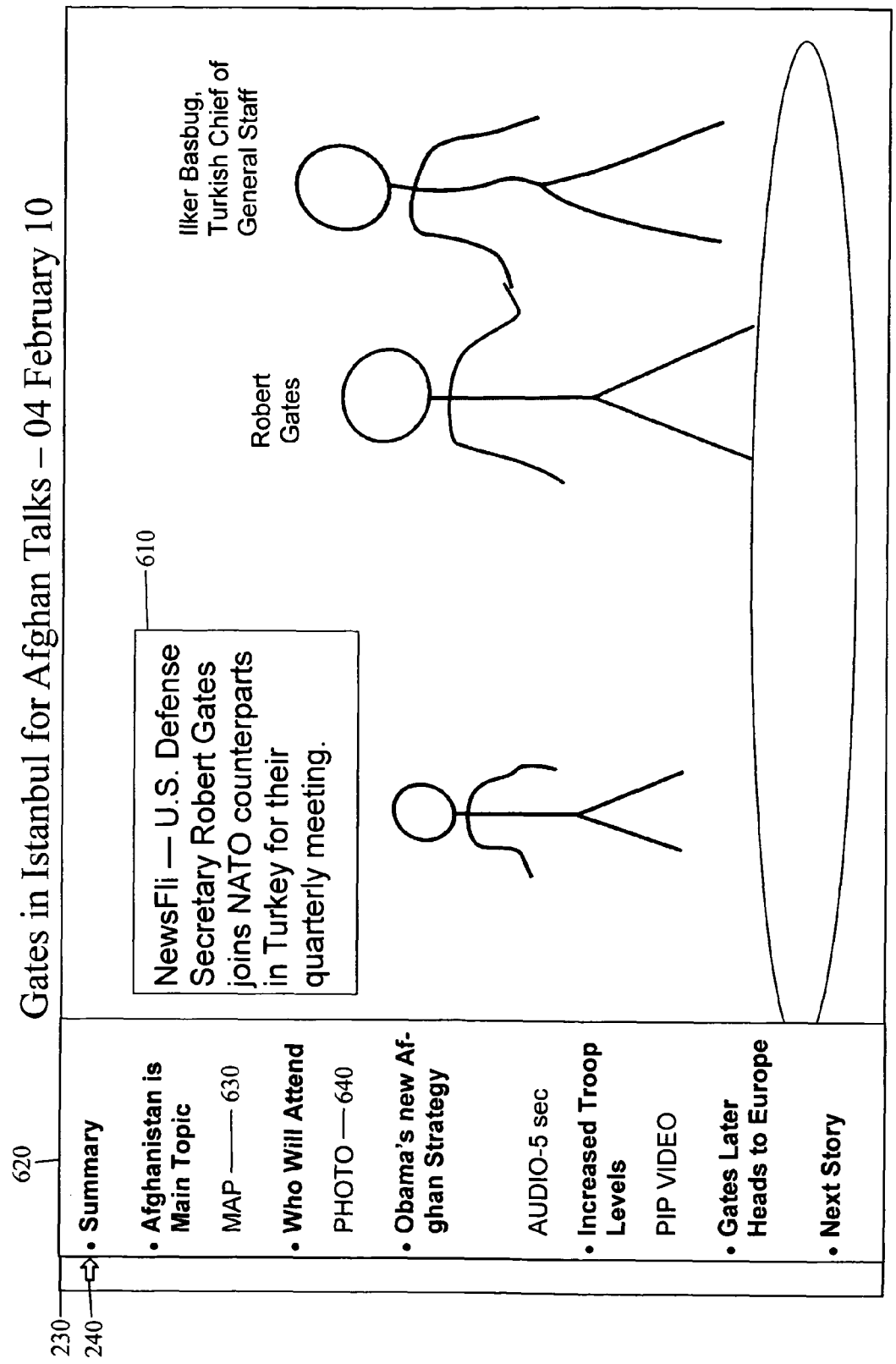
FIG. 6 illustrates a storybook design, in which a segment of text accompanies each presentation of the changing visual media. In this example, the user is also shown in advance when new media content will be presented.

FIG. 6 illustrates a computerized display for a second preferred embodiment for these synchronized articles, wherein one or more segments of text (within the primary body of text) are part of each presentation of changing multimedia in a "storybook format."

This second preferred embodiment, along with each of the alternative embodiments that follow, can utilize the same computerized processes that were detailed in the first preferred embodiment.

As the user maneuvers the cursor 240 in the scroll bar 230 manually or automatically in FIG. 6, instead of presenting a large primary body of text 220 adjacent to the cursor as is shown in FIG. 2, each segment of storybook text 610 in this second preferred embodiment is presented separately within or adjacent to the multimedia display, while the scroll bar 230 and cursor 240 point to the equivalent of a table of contents 620 that outlines the subject matter contained in each upcoming presentation. This computer-implemented method and computer program product not only gives the reader advanced notice of the nature of each topic to be discussed in a particular article, it also illustrates one way in which the user can be informed in advance as to when various multimedia components will be displayed, along with the nature of those same multimedia components. For example, the user scrolls down to "map" 630, which immediately follows a brief written discussion on Afghanistan. As a result, a map of Afghanistan is presented alongside the matching storybook text. In turn, when the user scrolls further down the page to "Who Will Attend," the corresponding storybook text appears; once the user scrolls slightly further, then an associated "photo" 640 of the respective NATO participants is presented alongside the corresponding storybook text. Each new element of illustrative media may be presented simultaneous to the presentation of each new segment of storybook text, or the illustrative media can be presented in-between the presentation of text, or both.

Figure 7:
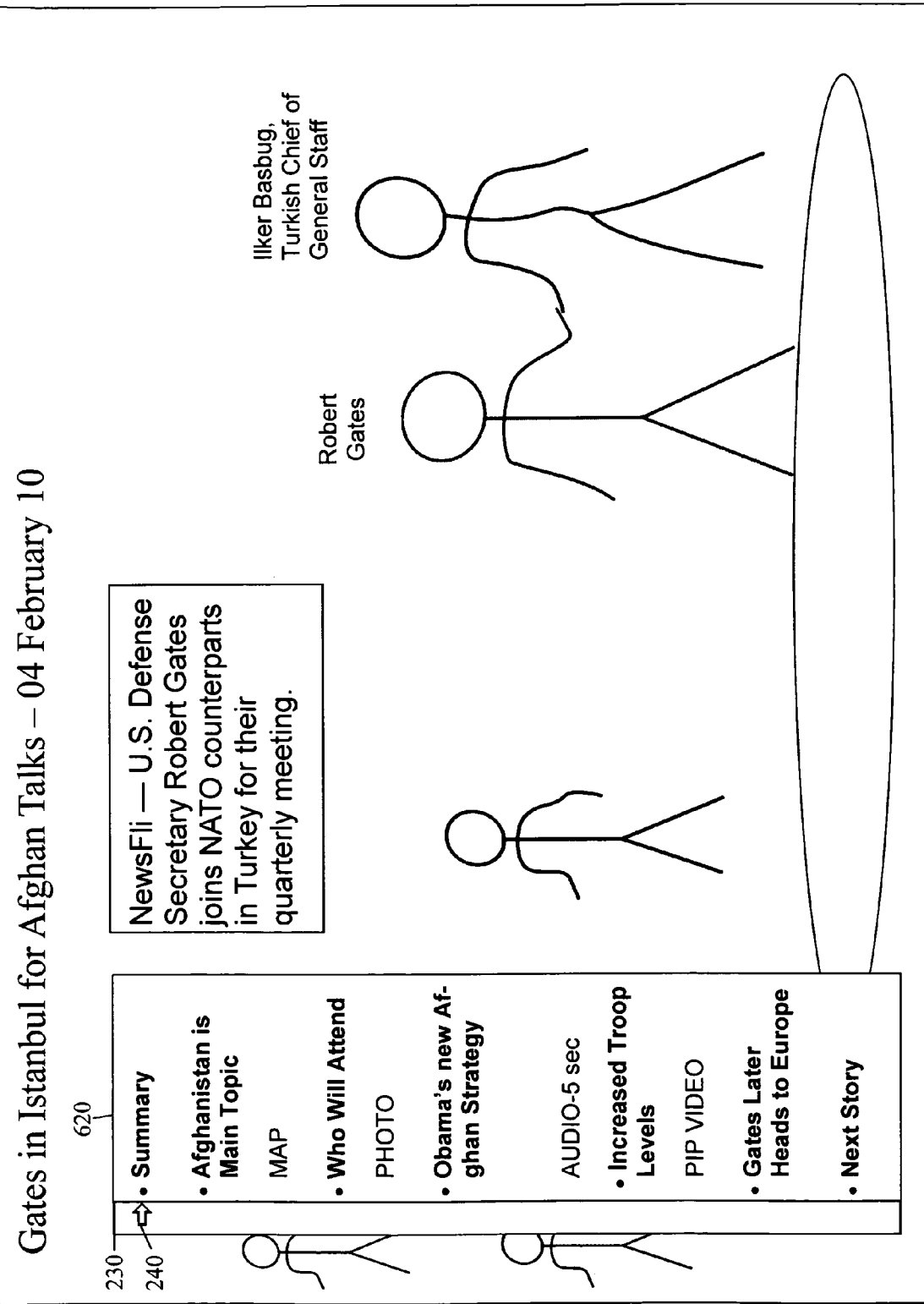
FIG. 7 illustrates a presentation of the storybook design in which the scrolling-oriented multimedia control and related information are embedded in the visual media. Here, the user is likewise shown in advance when new media content will be presented.

In turn, the FIG. 7 screenshot takes the second preferred embodiment depicted in FIG. 6 and simply places the scroll bar 230, the cursor 240, and the related "table of contents" 620 or equivalent within the display of the main visual media presentation.

It should be noted that the first preferred embodiment can likewise provide the user with advanced notice of upcoming media presentations. In fact, if that information is not provided within the primary body of text 220 then, for example, the cursor 240 or another element in the scroll bar 230 can be formatted to include that information.

Figure 8:
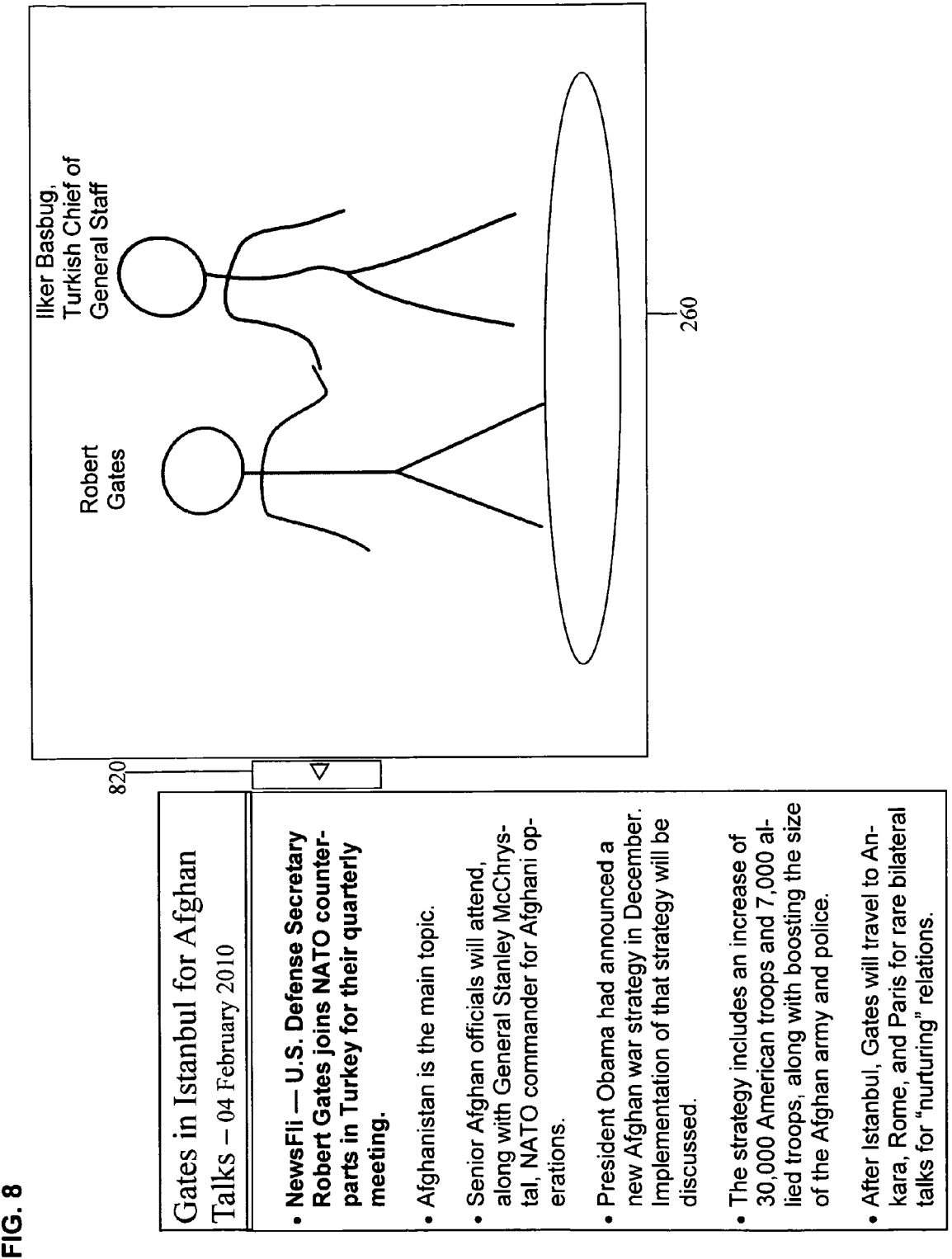
FIG. 8 illustrates an alternative version of the same first article; in this example, the related media content optionally remains in the same position on an electronic page while the text can be scrolled up or down. Conversely, the text optionally remains in the same position while the position of the related media changes.

Additional Embodiments, Along with More Details to Further Delineate the Various Embodiments FIG. 8 illustrates a computerized display for an alternative embodiment incorporating the same article. In this example, the related media content display 260 can remain in the same location on the display device while the text moves up and down the page via scrolling or via other types of multimedia controls. In addition, in this example the related media content display 260 is shown in a smaller size. This could be advantageous to publishers or aggregators who have a lot of text to present for a particular article and who therefore may wish to decrease the space provided for presenting related media. Note that the alternative cursor control 820 displayed in FIG. 8 specifies the segment of text associated with the related media currently presented, as does the text bolding in the illustration. Also, the example shown in FIG. 8 can be modified so that the text remains in the same position while the position of the illustrative media changes.

Figure 23:
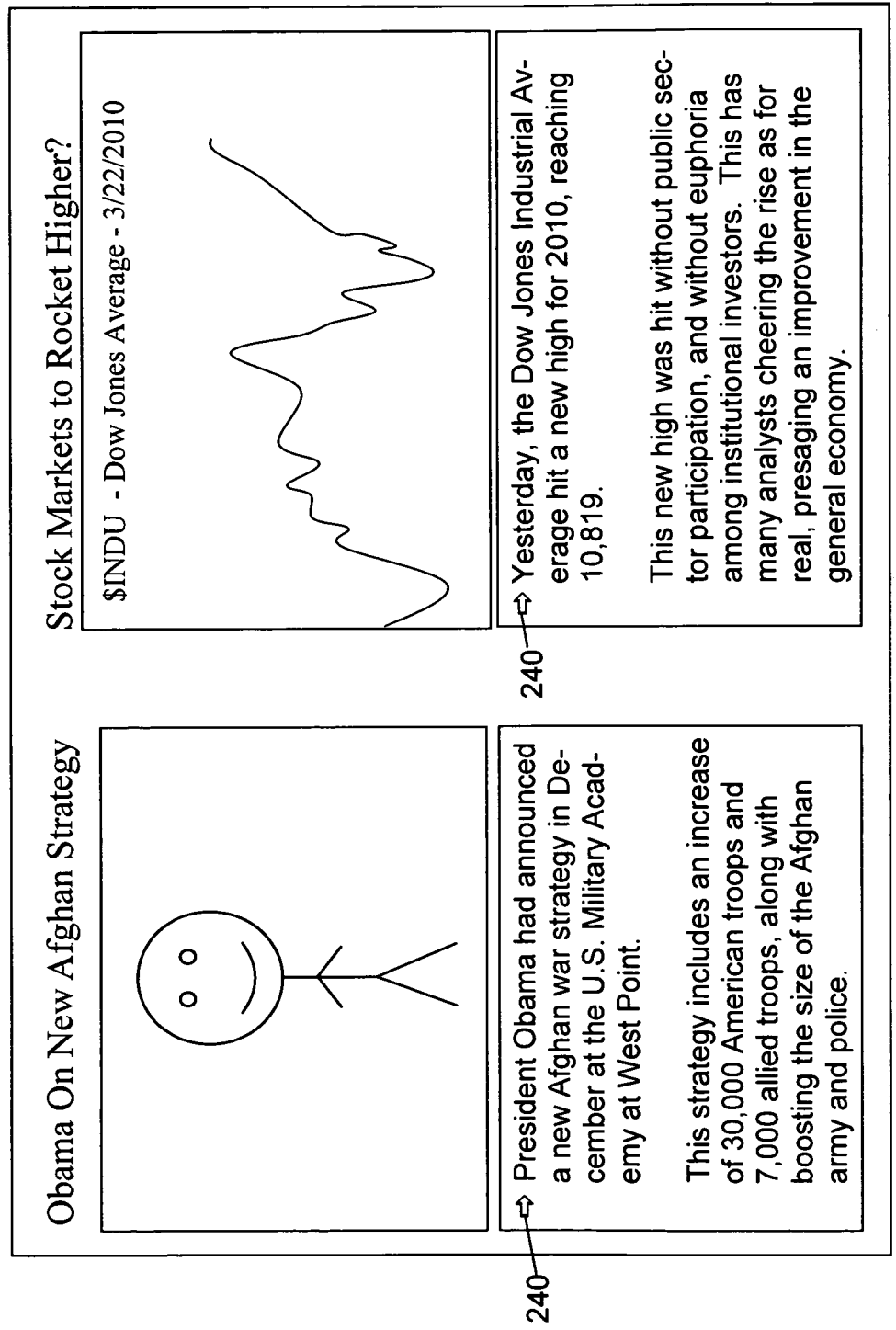
FIGS. 23 and 24 jointly illustrate how media for one article currently being reviewed by the user can change while media associated with another article within the same newspaper presentation remains unaffected.
Figure 24:
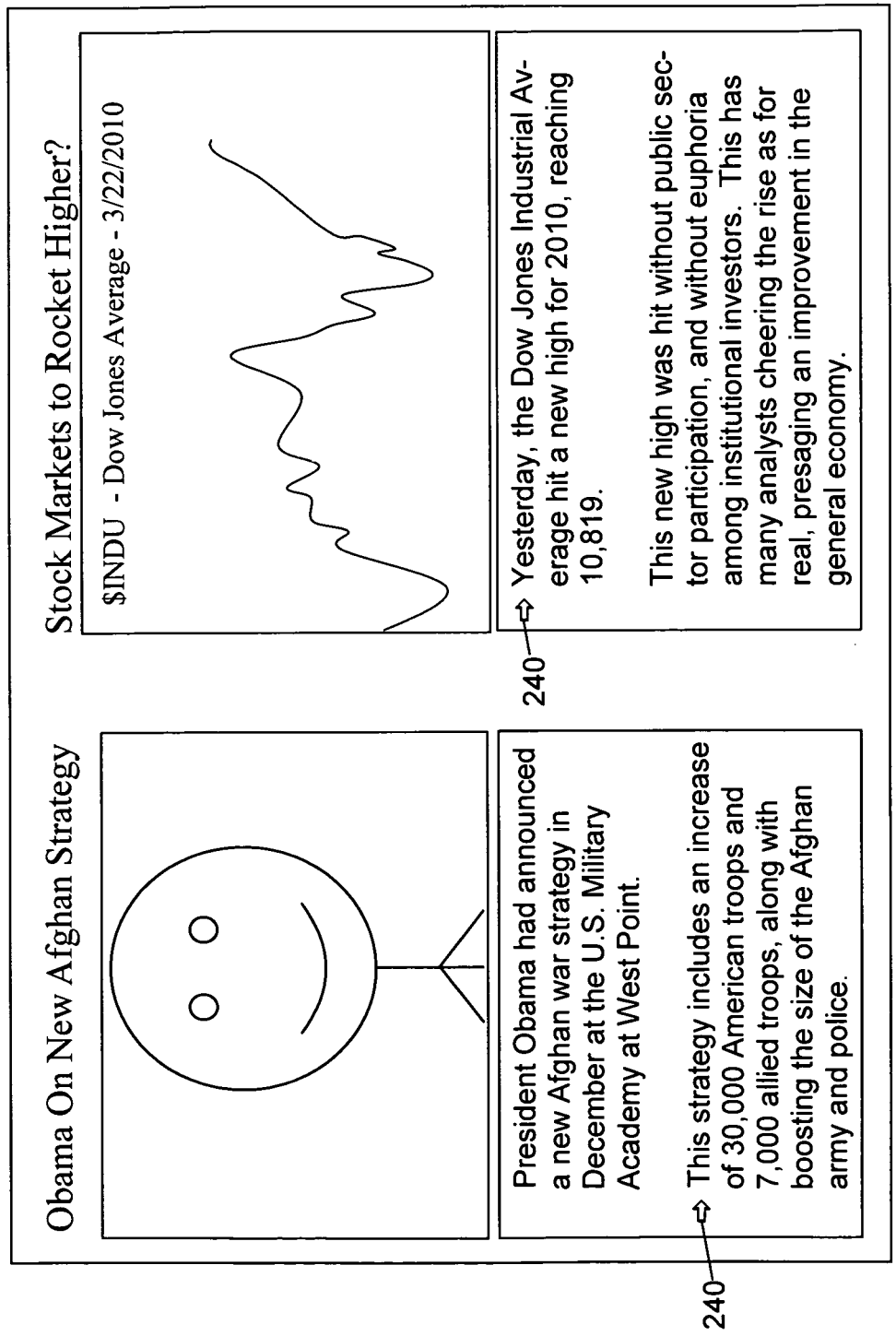

Yet another variation on FIG. 8 is to display a visual media presentation 260 that is surrounded by text on most sides, or even on all sides. This is similar to how photographs are often presented in print newspaper stories. Only, in this computerized variation, and similar to the various embodiments detailed herein, the visual media presentation 260 surrounded by text on all sides changes as the user reviews the related text. As with the prior examples, this can be accomplished manually through the various computer-implemented methods and computer program products described in this patent application, or it can be accomplished automatically via eye-tracking or other body-tracking components. As well, in this combined presentation of multiple articles, scrolling down one article can change graphics associated with the chosen article while unaffecting graphics associated with unrelated articles; in this instance, using an electronic touch screen control (among other choices) would allow the user to affect the text and graphics for one article while unrelated text and graphics remain static on the electronic display page. FIGS. 23 and 24 jointly demonstrate how related media content changes for an article currently being read about President Obama (causing the Obama video to zoom-in), while related media content for a second article presented in the same electronic newspaper remains unaffected. Note the changed position of the Obama article's cursor 240 in FIG. 24, which helped to cause the change in the presentation of the related media content.

Moreover, multiple articles on the same electronic page can even utilize the same related media content display 260 for presenting their corresponding media, leading to a unified "electronic newspaper" presentation containing several or even numerous articles.

Figure 9:
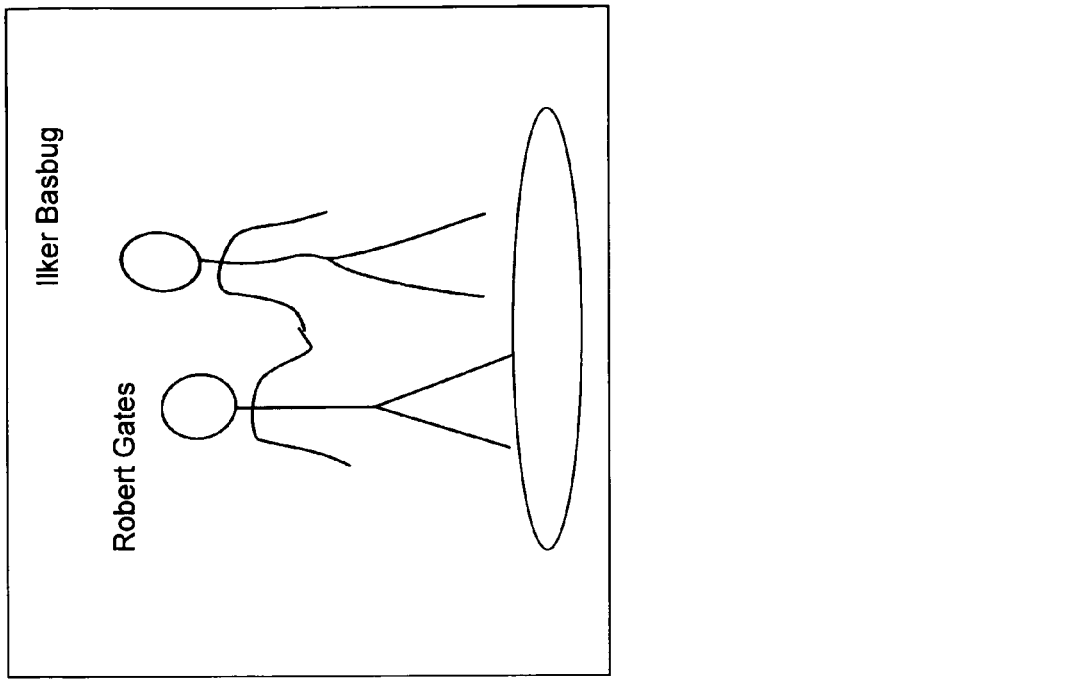
FIG. 9 illustrates one way in which to integrate additional story headlines into the various embodiments detailed herein.

FIG. 9 illustrates one way in which publishers and aggregators can integrate additional article titles or news headlines into the framework for the various embodiments described. While this integration is depicted in the alternative embodiment style that matches FIG. 8, additional article titles and headlines can likewise be integrated in the other preferred and alternative embodiment styles detailed herein.

In the example shown in FIG. 9, note that the various articles are listed in an article headline display 910, and that the article headline for "Gates in Istanbul for Afghan Talks" 920 is currently differentiated through bolding. In turn, if the reader were finishing reviewing this article and desired instead to review the article entitled "Electronic Book Sales Soar 150%" 930, then selecting that title would cause the text for that article to appear along with related media content that corresponds to a first presentation of that same article. The corresponding visual or audio media can subsequently change when the user selects the next select segment of text within the "Electronic Book Sales" article 930, in the same manner as the previously described examples.

Figure 10:
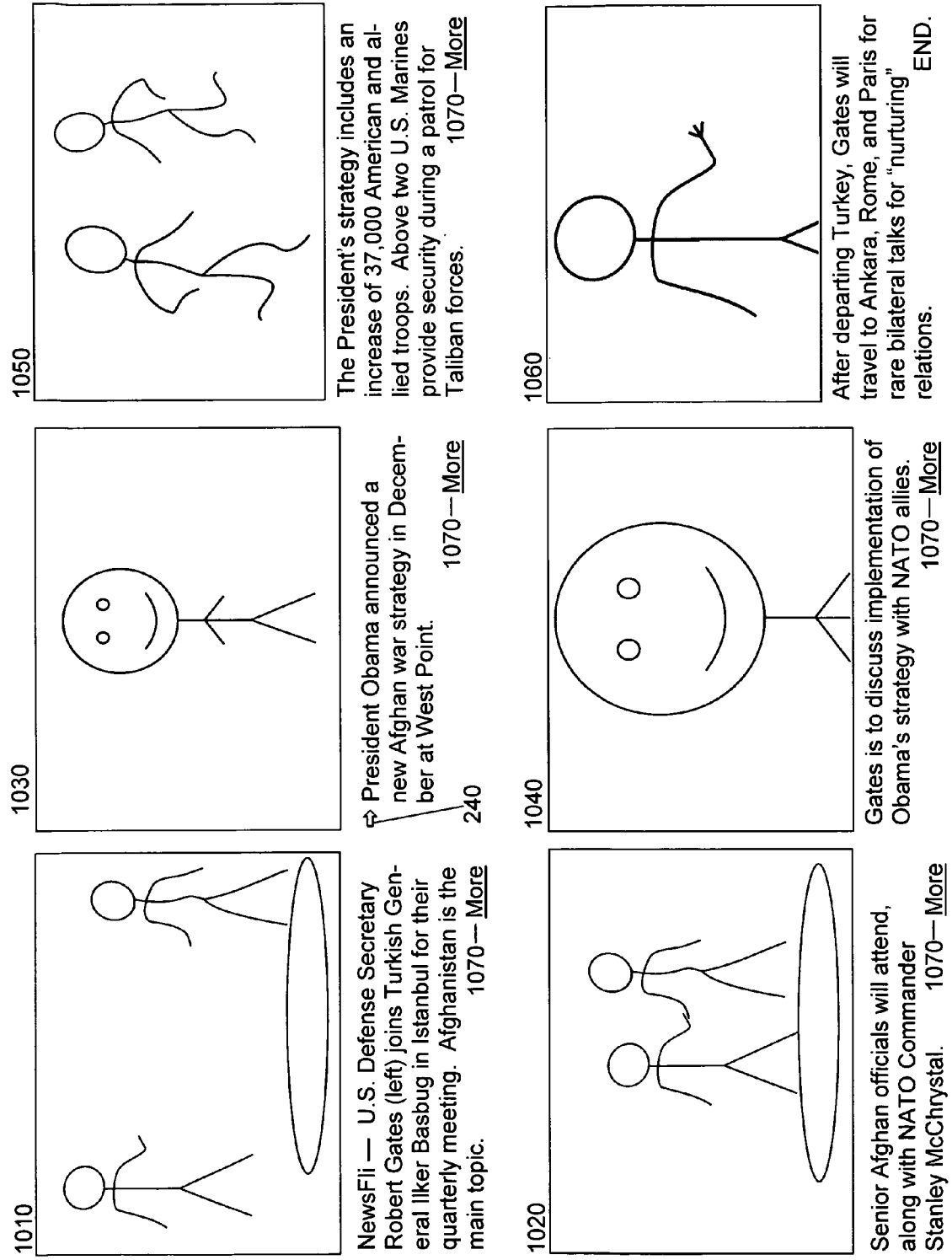
FIG. 10 illustrates a series of synchronized multimedia presentations. This series can be readily adapted to several of the embodiments described herein, though this series is particularly useful for demonstrating how synchronized news and informational content can be implemented, for example, on a smartphone or a tablet computer. Most importantly, this series shows how successive photographs, videos, or other graphics can be modified in a variety of ways as the user advances from one select segment of text to the next.

The FIG. 10 illustrations of six screenshots help to provide a visual overview of the synchronized article process. The article depicted in FIG. 10 has been abbreviated to conserve space in this patent application, yet longer articles can easily follow the same process. FIG. 10 shows how multimedia components can change in a pleasing and coherent manner in association with the presentation of related text for a single article. This particular overview also shows how the embodiments detailed herein can work especially well with smartphones and tablet computers. The first display 1010 in FIG. 10 represents a video of Defense Secretary Gates walking toward a Turkish General. The second display 1020 brought on by a changing of presented text shows the same video, but with Gates now shaking hands with the Turkish General. The third display 1030 switches to a completely new presentation, a photograph of President Obama. The fourth display 1040, likewise brought on by a changing of text, zooms in on that same photograph of Obama. The fifth display 1050 then switches to a photo of U.S. Marines on patrol in Afghanistan, while the sixth and final display 1060 shows a video of Gates waving goodbye, symbolizing his upcoming departure from Turkey in order to travel to Europe.

Note that the text scrolling functions detailed above can be incorporated into current smartphone and tablet computer "touch screen" technology. As a result, the text can be "pushed up" or "pulled down" or "dragged from the side" in the display page by the user's finger or a stylus (via the previously defined "maneuvering of said electronic touch screen control"), thereby causing the presentation of the changed components of related media content. Or the user can make use of optional "more" hyperlinks 1070 to cause the text to change completely. Alternatively, the presenting of text can be accomplished in one of the other manners described in this patent application. Relating to this presentation, a text cursor 240 is depicted in the third display 1030 in FIG. 10 to help show the user which line of text matches the current related media content presentation.

In addition, the visual media displayed in FIG. 10, as well as the media content displayed in the other preferred and alternative embodiments can change in a slow, flowing manner, or it can change in a more abrupt way, or both. For instance, in FIG. 10 the transition from the first display 1010 to the second display 1020 can be controlled in a slow, flowing manner no matter how fast the user scrolls down from the beginning of the first segment of text in the first display 1010 to the end of the second segment of text in the second display 1020; conversely, the display can be designed to match the speed of the video with the scrolling speed implemented by the user. So, if the user scrolls (or reads) quickly, then the video images can accelerate to match. Or, in that same situation, the video can instead be designed to skip to a next predetermined scene. Or the video can be converted to a still photograph or other presentation until the user scrolls to the third display 1030. The publisher or aggregator has the benefit of being able to choose from many presentation options using visual images and other media while still adhering to the core of the unique embodiments detailed herein.

Figure 11:
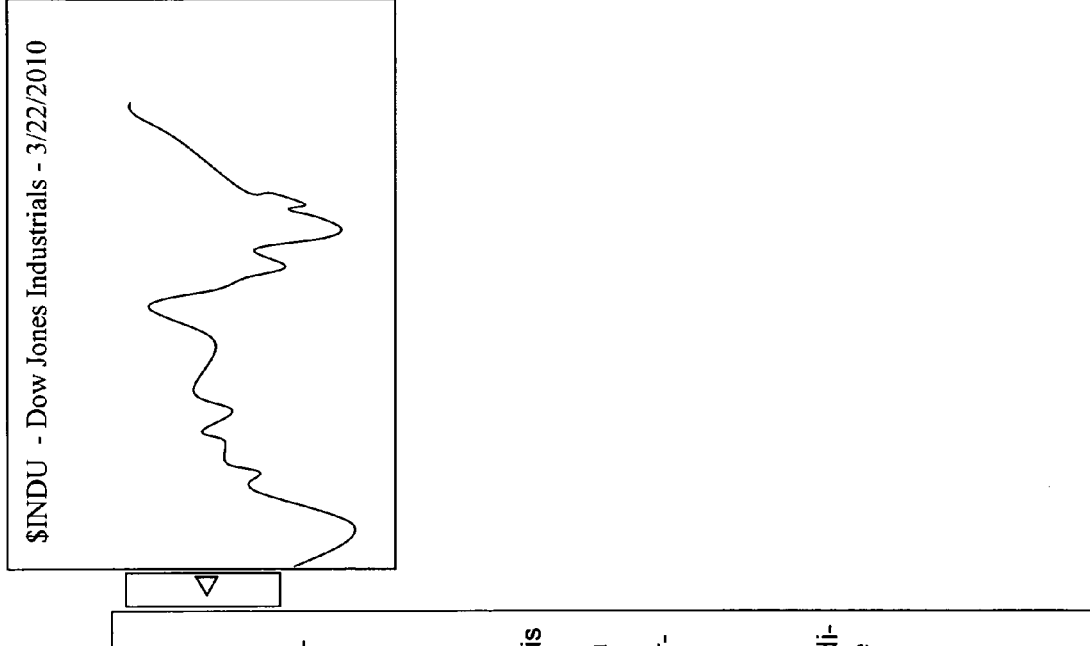
FIG. 11 illustrates how financial charts and other financial graphics can be synchronized with select text in a financial news story. This synchronizing of financial graphics can be applied to any of the embodiments detailed herein.

The FIG. 11 illustration of a screenshot shows how the preferred and alternative embodiments described previously can be used in a beneficial manner to present financial news stories and financial informational articles. The financial news story in the FIG. 11 example begins with a first presentation of multimedia 260 corresponding to a first select segment of text 250. That first presentation of multimedia 260 is a stock market chart of the Dow Jones Industrial Average as of Mar. 22, 2010. That first select segment of text 250, in turn, discusses how the Dow Jones has hit a new high for 2010.

As the user reviews additional segments of text, the stock market chart is able to likewise change to better match the text currently being reviewed. And so we come to the FIG. 12 computerized display, where the same article continues by discussing how one analyst argues in the third financial segment of text 1210 that a breaching of the current uptrend line will cause the Dow Jones Industrial Average to plummet, challenging the 6,469 level last seen in March 2009. In turn, the accompanying financial graphic within FIG. 12's multimedia presentation 260 depicts a chart similar to FIG. 11, but now with a trendline 1230 drawn to match the analyst's discussion, along with a dotted line 1240 representing a hypothetical future path for the Dow Jones Industrial Average. As with the prior photographic, video, and audio examples, the dynamically-changing financial chart depicted in this article shows the possibilities for a vibrant way to present news and informational content. Moreover, these dynamically-changing financial charts can be presented in any of the preferred or alternative embodiments detailed herein, and not just in the embodiment depicted in the FIGS. 11 and 12 examples.

Figure 12:
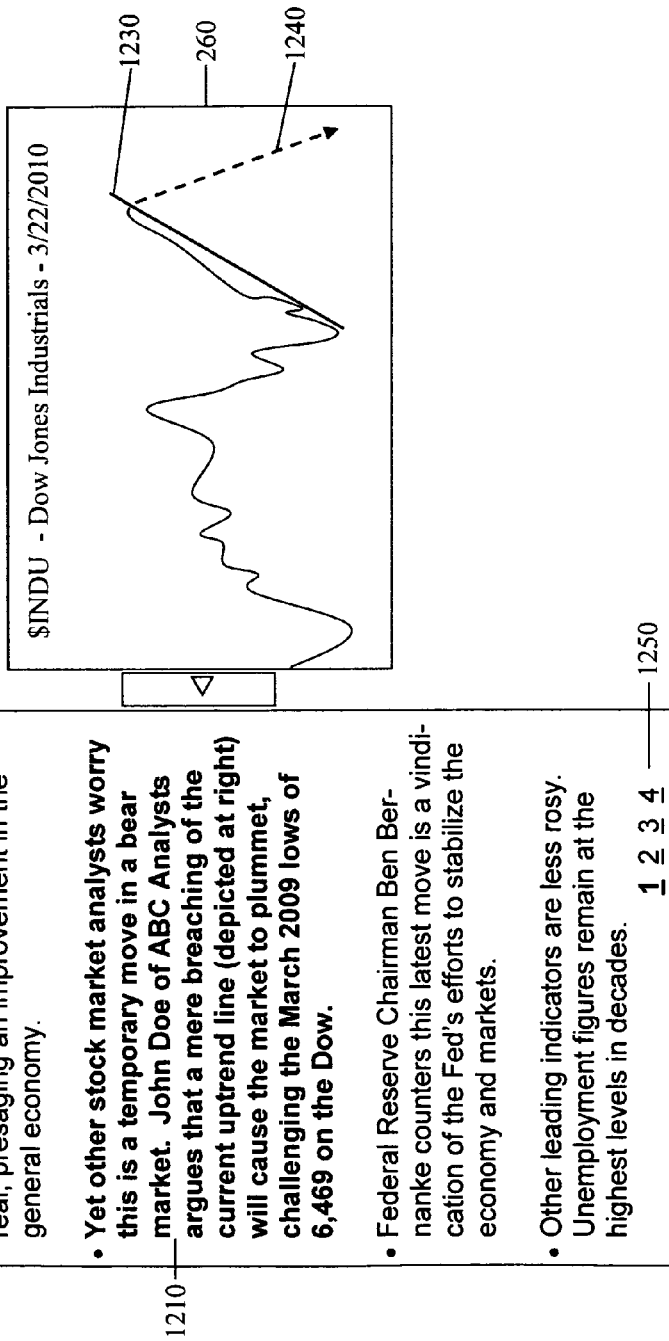
FIG. 12 illustrates the choosing of the third select segment of text in the financial news story, and how that modifies the original financial graphic presented in FIG. 11.

FIG. 12 also depicts a conventional way to continue onto a next presentation of the primary body of text. In this case, it shows traditional page numbers 1250 that the user can select to advance from the current page one to a later page. Selecting these other pages similarly leads the user through a synchronized presentation of multimedia content.

Figure 22:
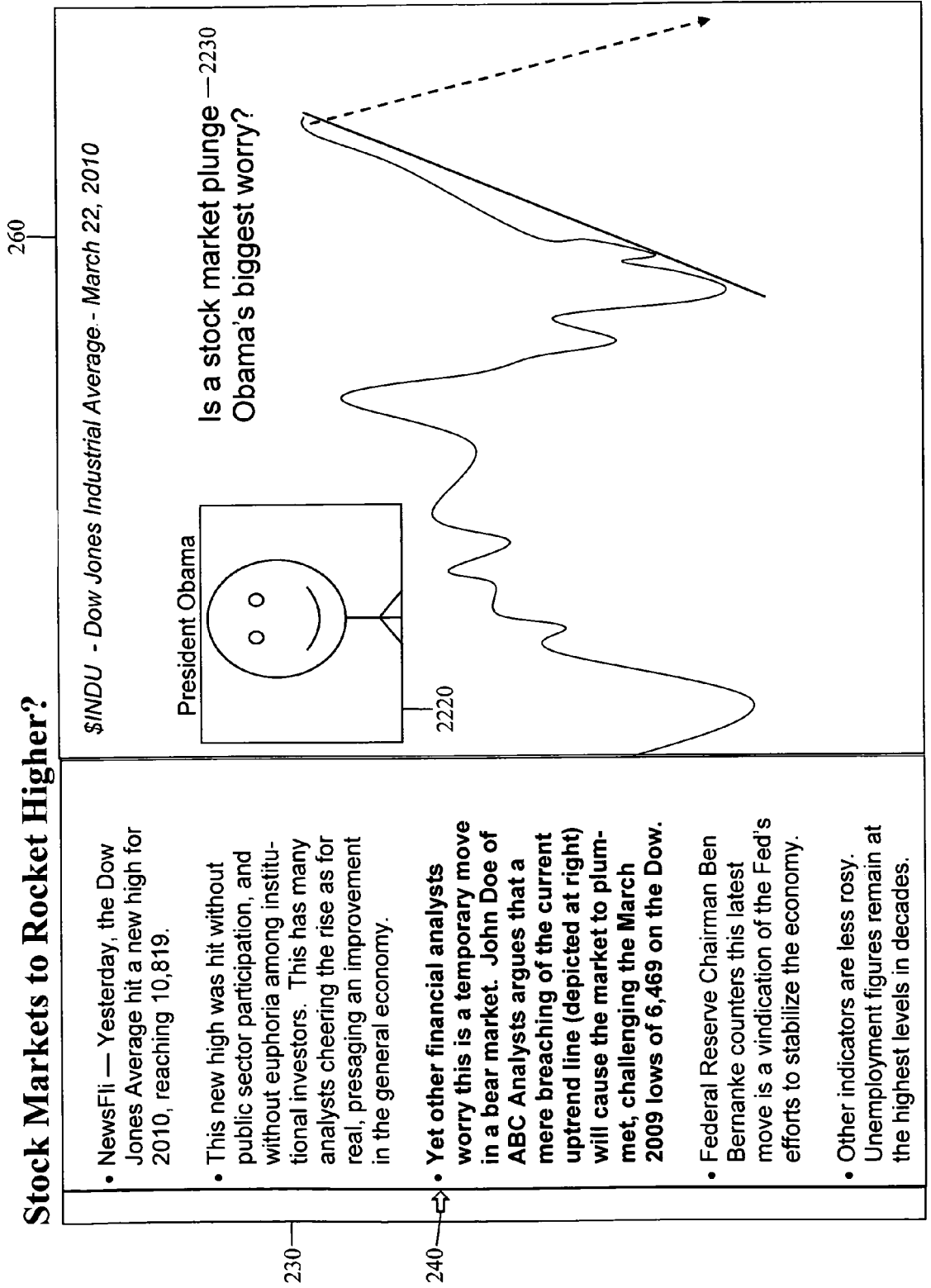
FIG. 22 depicts one way in which to incorporate financial charts into the first preferred embodiment.

Skipping forward for a moment, FIG. 22 shows one way in which the first preferred embodiment can be utilized to present financial news articles containing financial charts and other financial graphics. This particular illustration is a substitute way of displaying almost the same information as is depicted in FIG. 12, except that this example also incorporates into this multimedia presentation 260 a depiction of a photograph 2220 and related text 2230. This illustration helps to show the myriad possibilities for mixing and matching media in financial presentations as well as other presentations.

Figure 13:
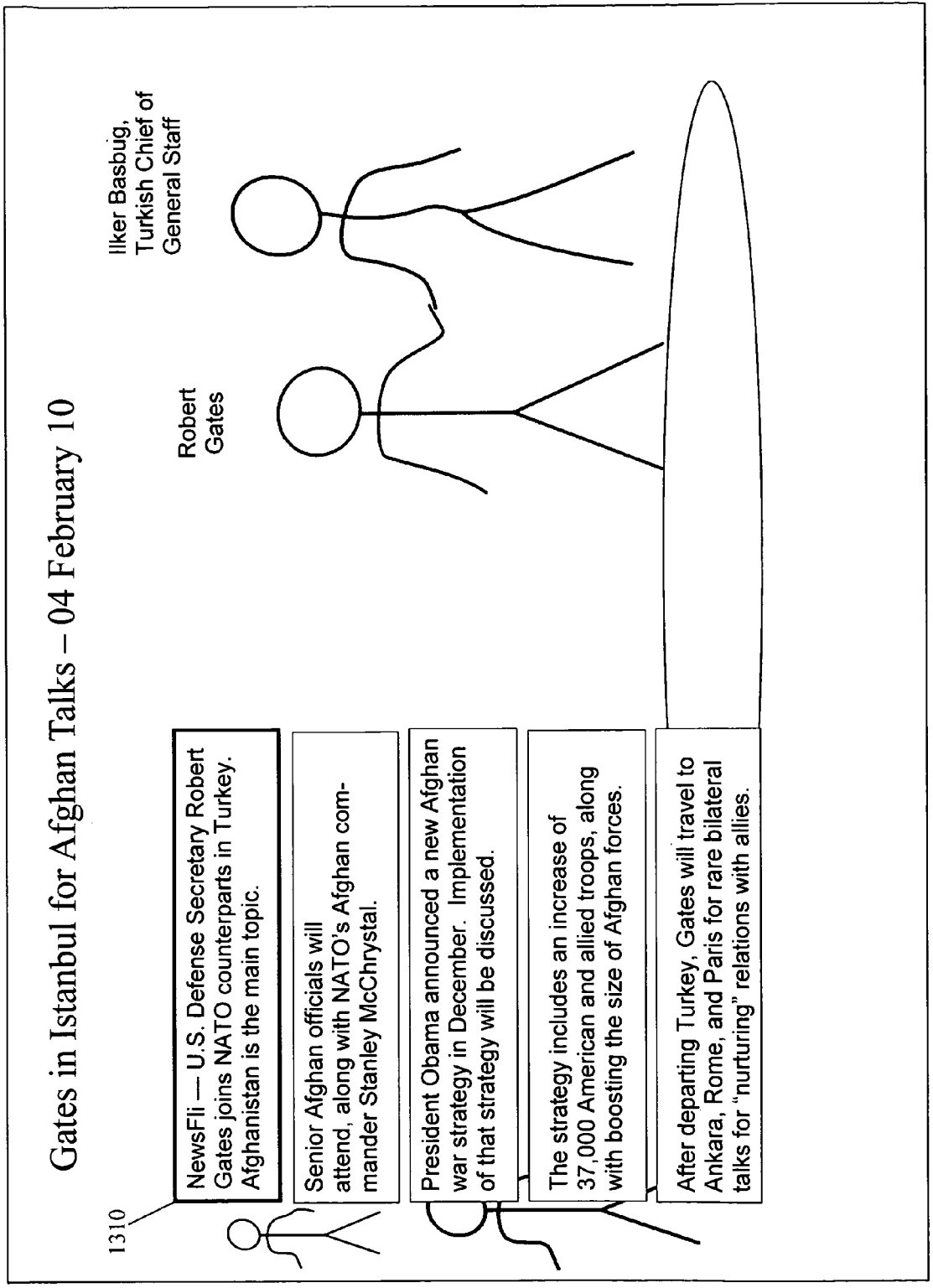
FIG. 13 illustrates a version of the same first article wherein the primary body of text and the multimedia control are placed within the frame of the visual media display and in which the text is separated into distinct segments, each of which can be individually selected by a user to cause a new presentation of multimedia.

FIG. 13 is a variation on the first preferred embodiment, with the article further abbreviated for patent purposes. In this illustration of a screenshot, the primary body of text is divided into detached segments, with each segment able to be activated through the multimedia control. For example, clicking a cursor on the first detached segment 1310, or a later segment, causes a presentation of a visual image that is associated with the chosen segment. Optionally, the presentation of select types of media, such as video, can be timed to match how long it would take for that user, or a typical user, to read the corresponding chosen segment of text. Note that the outline for the first detached segment 1310 is currently bolded to let the user know that the visual media shown (along with any other audio, tactile, or other media presented) matches that particular segment.

Figure 14:
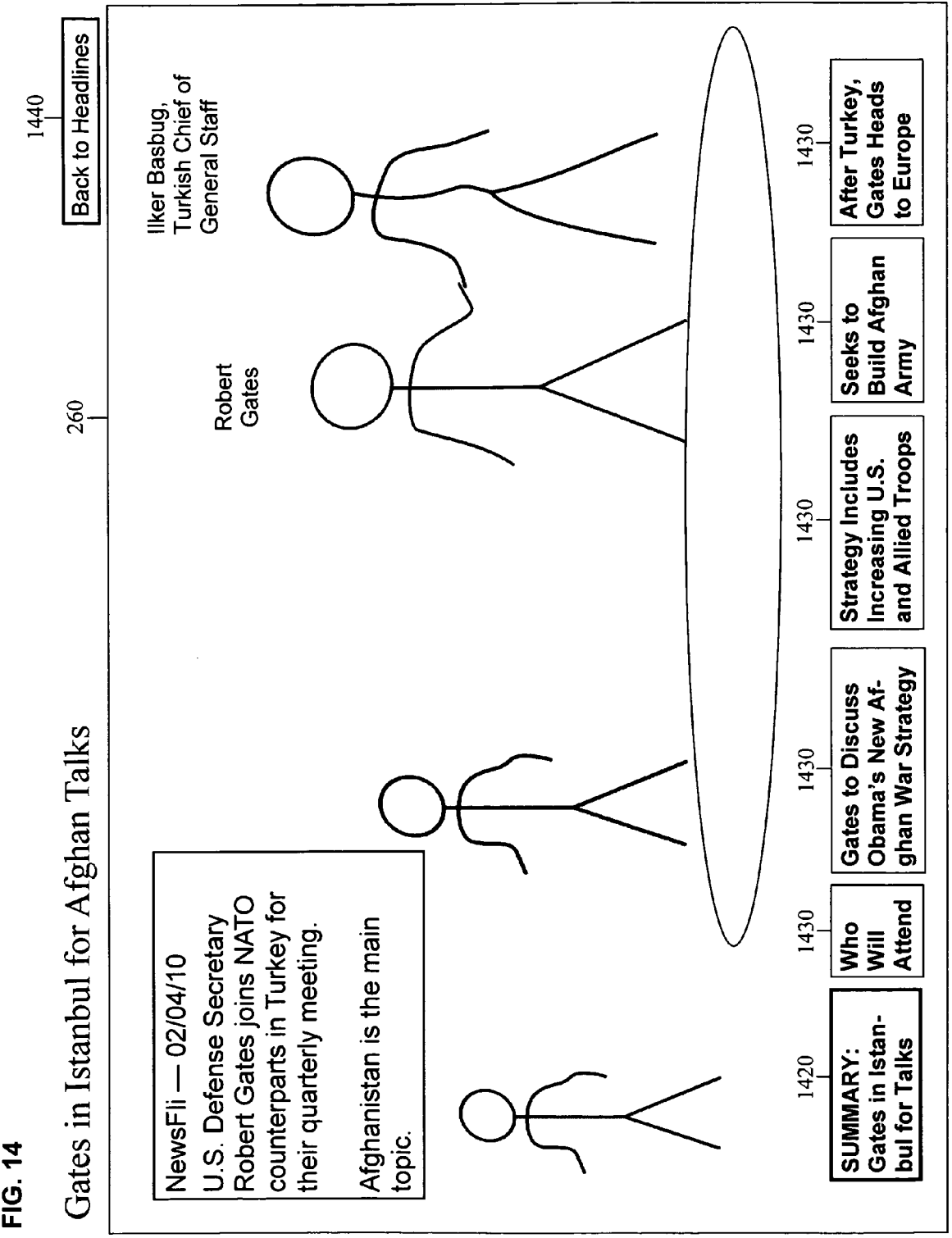
FIG. 14 illustrates a combining of the storybook design with "sub-headline" controls that serve as an interactive outline for the article. This combination enables the user to read the story linearly or in any order so desired.

FIG. 14 illustrates another alternative embodiment incorporating the previously-discussed "storybook format." Only this embodiment combines the storybook format with interactive sub-headline controls 1420/1430 (a component of multimedia controls) that enable the user to quickly review sections of the article in a non-linear manner. In FIG. 14, the summary 1420 is the current section displayed for the given article. The summary's control 1420 is bolded in this illustration to let the user know this is the current section being reviewed. While the user can likewise achieve the same goal of quickly reviewing sections in a non-linear manner by scrolling to desired sections via the second preferred embodiment (as was depicted in FIGS. 6 and 7), the format depicted in FIG. 14 allows for an alternative means of skipping from one subject matter to another subject matter within the particular article. In turn, the multimedia presentations 260 accompanying each section within this article in FIG. 14 can still be presented in a linear manner within the overall non-linear presentation.

FIG. 14 depicts one other feature that can also be applied to the other embodiments outlined herein. A "Back to Headlines" control 1440 can lead the user back to a list of other news story headlines (or informational article titles), assuming those headlines aren't presented on the same display as the article currently being read by the user.

Figure 15:
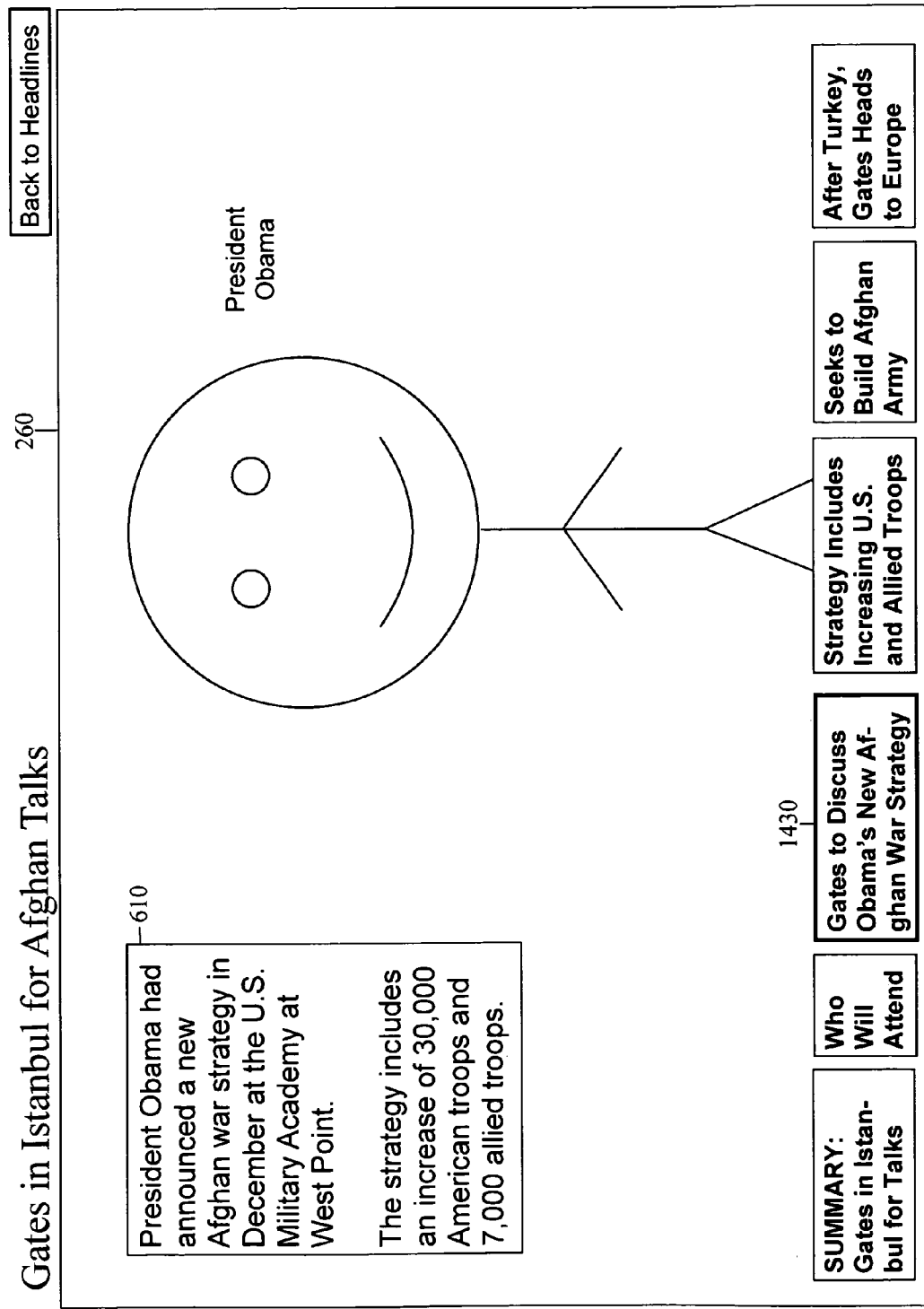
FIG. 15 is a continuation of FIG. 14.

As a follow-up to FIG. 14, FIG. 15's illustration of a screenshot shows the user's having chosen the third segment's sub-headline control 1430 within the same news story, about President Obama's Afghan strategy. This causes a new multimedia presentation 260 to be displayed that includes a video of Obama delivering a speech, coupled with a related segment of text 610 presented in the same storybook format.

Figure 16:
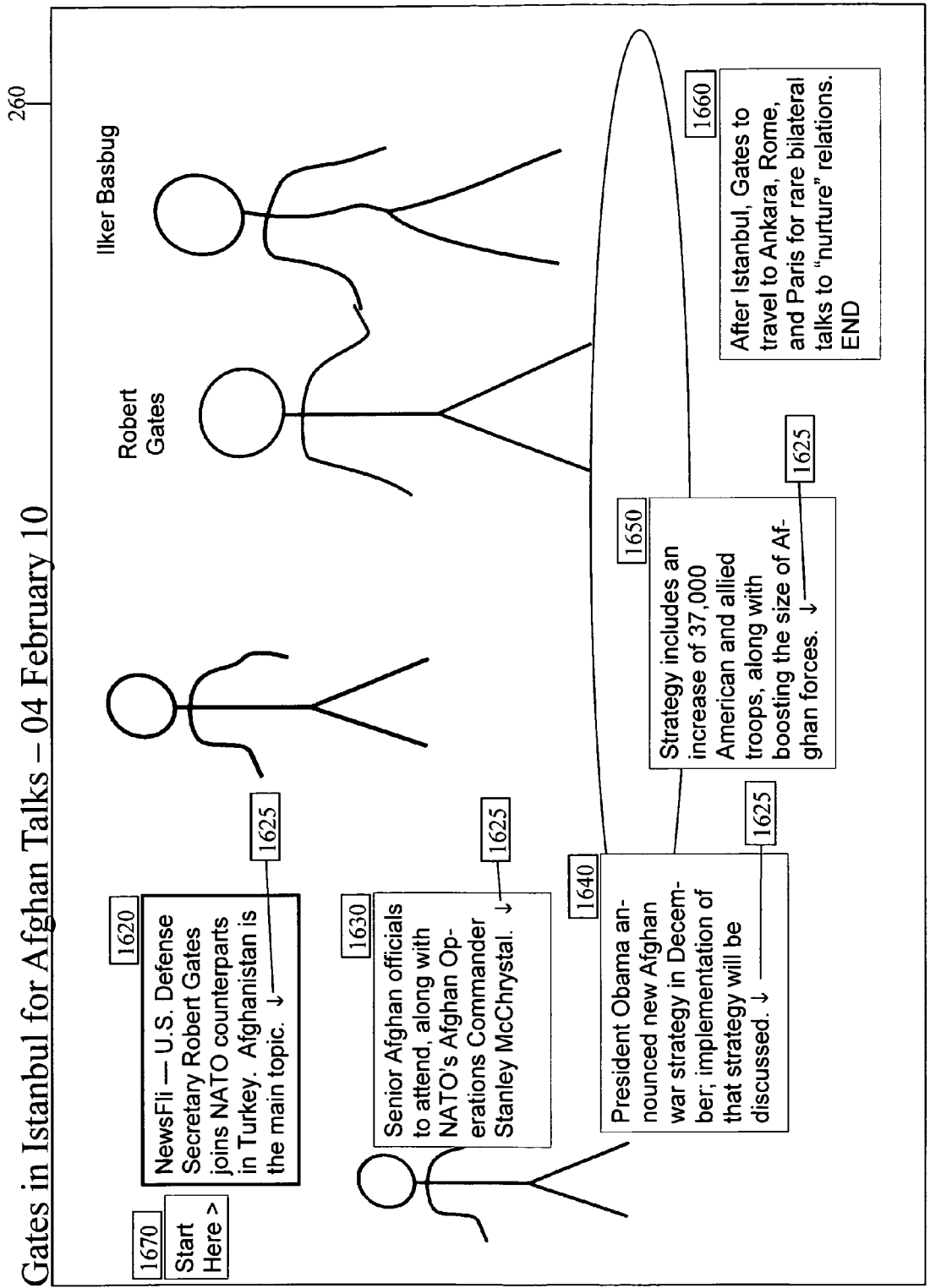
FIG. 16 illustrates an alternate way to incorporate text boxes into the synchronized presentation of multimedia content.

FIG. 16 shows how a different version of the "storybook format" can be integrated into the synchronized article computer-implemented methods and computer program products previously described. If desired, FIG. 16 can begin with an initial presentation in which only a sole segment of text 1620 is displayed, along with the accompanying related media content display 260. Within that initial presentation, a control arrow 1625 or other such control can be presented that allows the user to select the display of a previously hidden second segment of text 1630. Accompanying the presentation of the previously hidden second segment of text 1630 is a changed presentation of related media content. Moreover, within that second presentation, a control arrow 1625 or other such control can likewise be presented that allows the user to select a previously hidden third segment of text 1640 and its associated related media content display, with this process able to continue until the user has finished reviewing the particular article. FIG. 16 shows five different segments of text able to be displayed to complete the article. In turn, if desired, prior segments displayed can be hidden upon presentation of any current chosen segment of text. In addition, in lieu of having the control arrows 1625 contained within each segment of text, the control arrows 1625 or other such controls can instead be presented elsewhere in the display. As another approach, all five segments (1620, 1630, 1640, 1650, and 1660) can be displayed upon initial presentation of the article, with the user's "activation" of any segment causing the presentation of illustrative media associated with that particular segment; in this latter example, a "start here" indicator 1670 or the equivalent can guide the user to the first of the five segments presented.

Figure 17:
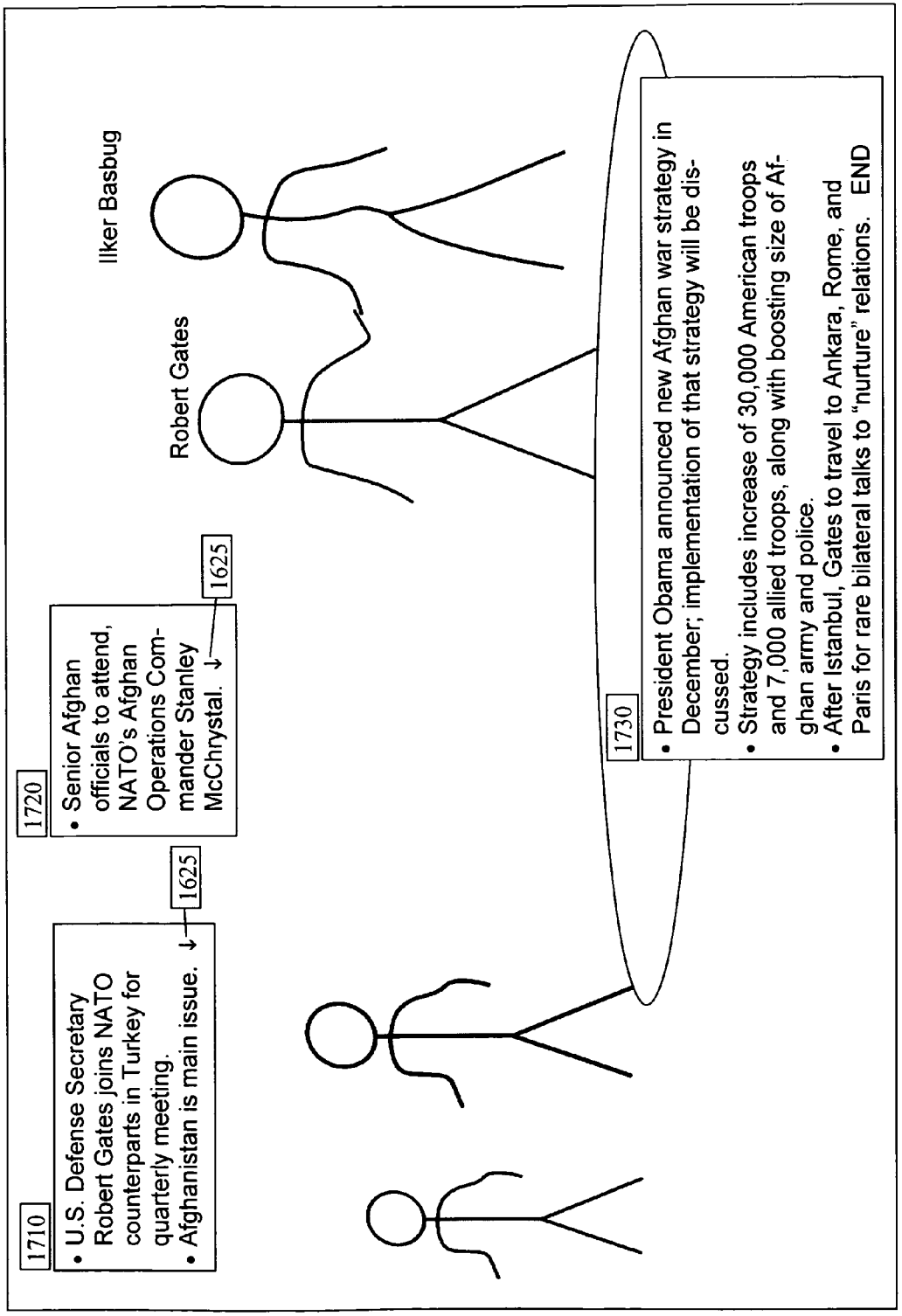
FIG. 17 is a variation of the embodiment depicted in FIG. 16.

FIG. 17 is a variation of the embodiment shown in FIG. 16. In this depiction, the same article is broken into three bulleted segments (1710, 1720, and 1730), while the control arrows 1625 remain the same.

Figure 18:
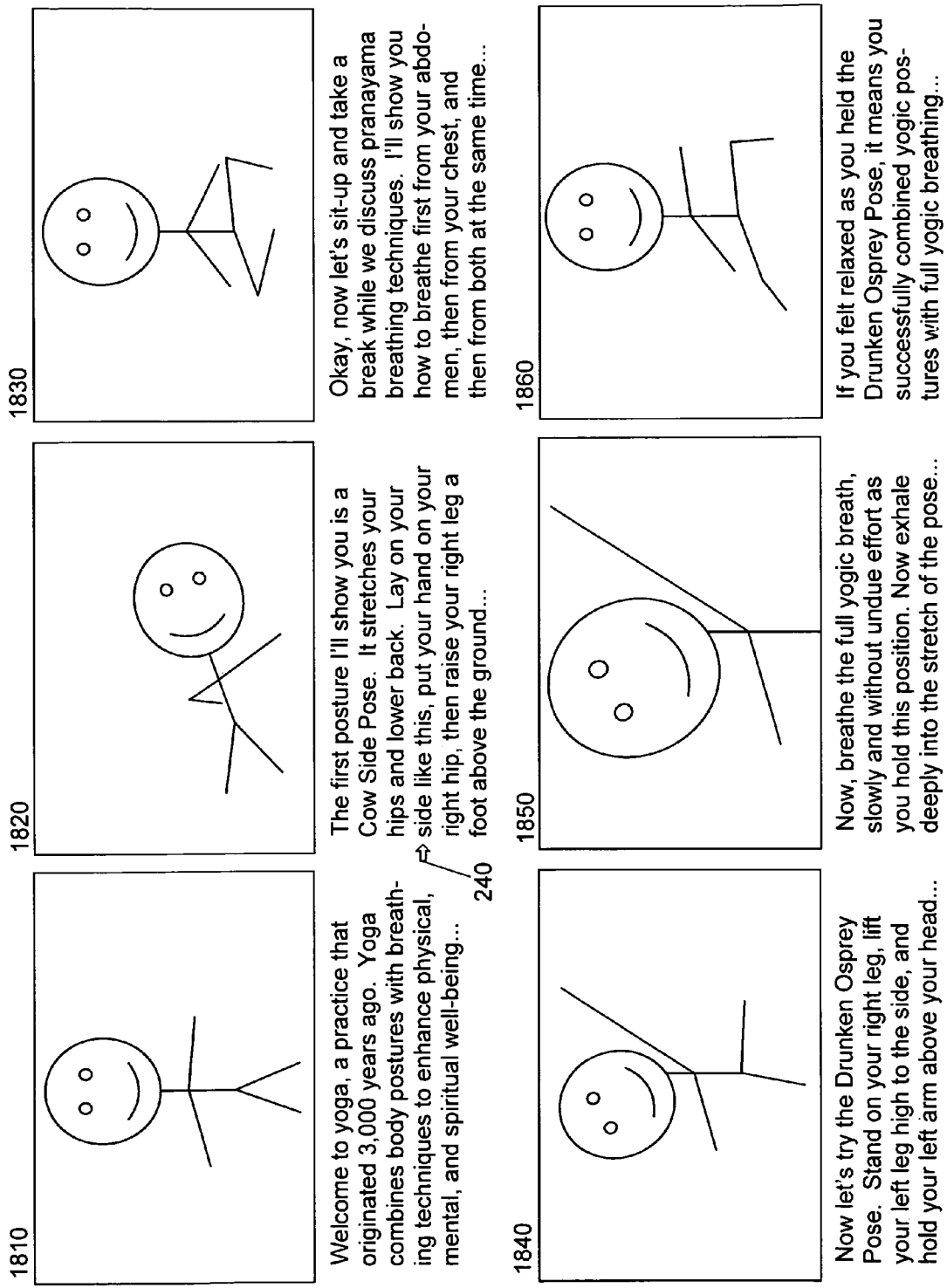
FIG. 18 depicts a series of progressive visual and audio media presentations that could accompany a written informational electronic document about how to learn yoga.

The FIG. 18 illustrations of screenshots demonstrate one way in which the various embodiments detailed in this patent application can be applied to informational articles, including "how to" articles and other instructional presentations. In the six illustrative panels displayed in FIG. 18, a yoga teacher is represented. The teacher is showing users how to perform various physical poses. The first informational article display 1810 includes an initial representation of a photograph of the teacher; text accompanying that photograph introduces the subject of yoga to the reader. The second informational display 1820 includes a representation of a video of the teacher showing her body twisting into a first yoga pose, while the accompanying text further explains how to hold the pose. The third informational display 1830 shows a photographic representation of the teacher taking a break while using the text to expound upon yogic breathing techniques. The fourth informational display 1840 shows a photo representation of the teacher in a second pose, while the fifth informational display 1850 shows the same photo, but with a close-up of the teacher in that same second pose. The sixth and final informational display 1860 shows a silent video representation of the teacher as she discusses in the text how yogic breathing leads to a relaxed state even as a practitioner simultaneously contorts her body into a challenging yogic posture. Each of the depictions in the aforementioned displays can be comprised of any combination of photographs, videos, graphics, audio, text, or other media. As with FIG. 10, in FIG. 18 the presentation of a visual image such as a photograph or video can change, for example, as the user reviews the text line by line—or even word by word, or letter by letter—allowing the related media content to match the corresponding written article; as in FIG. 10, the cursor 240 depicted in the second informational display 1820 of FIG. 18 helps to confirm for the user the line of text that matches the current supportive media presentation, though other indicators can instead be used. Also similar to FIG. 10, the visual media displayed in FIG. 18 can change in a slow, flowing manner, or it can change in a more abrupt way, or both. Note that the text presented in the six illustrative panels in FIG. 18 is highly abbreviated due to space limitations in this patent application. However, the point of FIG. 18 is to show that, as with the news story, an informational electronic document (such as an article or an ebook) can be adapted to work with the various preferred and alternative embodiments explained in this patent application.

Figure 19:
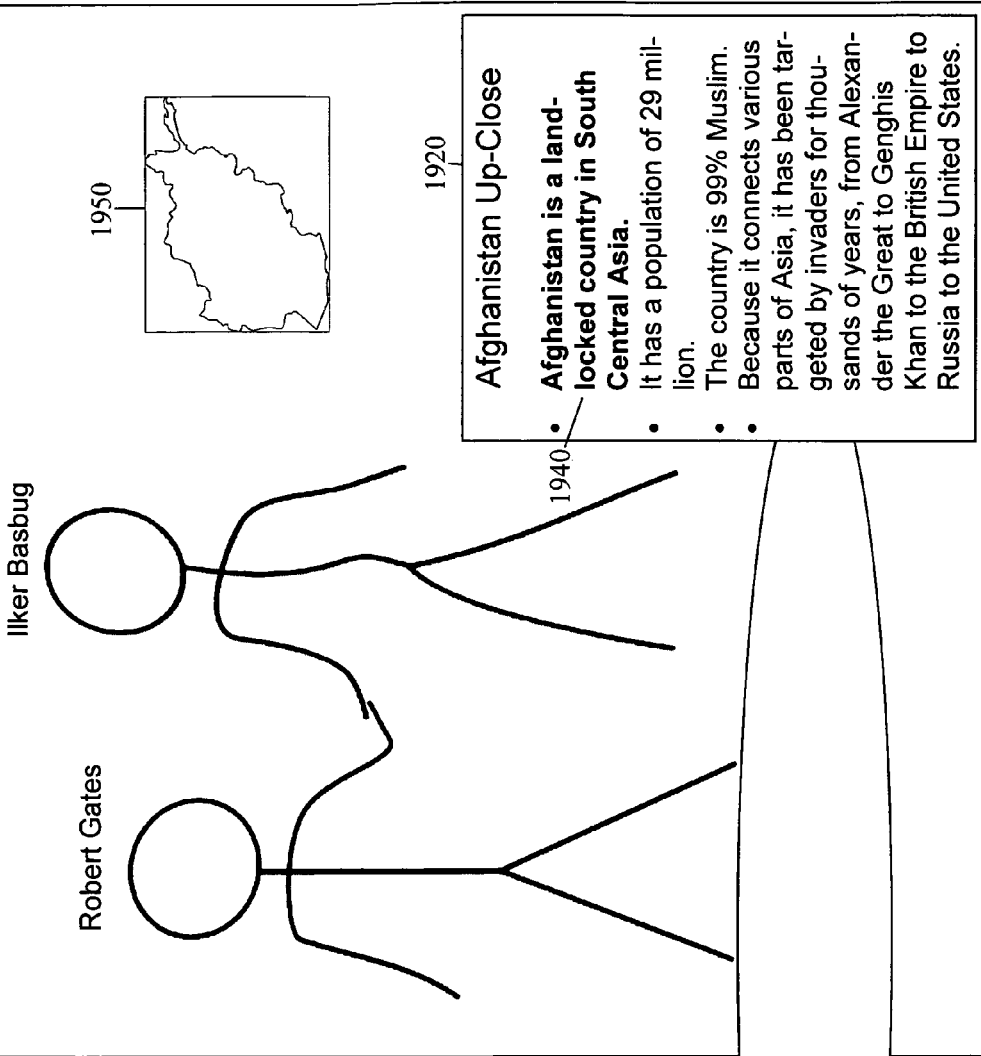
FIG. 19 illustrates how to incorporate a sidebar story into the main story, including allowing the sidebar story to change visual (or other) media, or even to change content in the primary body of text.

The FIG. 19 illustration of a computerized display shows how to integrate a sidebar article 1920 into an overall news presentation that includes a primary body of text 220. Moreover, the sidebar article 1920 can be configured to itself contain select segments of text that, when chosen by the user, lead to the presentation of additional related media content. That additional media can augment or even replace the media presented by the user's selection of a select segment of text in the primary body of text 220. Or select segments of text within the sidebar article 1920 can even cause the content in the primary body of text 220 to be changed. In the example depicted, after the user selected the second segment of text 1930 in the primary body of text 220, the previously hidden sidebar story 1920 was presented. The user then proceeded to select the first segment of text 1940 in the sidebar story 1920, which then caused that first segment of text 1940 to be differentiated by bolding; it also caused a new presentation of a map of Afghanistan 1950 to be displayed. This new presentation of the map 1950 occurred within a multimedia presentation that was already displayed as a result of the user's earlier selection of the second segment of text 1930 within the primary body of text 220.

FIG. 19 also shows an alternative to the scroll bar 230 and cursor 240 controls that have been described earlier. In this particular illustration, the scrolling control 1960 is placed within the primary body of text 220, and the user simply moves the scrolling control 1960 up or down over the text to cause the presentation of the multimedia corresponding to each select segment of text. In the FIG. 19 screenshot, the scrolling bar 1960 is currently hovering over the second segment of text 1630 labeled "Afghanistan is the main topic." This scrolling alternative, or another such scrolling alternative, can be utilized in conjunction with the various preferred and alternative embodiments described in this patent application.

Also related to FIG. 19, multiple sidebar articles can be presented within a particular news story, with the choosing of select text in one sidebar able to change the content in select other sidebars presented.

Figure 20:
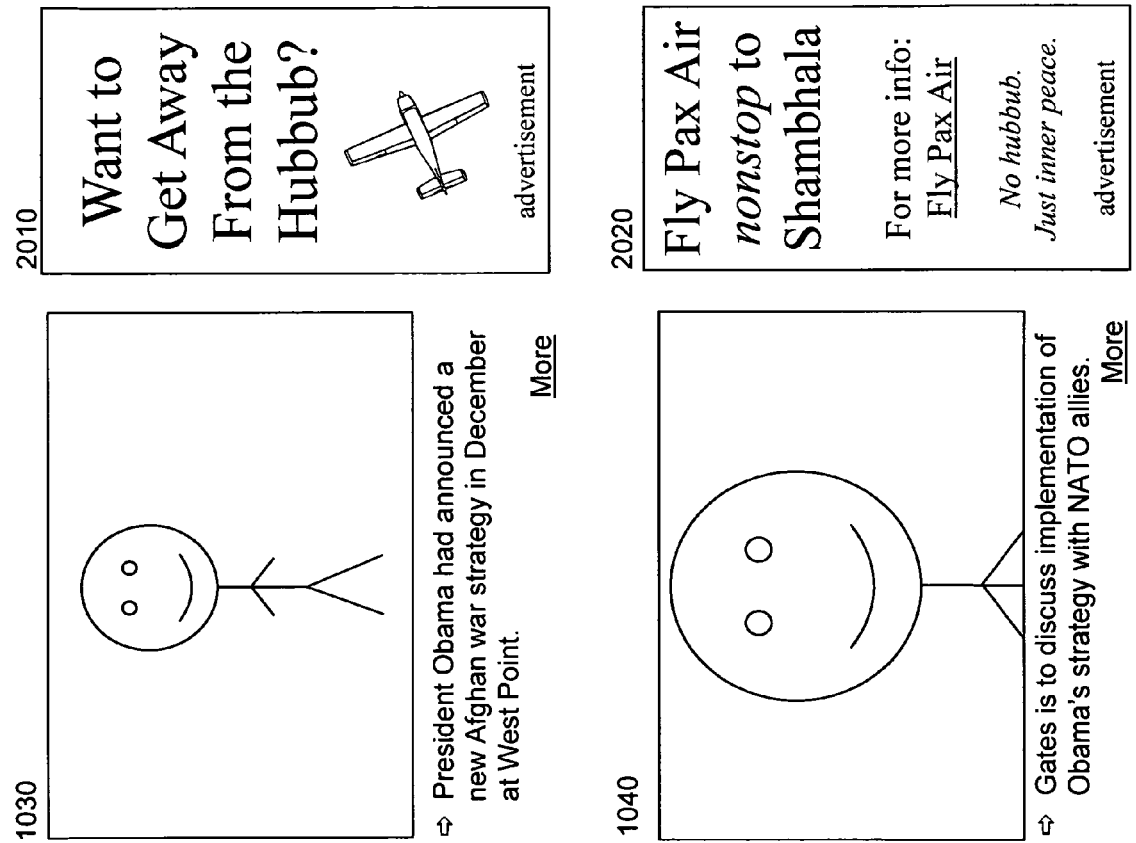
FIG. 20 illustrates how to present advertising in synchronization with a multimedia article.

Advertising can likewise be integrated into the various preferred and alternative embodiments in a helpful and unique manner. FIG. 20 shows the third display 1030 and the fourth display 1040 from the article previously depicted in FIG. 10. Only, in these two illustrations of screenshots, two panels of advertising (2010 and 2020) are presented, respectively, alongside the third and fourth displays (1030 and 1040). Therefore, while the text of the news story focuses on war strategies by President Obama in the third display 1030, the accompanying advertisement 2010, in a reference to the content of the adjacent display, asks the reader if they "Want to Get Away From the Hubbub?" As the user scrolls to the next display of text, not only does the visual media in the fourth display 1040 zoom-in on the photograph of President Obama, but the panel of advertising 2020 likewise changes to provide new information on specific airplane flights that can assist the reader to get away from the "hubbub."

Similarly, if a reader is reviewing text for a hypothetical article about treating skin problems, and the reader comes to a specific section of text focusing on dry skin, the associated advertisement for a line of skin treatments can likewise change to focus on dry skin (instead of on oily skin or normal skin). The changed advertisement could even, for instance, be a presentation of a coupon for a dry skin product. Alternatively, the publisher might have excluded advertisements altogether in the prior presentation, and only displayed a first advertisement about treating dry skin after the user chose the related segment of text.

Advertising can be presented in a synchronized manner in other ways as well. For example, advertising can be included inside the visual or audio media presentations of articles shown in the previous illustrations, with changed presentations of advertising presented in synchronization with the user's selection of a next select segment of text in a given news story or informational article.

Figure 21:
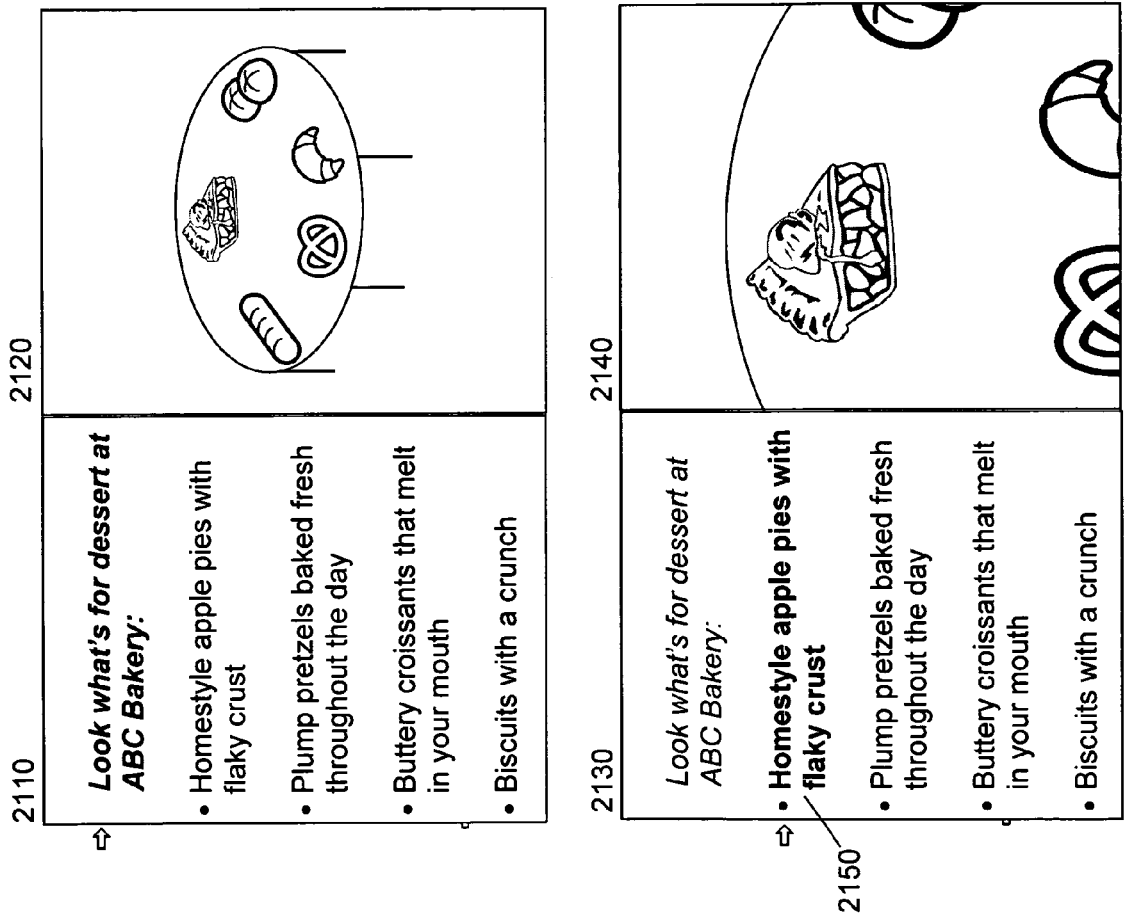
FIG. 21 illustrates presenting synchronized advertising as a stand-alone innovation.

As well, electronic advertisements can be presented independently of articles, utilizing this same synchronized article format. FIG. 21 depicts two screenshots of an advertisement for a bakery. The first text display 2110 lists the desserts available for purchase, while the first display's related media content 2120 shows a photo (or, alternatively, a video or other graphic) of a display table exhibiting the variety of desserts sold by that same bakery. Once the user scrolls or otherwise selects the next select segment of advertising text 2150 (focusing on homemade apple pies), as is shown in the second text display 2130, then the second display's changed related media content 2140 zooms in on that apple pie that was shown at a distance in the prior visual presentation. The user's selection of additional select segments of text can lead to additional changes in the presentation of associated media.

Synchronized advertisements such as that depicted in FIG. 21 can be designed using any of the preferred or alternative embodiments described in this patent application. Or those advertisements can also be designed as advertorials, allowing lengthier presentations of text to accompany the advertising.

Addressing another issue, in some cases these synchronized articles can incorporate a specialized computer memory (or "user profile") that remembers the user's record in reviewing previous presentations of synchronized articles. For instance, a user profile can remember whether a particular user enjoyed audio-visual presentations as they reviewed the associated text for news stories, or whether they instead choose to have the audio muted. As well, the user profile can record if the user preferred to see still photographs to accompany the related text or whether they preferred videos. The specialized memory can then lead to a computerized altering of the presentation of the article currently being reviewed to better match that particular user's past preferences. In addition, if so desired, the user can be asked their preferences directly, and those preferences are subsequently stored in the memory; future presentations of synchronized articles can then match those directly-stated preferences.

This computer-implemented method and computer program product relating to synchronized articles could additionally incorporate a variety of electronic games into the multimedia presentations of articles, including: anagrams, puzzles, clues, Mad Libs, Hangman, Tic-tac-toe, video game poker, Pac-Man®, Asteroids®, electronic pinball, etc. As a result, when the user scrolls or otherwise selects any particular next segment of text, an electronic game can be presented as part of the synchronized presentation. The user can play the respective game or simply move on to the next select segment of text. Moreover, success at select games can lead to the awarding of prizes, or to the display of bonus presentations, or both.

As well, select additional media components can be incorporated as "surprise graphics" that are able to be presented at any time during which the user is reviewing the news story or informational electronic document. This can help to create additional surprise and excitement for the user.

Next, users can be allowed to comment on select synchronized news stories and informational electronic documents. This can be done in a traditional manner, where the user comments in an area designated outside the space of the electronic news story or informational article. Alternatively, select comments can be permitted to be displayed within the actual presentation of the synchronized news story or informational article, such as within the primary body of text 220 or within the related media content presentation 260. This can especially be useful if users are permitted to share synchronized news stories or informational articles on social platforms such as Facebook or MySpace. As such, if a first user flags, posts, or otherwise shares a synchronized news story embedded with their comments, then friends can see the first user's embedded comments and, if so desired, embed their own comments into the news story.

The embodiments described in this patent application can be utilized to enhance the presentation of several types of informational electronic documents, including electronic books. This includes fiction, educational textbooks, self-help books, and other informational and educational content. As an example, a user reading an e-book biography about Abraham Lincoln might see displayed, adjacent to an associated segment of text, an image of the president as a child. Then, as the user reads the next select segment of text, the image of young Abe Lincoln can slowly move across the page of text or zoom-in, or otherwise be modified. In other instances, as the user reads additional text the photograph might change completely; this flexibility in approach is reflected in the news story examples previously described. In fact, the FIG. 10 computerized displays, along with others, can apply specifically to e-book presentations.

Further exploring the e-book concept, a person reading a different chapter of the same hypothetical e-book on President Lincoln might see a recently-shot color video of the outside of Lincoln's log cabin as they read related text about his childhood. The angle and location of the video can then be modified so that, as the user encounters additional text discussing how young Abe spent his nights sleeping in the cramped quarters, the camera taking the video gradually "walks" the reader into the cabin; as a result, the user sees in the associated video exactly what the text is discussing, synchronizing the visual media with the text in a unique manner. As well, when the user comes to a section of text that refers to a different home Lincoln had lived-in, the video can change completely to a new graphic.

Using another example, in a self-help e-book or a digital work of fiction, the multimedia presentation 260 can be used to guide the reader on a visual journey. As the user scrolls down descriptive text, associated visual media can change both abruptly and in a slow, flowing manner to simulate the reader's walking down steps or opening a series of doors or encountering other characters on the visual journey in synchronization with the user's review of related text.

As was explained in depth previously in this patent application, the user may scroll manually through a manually manipulated electronic device as he or she reads the e-book or other informational electronic document, or automatic eye or other body-tracking software can be implemented to detect the reader's place in the given story to activate an associated automatic tracking multimedia control.

Another helpful feature supporting the previously-described embodiments includes incorporating text into the multimedia presentation 260 so that the text can be visually altered both abruptly and in a slow, flowing manner as the user reviews the text, the multimedia content, or both. This will allow, for instance, written text to shift to make way for emerging or changing graphics. For a sports story created in the embodiments previously described, the initial presentation could include a headline, two columns of text, and a still graphic of a professional football team's logo that is placed in the middle of the two columns of text. Then, as the user begins to read the story, scrolling manually or allowing automatic eye or other body-tracking software to detect the reader's place in a given story, a video could be shown of a football player crashing through both the team's logo and the article's text, with the article's text actually moving to make way for the graphical presentation of the moving football player. Because the text is integrated directly into the graphical presentation, it can easily interact with the accompanying graphics in a variety of unique and advantageous ways.

Further illustrating how text can be moved in conjunction with the presentation of related graphics, FIGS. 25A and 25B jointly depict the Robert Gates news story previously represented in FIGS. 2-10 and other diagrams; however, in this example, a video of Robert Gates walking toward his Turkish counterpart causes the text to be shifted in a flowing manner. Although these two diagrams (FIGS. 25A and 25B) show a "before" and "after," it can be extrapolated how the text can be shifted gradually (or, conversely, instantly) so as to minimize disrupting the user's reviewing of the text.

Note that the graphics in the various embodiments can be presented once based on scrolling, based on time, or a combination thereof; or they can loop so the graphic activity repeats.

Text articles, alone or in conjunction with related media content, can be modified in another associated manner to benefit readers. This example is based in part on prior art depicted in "Yahoo!" news pages, whereby hovering over a Yahoo! news headline permits a pop-up display that reveals a brief introduction to the news story. In this inventor's embodiment, additional useful and innovative functionality is provided while the user hovers over, or otherwise selects, the headline or its associated headline electronic control for a given news story or other informational content. This additional functioning allows the user to, for example, hover over select individual words within the headline, which then allows the pop-up display showing the lede to change to represent subsequent portions of the news story including, if desired, related media content components that change in the manner previously described in this patent application.

FIGS. 26 and 27 show how this embodiment might work with a news story about U.S. Secretary of Defense Robert Gates. In FIG. 26, a list of four news story headlines 2610 is depicted, and the user is shown to have already selected the headline "Gates in Istanbul for Afghan Talks," causing the pop-up box containing the lede 2620 for the headline to be shown. This function is similar to Yahoo's prior art. In FIG. 27, however, the user is shown to have now additionally selected the second word 2730 in the headline by, for example, hovering a cursor over that second word 2730. Differing significantly from Yahoo's prior art, this has caused the next portion 2720 of the news story to be shown instead of the lede portion.

Optionally, the publisher or user could elect to allow an initial hovering over (or otherwise selecting) of any portion of the headline to cause only the introduction to appear. Then, once a predetermined period of time passes, or the user takes a specific action, all or select individual words can be activated to represent different portions of the news story or other informational article.

Alternatively, instead of causing pop-up portions to change when the user hovers over each select individual word, the pop-ups could change when the user hovers over selected letters or groups of words. Or the user could instead hover over other content, such as symbols or other indicators adjacent to the headline; the user's selection of at least one such symbol near the headline, for example, could then cause the presentation of the pop-up box with the desired news story content.

Moreover, the user could also be provided with sub-headlines that appear, for example, in the same pop-box as the news lede or in one or more additional pop-up boxes—or even on the same display as the headline. The advantage to this unique approach is striking: when the user selects, for example, a particular word in the headline, not only does a pop-up box appear with a chosen portion of the news story, but the corresponding sub-headline can also be highlighted or otherwise differentiated from the unselected sub-headlines displayed. This allows the user to visually see, choose, and confirm the selection of sub-headline topics of interest while ignoring others. In this manner, the user is then allowed to review the article either linearly or non-linearly, providing additional flexibility and usability.

One reason publishers have not explored this approach may relate to the possible fear users would not see advertisements on a new electronic page that would be watched had the reader instead traditionally clicked-on a headline. However, this inventor proposes advertising can be presented within the one or more pop-up boxes presenting the news story, and even in the optional list of sub-headlines. For instance, if the user hovers over the second word in a given news headline, and that causes the second portion of that news story to appear in a pop-up box, that pop-up box (or a supplementary pop-up box) could show a new advertisement, such as for an automobile. If the user then selects the third word in that same headline, that same pop-up box could then change to show different information about the advertised automobile, or the pop-up box could instead present an entirely new set of advertisements. Although changing ads can be presented in separate pop-up boxes, it may be preferable to include the ads within the pop-up boxes that present the news or other desired informational content, so that users do not find the pop-ups bothersome. Alternatively, the changing ads could be presented on the main page containing the headlines.

This extended use of pop-up boxes to show additional portions of an article coupled with advertising creates a win-win situation, in that users obtain far easier access to articles than is currently permitted in the prior art—and without having to change an entire web page or app, for example. In turn, the news publisher or aggregator is allowed to present advertising in an advantageous manner that is also comparatively agreeable to the user.

For further functionality, the user could be allowed to alter the size of the one or more pop-up boxes presented. Similarly, the publisher might decide to give the user a choice as to whether the pop-up boxes should exclude or include related media content (such as photos or videos), and/or whether the article's sub-headlines should be presented or hidden from display.

As mentioned above, associated visual media can be displayed in a comparatively flowing manner as the user scrolls across the presented electronic headline control of the news story or other content. In this case, the "scroll" control is the actual headline itself or a control near the headline, and so scrolling across the headline (or, for example, implementing an electronic control just to the side of the headline) could cause a flowing change in the presentation of video or other pictorial content (including advertising) to accompany the change in text-based content. Alternatively, the full article's own text can also be scrolled in a gradual, flowing manner in the pop-up box while the user also "scrolls" the headline or related control; this allows the reader to gradually and effortlessly review all or part of the text of the article in a single pop-up box.

FIGS. 28 and 29 illustrate a variation for how this flowing of text might work, with a horizontal indicator 2830 used by the reader as an electronic headline control in this example; moving this indicator sideways causes the scrolling of the text in the pop-box (2820 becomes 2910). FIGS. 28 and 29 also illustrate how graphics can be modified in the same flowing, continuous presentation as was detailed in the preferred embodiments.

In lieu of using pop-up boxes, the headlines could cause the news stories to be presented on the main display or another, non "pop-up" type of display.

Text can be shifted in additional ways to incorporate the embodiments detailed herein. For example, a news or informational article can commence with the lede text in a much larger font size than the rest of the article. Then, once the user scrolls or otherwise reads the article, the font for the lede text can, automatically shrink to match the font size for the rest of the text in the article in that same display.

Lastly, the synchronized articles described herein could readily be distributed by news services and news agencies such as Reuters and the Associated Press. Furthermore, an aggregator or publisher retrieving such synchronized articles from the news service or news agency can be enabled to modify the synchronized articles not only by editing the text and graphics, but also by, for example, increasing or decreasing the level of multimedia interactivity afforded to their particular users. As a result, one publisher or aggregator could choose to present an article's complete array of visual multimedia to their users as photos, videos, and graphics, while another publisher or aggregator might choose to retrieve, or present, a version in which video presentations have been converted into photographic presentations to reduce bandwidth usage or to better mesh with the publisher or aggregator's other news offerings.

Flow Charts to Illustrate Computer Processes

FIGS. 30 to 38 are flow charts that help to illustrate the computerized steps involved in synchronizing the user's reviewing of an article's text with related media content. Many other variations can be applied to the following nine flow charts, but these flow charts exemplify how the key embodiments described earlier in this patent application can be constructed step-by-step through computerized processes.

Moreover, although terms related to a "computer-implemented method" are utilized in these flow charts, they also exemplify the computerized processes that would be implemented for a "computer program product."

Figure 30:
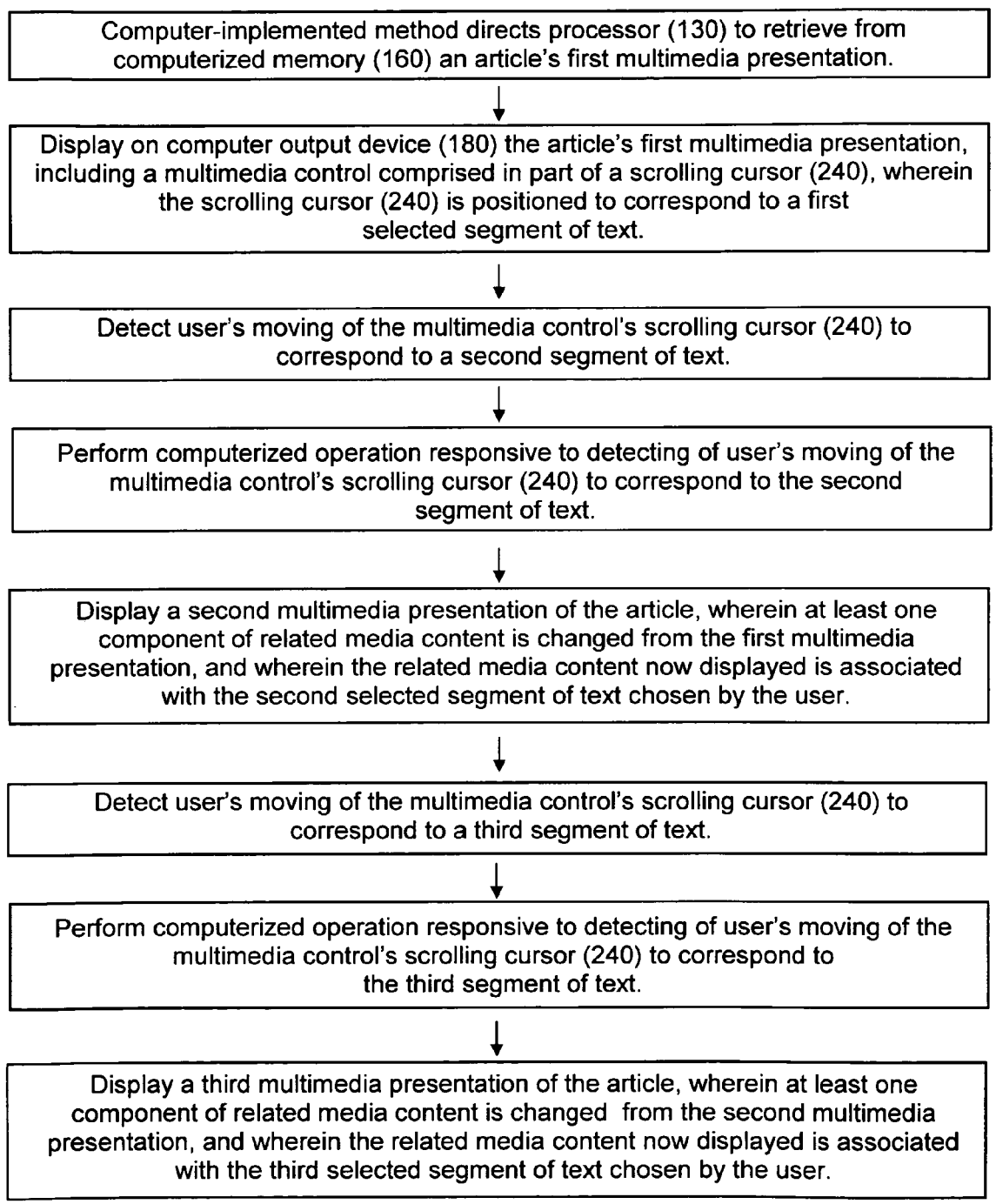
FIG. 30 is a flow chart showing, through use of a scrolling cursor, the computerized steps involved in synchronizing related media content with the user's reviewing of an article's text.
Figure 31:
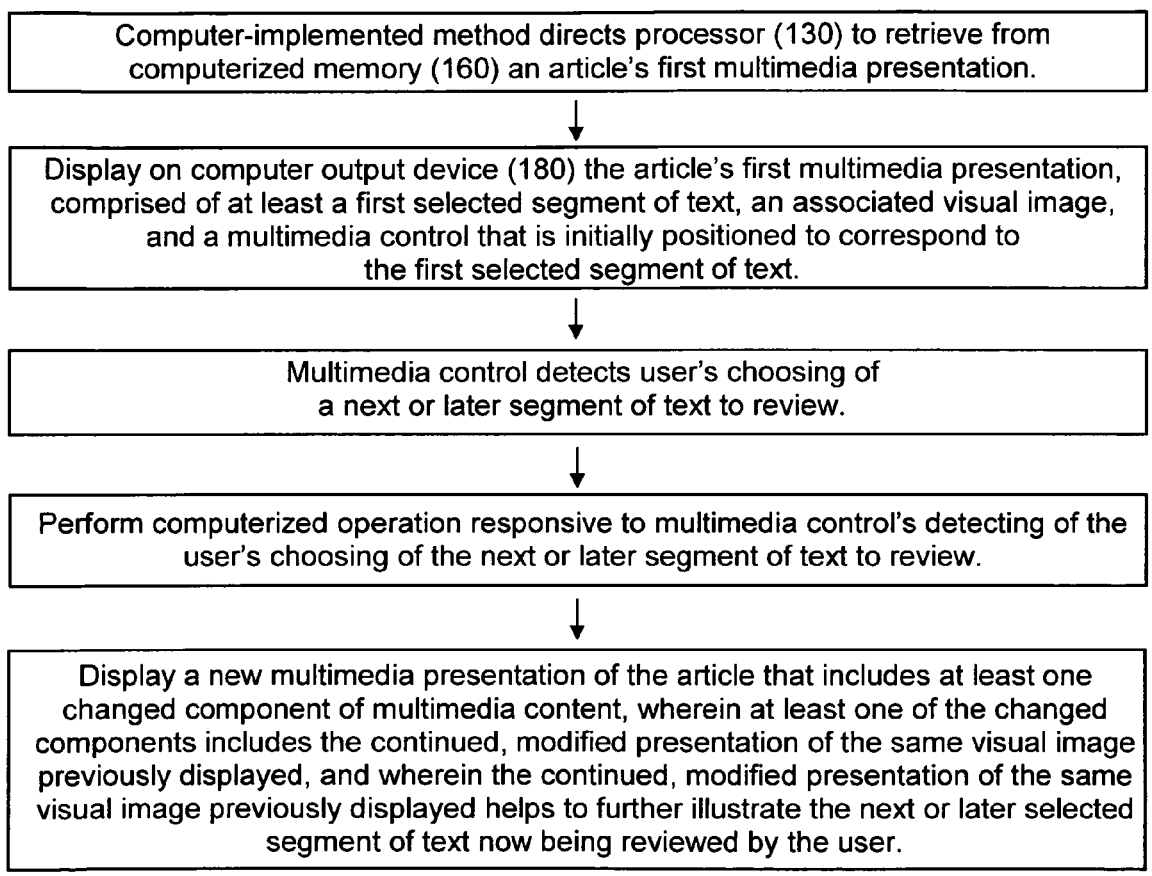
FIG. 31 is a flow chart showing the computerized steps involved in synchronizing related media content with the user's reviewing of an article's text, leading to a continued, modified presentation of the same visual image.

FIG. 30 shows the computerized steps involved in presenting synchronized multimedia within the first preferred embodiment. This embodiment is depicted, for instance, in the computerized displays of FIGS. 2, 3, 4, and 5. In the FIG. 30 flow chart example, the processor 130 retrieves from the computerized memory 160 the article's first multimedia presentation, consisting of the article's text coupled with at least one video, graphic, photograph, or other related media content. That first multimedia presentation is then displayed on the computer output device 180. In this particular flow chart, also displayed is a scrolling cursor 240 that is a component of the multimedia control. The scrolling cursor 240 is initially positioned in this flow chart to correspond to a first select segment of text, though other variations are possible. The next step involves the computer's detecting that the user moved the scrolling cursor 240 so that it corresponds to the second select segment of text. As a result, a computerized operation is performed, which then leads to the display of a second multimedia presentation of the article, where at least one media component is changed from the first presentation, and where the second multimedia presentation helps to further illustrate the second select segment of text chosen by the user. The next step involves the computer's detecting that the user moved the scrolling cursor 240 again, so that is corresponds to the third select segment of text. As a result, a computerized operation is performed, which then leads to the display of a third multimedia presentation of the article, where at least one media component is changed from the second presentation, and where the third multimedia presentation helps to further illustrate the third select segment of text chosen by the user. In this FIG. 30 flow chart, in lieu of a scrolling cursor 240 another type of manual or automatic control can be utilized. As well, this flow chart illustrates the user's making linear choices, but the user can alternatively skip from the first select segment of text and, for instance, head straight to the third segment of text, bypassing the second segment—along with the presentation of the second segment's associated media.

In relation to flow chart variations, advertisements can easily be incorporated into the FIG. 30 and subsequent flow charts, wherein each computerized operation that causes a new presentation of an article's related media content can additionally cause a change in the presentation of at least one component of advertising content. Second, electronic touch screen controls can substitute in each of the flow charts for a computer mouse, a track ball, or other commonly-used electronic controls. Third, in financial news stories, the computerized operations that cause a change of related media content can mainly lead to the changing in presentation of stock charts and other financial graphics. Fourth, the user's choosing to review each new segment of text within an article can cause the computerized operation to present a change of related media content or, alternatively, the user's choosing to review select segments of text within each flow chart can lead to the presenting of changed related media content within a news story, wherein "select segments" refers to either particular segments or every segment.

The flow chart depicted in FIG. 31 follows similar steps as described above, except that FIG. 31 emphasizes how the embodiments detailed in this patent application can lead to a fluid interactive presentation of multimedia very different from the prior art. This flow chart of the computerized steps involved shows the multimedia control detecting the user's choosing of a next or later selected segment of text within a multimedia article, activating a computerized operation that leads to a replacing of the first multimedia presentation. The result is a computerized display showing a changed component of related media content, whereby at least one of the changed components includes the continued, modified presentation of the same visual image that had been displayed in the first multimedia presentation. In other words, the video or photograph or stock chart isn't replaced; instead, it is zoomed-in or out, or its perspective is otherwise altered. The user's subsequent choosing of an additional segment of text could cause the related media content to follow an identical path—further modifying the same visual image—or it could lead to a complete replacement of that video, photograph, or stock chart.

Figure 32:
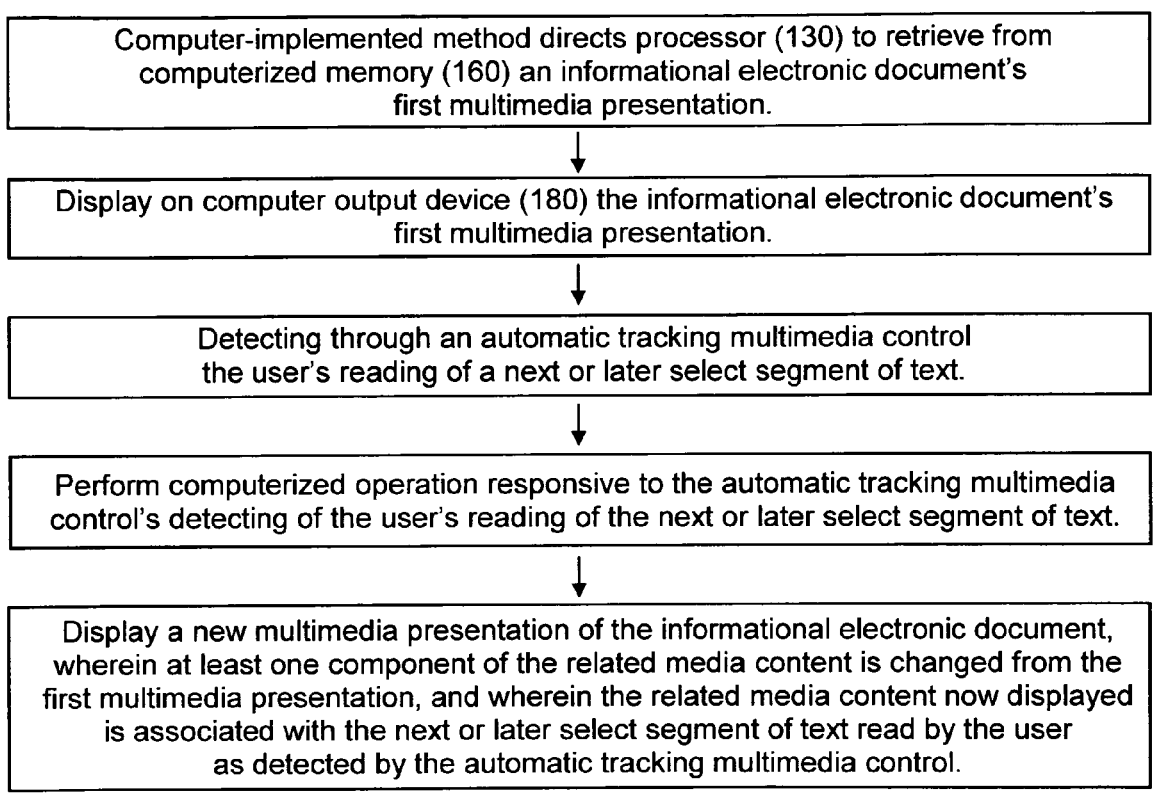
FIG. 32 is a flow chart showing, through use of an automatic tracking multimedia control, the computerized steps involved in synchronizing related media content with the user's reviewing of the text for an informational electronic document.

FIG. 32 specifies the computerized steps involved in the various embodiments while specifically utilizing an automatic tracking multimedia control that tracks a person's eye-movements or other body movements and then advances the related media content so that it is automatically synchronized with the article's text actively being reviewed by the user.

Figure 33:
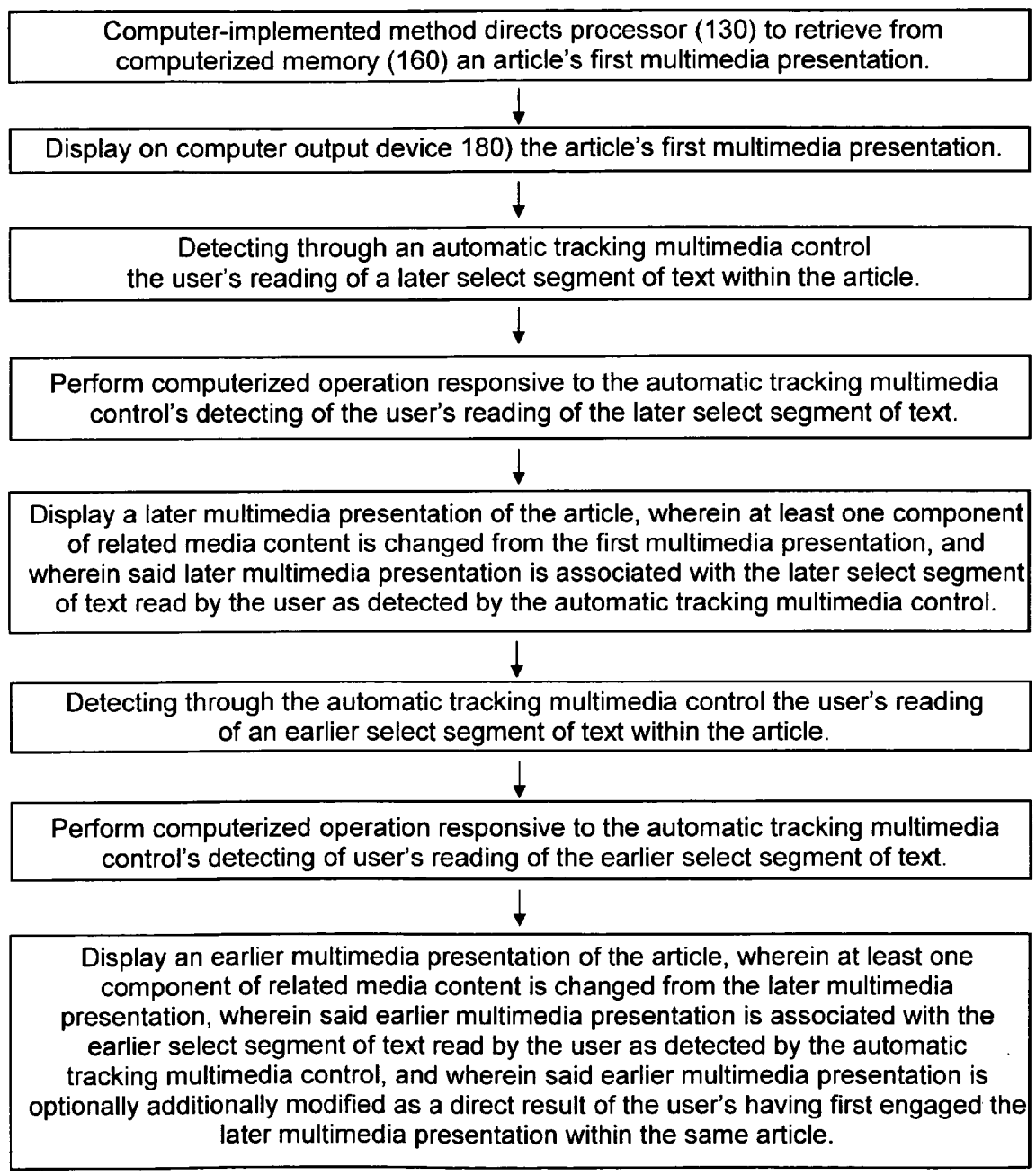
FIG. 33 is a flow chart showing, through use of an automatic tracking multimedia control, the computerized steps involved in synchronizing related media content with the user's non-linear review of an article's text.

Like FIG. 32, FIG. 33 shows how an automatic tracking multimedia control can be incorporated into the embodiments described. This case, however, illustrates the computerized steps involved in moving from a first multimedia presentation to a later multimedia presentation and back to a presentation that is in-between the two. As well, this flow chart indicates that the "in-between" presentation can optionally be additionally modified to account for the fact that the user has already viewed the later presentation before viewing the earlier one. As a result, a given publisher could, for example, decide to have the earlier presentation skip an explanation that would've otherwise been included, or the situation could cause the earlier presentation to leave displayed an audio media component that would normally only be presented to the user in the later presentation.

Figure 34:
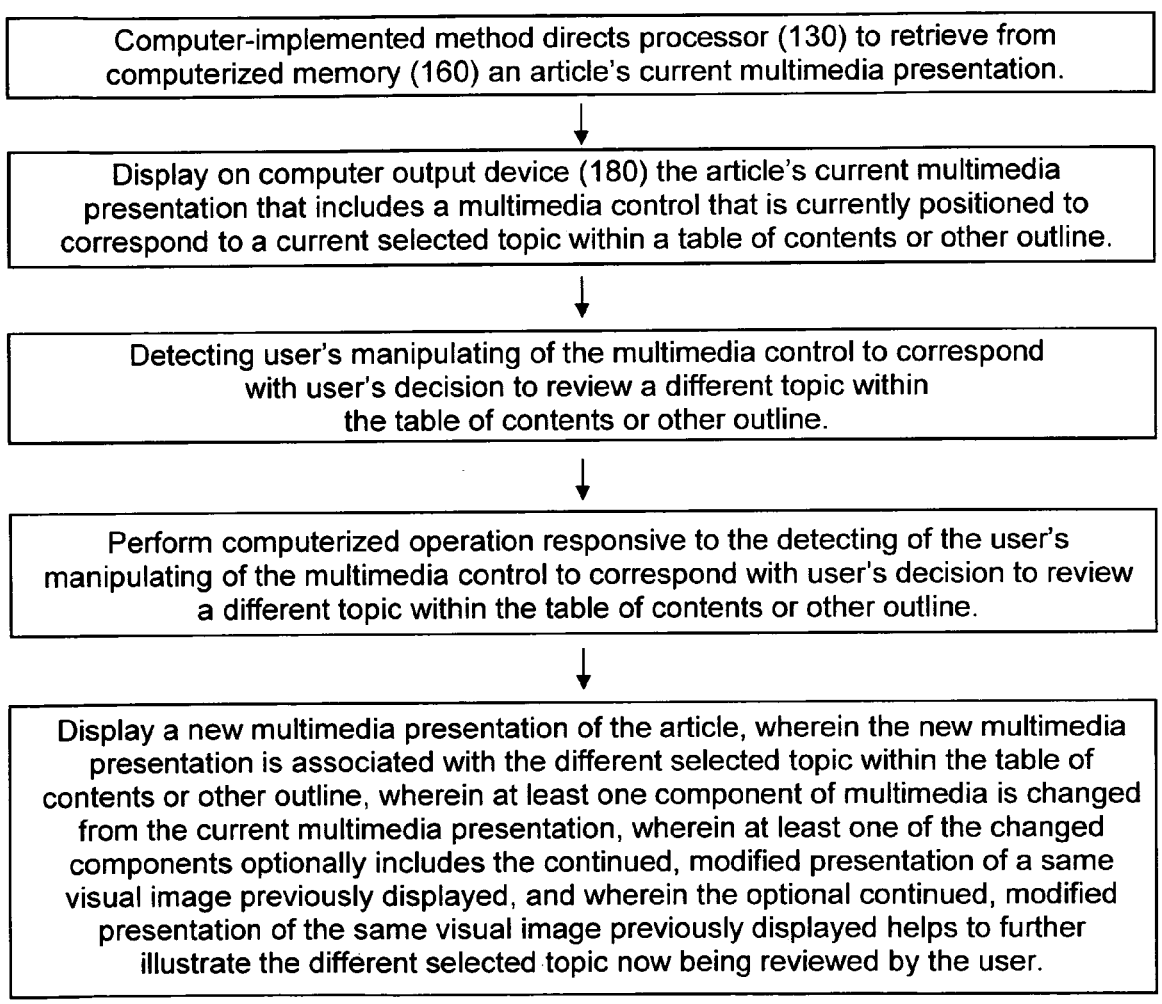
FIG. 34 is a flow chart showing, through use of a table of contents reading control (or other outline reading control), the computerized steps involved in synchronizing related media content with the user's reviewing of an article's text.

FIG. 34 shows the computerized steps involved in the second preferred embodiment, as depicted in the FIGS. 6 and 7 Illustrations of screenshots. The FIG. 34 flow chart steps are similar to that described in the prior flow charts except that, in this instance, the user manually manipulates a multimedia control within or adjacent to an outline (or table of contents) of the article rather than within or immediately adjacent to the main body of text. The detecting of this multimedia control being moved then causes a computerized operation to be performed that leads to the display of one segment of the article's main text in a "storybook format" (or a similar accommodating arrangement) within the multimedia presentation. Subsequent segments can be activated in a parallel manner. As with FIG. 31, FIG. 34 offers the possibility of displaying the continued, modified presentation of the same visual image as the user advances to each new multimedia presentation in the article.

Figure 35:
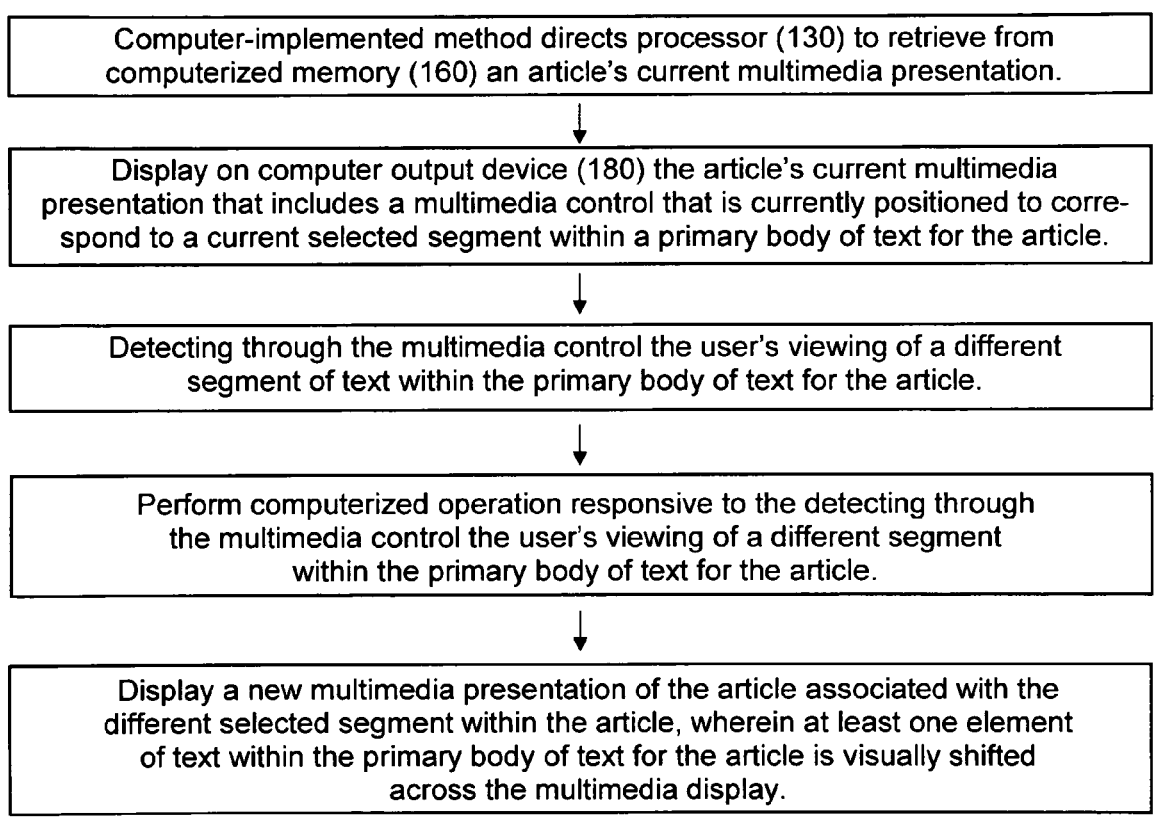
FIG. 35 is a flow chart showing the computerized steps involved in shifting text across the display page as a result of the user's reviewing of an article's selected text.

The computerized processes depicted in FIG. 35 can be blended with the processes described for any of the other flow charts. This FIG. 35 flow chart is intended to depict the computerized steps that cause at least one element of text within the primary body of the article to shift across the electronic display as the associated multimedia control is re-positioned manually or automatically while the user reviews the article. This flow chart helps to explain the computerized processes behind the screenshot displays shown in FIGS. 25A and 25B.

Figure 36:
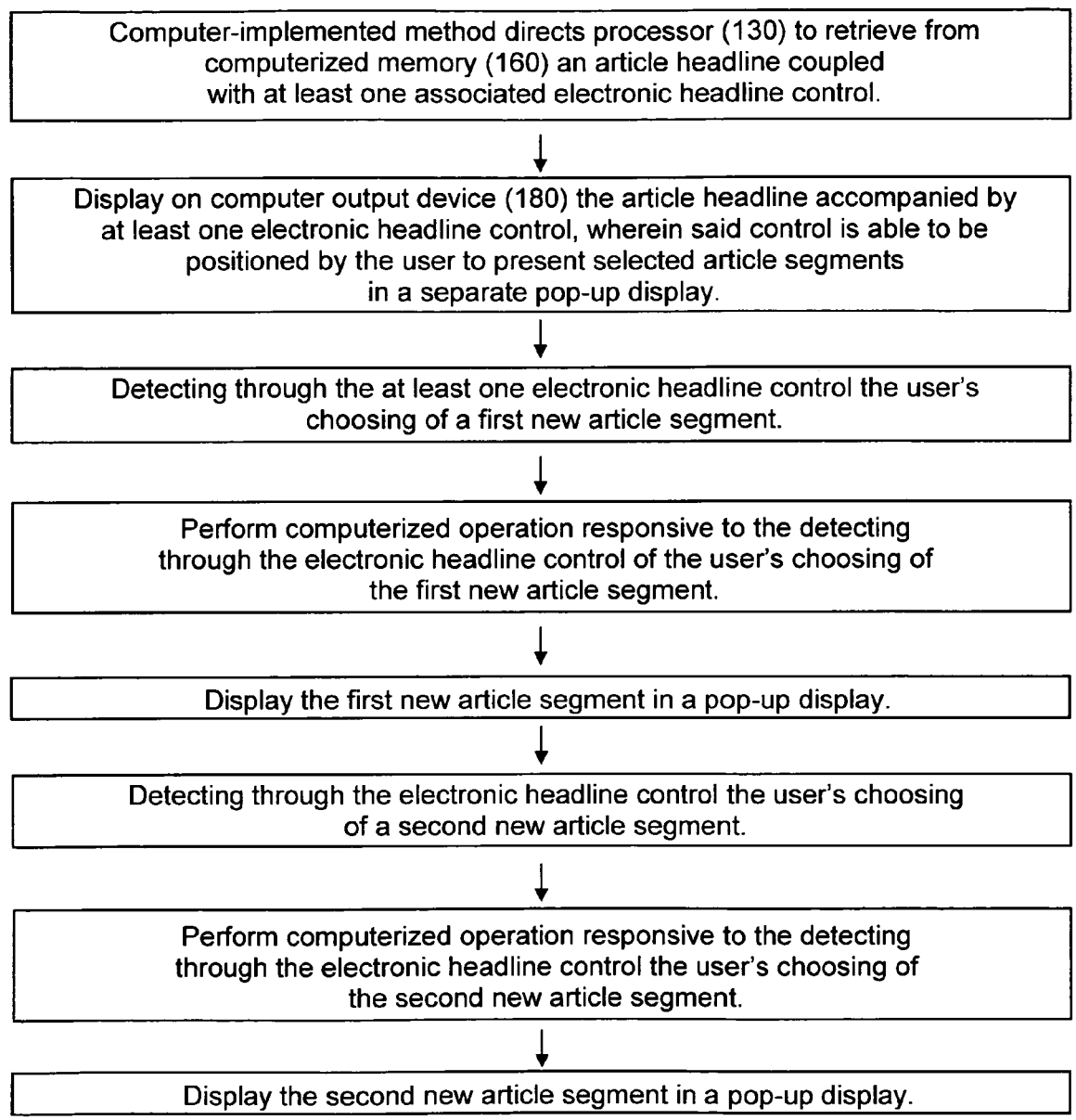
FIG. 36 is a flow chart showing the computerized steps involved in displaying segments of an article by selecting at least one electronic headline control corresponding to the article's headline.

The flow chart in FIG. 36 depicts the computerized steps involved in displaying segments of an article by positioning an electronic headline control that is associated with that same article's headline. For example, multiple news story headlines are retrieved from memory 160 (also called a computer-useable storage medium) by the processor 13C utilizing a computer program code. These headlines are then presented on the computer output device 180 (such as a computer screen). Displayed within or adjacent to each news story headline is an electronic headline control that is able to be positioned by the user to cause the presentation of individual article segments in a separate display, such as a pop-up display. When the computer detects that the user has moved or otherwise activated the electronic headline control for an individual news story headline, a computerized operation is performed that then leads to the separate display of a first new article segment for that particular news story headline. When the computer detects that the user has again moved or otherwise activated that electronic headline control for that same one news story headline, a second computerized operation is performed that then leads to the display of a second new article segment for that particular news story headline. A parallel process will lead to the presentation of additional article segments—or, alternatively, to the presentation of article segments related to the other displayed news story headlines. As well, the computerized operations described above can likewise cause visual images or other supportive media presentations to be displayed and changed alongside the text as the user activates the associated electronic headline control. Lastly, as a variation to the above, the segments of the article can be displayed within the same display as the news story headlines, rather than as a pop-up box or other separate display.

Figure 37:
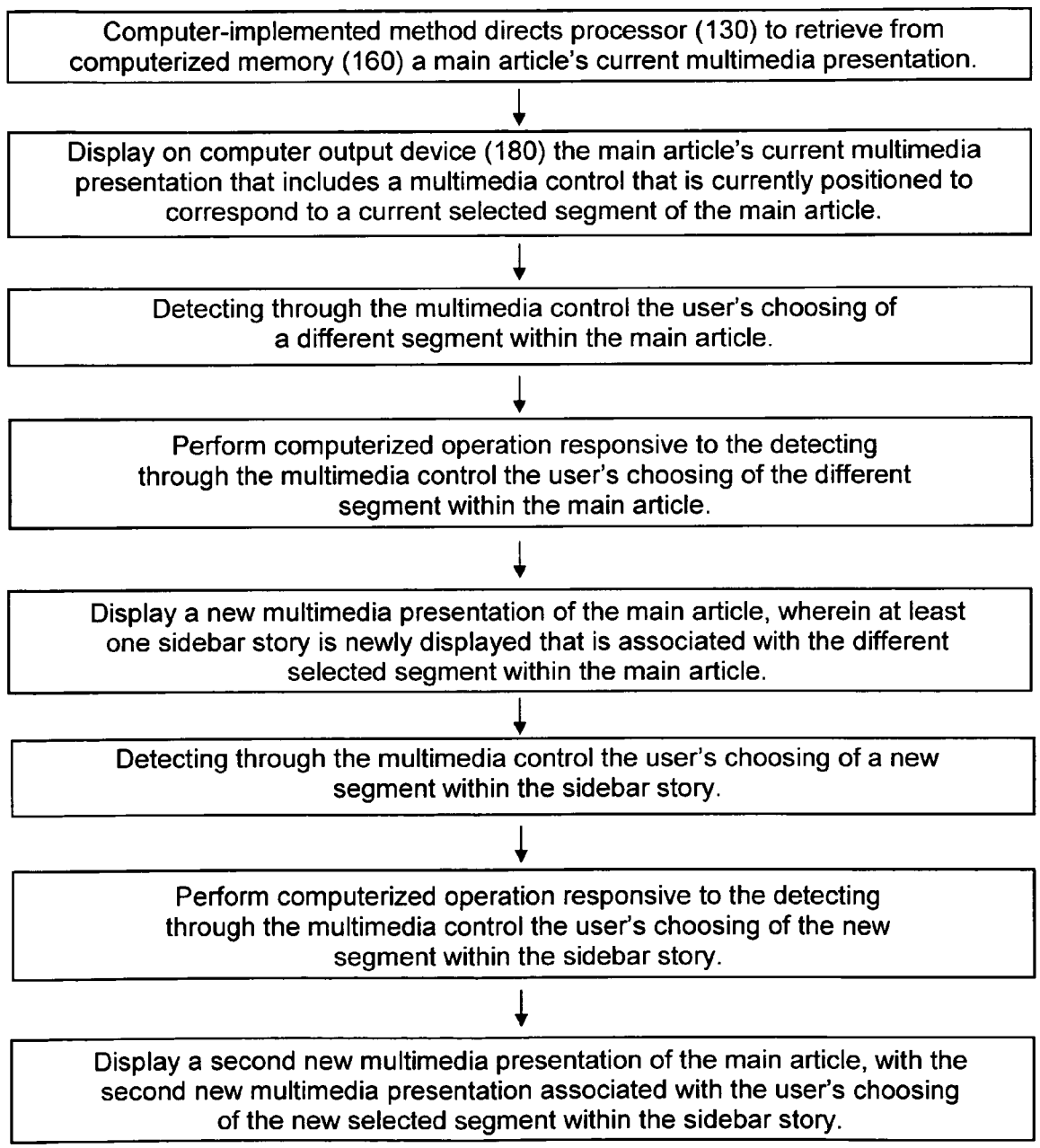
FIG. 37 is a flow chart showing the computerized steps involved in synchronizing illustrative media with the user's reviewing of an article's text and a sidebar story's text.

FIG. 37 reveals the computerized processes involved in presenting the FIG. 19 screenshot. FIG. 37 shows how the detecting of the user's choosing of a different segment of text within a main article leads to a computerized operation being performed that causes the display of a new multimedia presentation that includes the depicting of a sidebar story that relates to the different selected segment of text shown in the main article. FIG. 37 also illustrates how the subsequent detecting of the user's choosing of a new segment of text within the sidebar story itself optionally leads to a computerized operation being performed that causes the display of a new media presentation in association with the main article.

Figure 38:
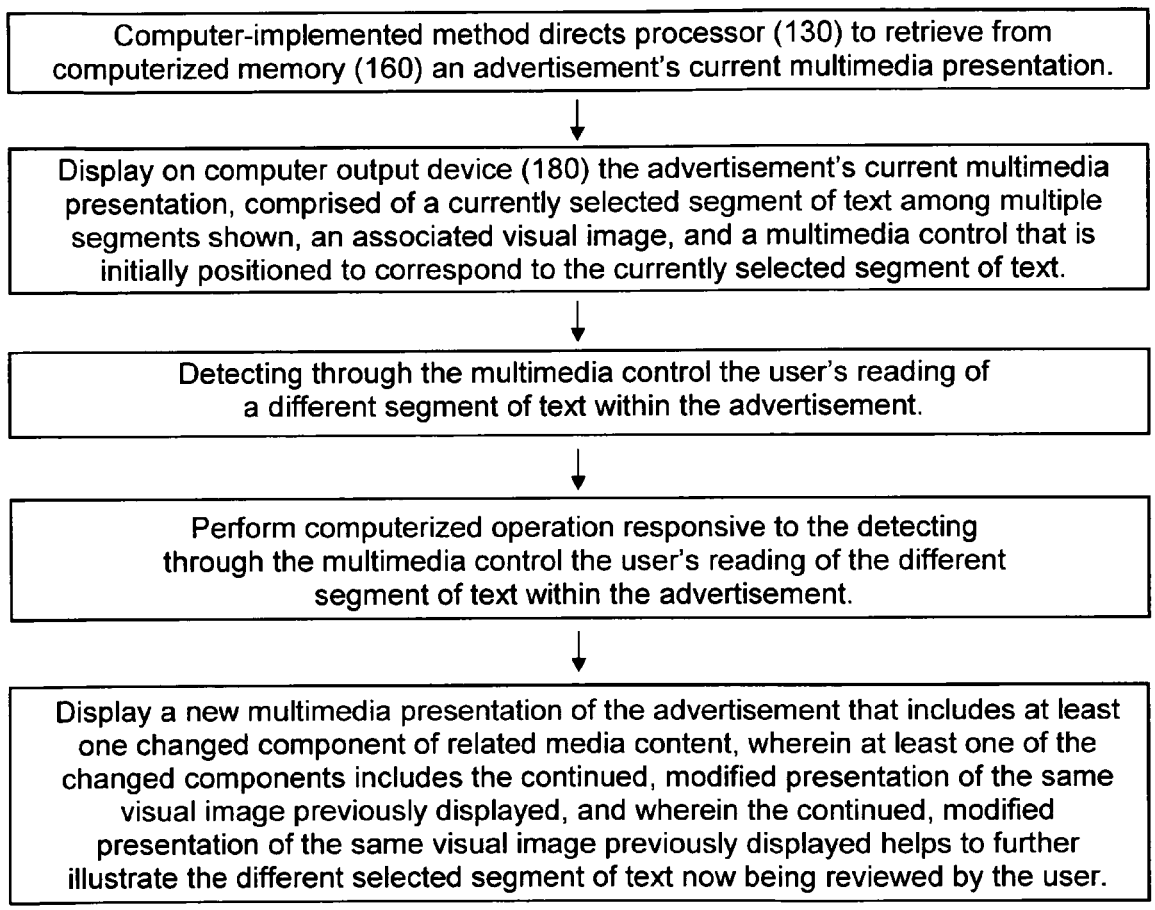
FIG. 38 is a flow chart showing the computerized steps involved in synchronizing related media content with the user's reviewing of an advertisement's text.

Finally, the flow chart in FIG. 38 depicts the computerized steps involved in synchronizing the user's review of an advertisement's text with related media content. These computerized processes serve to present the computerized displays shown in FIG. 21. To begin, in FIG. 38 an advertisement's current multimedia presentation is retrieved from the computerized memory 160 by the processor 130, and then displayed on the computer display device 180. Presented within or adjacent to the advertisement is a multimedia control that is able to be positioned or otherwise activated by the user to select different segments in the advertisement. When the computer detects that the user has moved or otherwise activated the multimedia control, a computerized operation is performed that then leads to the display of at least one changed component of related media content, where at least one of the changed components includes the continued, modified presentation of the same visual image previously displayed before the user had moved or otherwise activated the multimedia control. Selecting additional elements within the advertisement can alternate as desired between causing complete changes in presenting at least one component of related media content and causing partial changes that lead to the continued, modified presentation of the same related media content. The user's reviewing of different segments of the advertisement can be tracked through a manually manipulated electronic multimedia control or through an automatic tracking multimedia control.

Although the above nine flow charts illustrate several variations, many other combinations are possible, as described in greater depth earlier in this patent application and particularly as clarified in the appended claims.

Several Advantages of the Synchronized Article Computer-Implemented Methods and Computer Program Products Some advantages of the embodiments and corresponding features shown include creating increased interest in news stories, informational articles, and electronic books by allowing the user to actively interact with the content.

As well, for the first time the user has the opportunity to review a continuous flow of changing images or other related media content corresponding to various segments of text being read by the user on a given subject.

Next, whereas prior news and informational broadcasts of visual images such as videos and photos mainly allow the broadcaster to control the presentation of the content, with the user primarily a passive observer, these synchronized articles put the user completely in control. Whether through manual or automatic means, the user directs the speed or even the nature of the multimedia presentation.

Moreover, these embodiments lead to the creation of advertisements that are more engaging and potentially more informative. And, in some instances, an article or advertisement's text will be designed to dynamically interact with other forms of media, leading to an unusually entertaining presentation. Publishers will be able to intermingle text and media in unique ways within articles, ads, and ebooks, and the two will no longer be viewed as isolated elements.

In addition, these synchronized article methods and products have the potential to offer a lot of flexibility to publishers, aggregators, authors, and users. There are many embodiments that can be pursued while adhering to the core concepts of these synchronized articles. The ability to design these computer-implemented methods and computer program products in a flexible manner means they can accommodate the needs of publishers and aggregators in many different fields writing for a wide variety of audiences.

In short, the embodiments described herein entertain and inform the user through a unique interactive approach.

While the preferred embodiments, the alternative embodiments, and their related features contain many specifics as is detailed in this patent application, these should not be construed as limitations on the scope of the embodiments but as merely providing illustrations of some of the present embodiments. Additional advantages and modifications for the various embodiments will readily occur to those skilled in the art. Therefore, the present patent application in its broader aspects is not limited to the specific embodiments, details, and representative devices shown and described herein. Accordingly, various changes, substitutions, and alterations may be made to such embodiments without departing from the spirit or scope of the general innovative concept as defined by the appended claims. The scope of the embodiments should be determined by the appended claims and their legal equivalents, rather than by the examples given.

What is claimed is:

1. A computer-implemented method for presenting on a computer output device a news story, wherein said news story includes a primary body of text, wherein an automatic tracking multimedia control is implemented to track a reviewing by a user of text within said news story to synchronize said reviewing with a presentation of related media content, including visual imagery configured primarily to illustrate the text in said news story, wherein said automatic tracking multimedia control tracks eye scrolling movements of said user to direct changes of said visual imagery, and wherein said automatic tracking multimedia control commences displaying each successive presentation of said visual imagery automatically no later than effectively simultaneous to the reviewing of each associated text segment by said user, said computer-implemented method comprising:

displaying on said computer output device a current presentation of said news story that is retrieved from a non-transitory computer-useable storage medium, wherein said current presentation includes at least part of said primary body of text and an associated visual image;

detecting through a computer processor a choosing of a select segment of text within said primary body of text by said automatic tracking multimedia control;

performing through said computer processor an operation, said operation responsive to said detecting of the choosing of said select segment of text by said automatic tracking multimedia control, said operation causing a next presentation to be retrieved from said non-transitory computer-useable storage medium, wherein said next presentation includes displaying at least one changed component of related media content, wherein at least one of the changed components includes a continued, modified presentation of said associated visual image on said computer output device;

displaying on said computer output device said next presentation that includes the at least one changed component of related media content, wherein at least one of the changed components includes said continued, modified presentation of said associated visual image relating to said select segment of text, wherein said continued, modified presentation of said associated visual image includes at least one of a zooming-in on at least one depicted subject, a zooming-out on at least one depicted subject, a panning across at least one depicted subject, and a change in camera perspective of at least one depicted subject;

detecting through said computer processor a choosing of a next select segment of text within said primary body of text by said automatic tracking multimedia control;

performing through said computer processor a new operation, said new operation responsive to said detecting of the choosing of said next select segment of text by said automatic tracking multimedia control, said new operation causing a new next presentation to be retrieved from said non-transitory computer-useable storage medium, wherein said new next presentation includes displaying at least one newly changed component of related media content;

displaying on said computer output device said new next presentation that includes the at least one newly changed component of related media content, wherein said newly changed component relates to said next select segment of text.

2. The computer-implemented method of claim 1, wherein said associated visual image includes at least one of a digital photograph and a non-animated computerized graphic.

3. The computer-implemented method of claim 1, wherein said associated visual image includes at least one of a video and an animated computerized graphic.

4. The computer-implemented method of claim 1, wherein the display of said select segment of text and said associated visual image in said news story is accompanied by a likewise continued, modified presentation of a visual advertisement, wherein said likewise continued, modified presentation of said visual advertisement is at least in part configured to mirror alterations in said associated visual image in said news story, and wherein said likewise continued, modified presentation of said visual advertisement includes at least one of a zooming-in on at least one depicted advertising subject, a zooming-out on at least one depicted advertising subject, a panning across at least one depicted advertising subject, and a change in camera perspective of at least one depicted advertising subject.

5. A computer-implemented method for presenting on a computer output device a news story, wherein said news story includes a main text body, wherein a scrolling-oriented multimedia control is implemented to synchronize a reviewing by a user of said main text body in said news story to presentations of related media content, including visual imagery configured primarily to illustrate at least part of said main text body, and wherein said scrolling-oriented multimedia control commences displaying each successive presentation of said visual imagery automatically no later than effectively simultaneous to the reviewing of each associated text segment by said user, said computer-implemented method comprising:

- displaying on said computer output device a current presentation of said news story that is retrieved from a non-transitory computer-useable storage medium, wherein said current presentation at least includes a current selected segment of said main text body, an associated visual image, and at least part of said scrolling-oriented multimedia control;
- detecting through a computer processor a choosing of a first new select segment of said main text body by said scrolling-oriented multimedia control;
- performing through said computer processor an operation, said operation responsive to said detecting of the choosing of said first new select segment of said main text body by said scrolling-oriented multimedia control, said operation causing a next presentation to be retrieved from said non-transitory computer-useable storage medium, wherein said next presentation includes displaying said first new select segment of said main text body coupled with at least one changed component of related media content, wherein at least one of the changed components includes a continued, modified presentation of said associated visual image on said computer output device;
- displaying on said computer output device said next presentation that includes said first new select segment of said main text body and the at least one changed component of related media content, wherein at least one of the changed components includes said continued, modified presentation of said associated visual image relating to said first new select segment of said main text body, wherein said continued, modified presentation of said associated visual image includes at least one of a zooming-in on at least one depicted subject, a zooming-out at least one depicted subject, a panning across at least one depicted subject, and a change in camera perspective of at least one depicted subject;
- detecting through said computer processor a choosing of a second new select segment of said main text body by said scrolling-oriented multimedia control;
- performing through said computer processor a new operation, said new operation responsive to said detecting of the choosing of said second new select segment of said main text body by said scrolling-oriented multimedia control, said new operation causing a new next presentation to be retrieved from said non-transitory computer-useable storage medium, wherein said new next presentation includes displaying said second new select segment of said main text body coupled with at least one newly changed component of related media content;
- displaying on said computer output device said new next presentation that includes said second new select segment of said main text body and the at least one newly changed component of related media content, wherein said newly changed component relates to said second new select segment of said main text body.

6. The computer-implemented method of claim 5, wherein said associated visual image is at least one of a video and an animated computerized graphic.

7. The computer-implemented method of claim 5, wherein said associated visual image is at least one of a digital photograph and a non-animated computerized graphic.

8. The computer-implemented method of claim 5, wherein the computer output device informs said user in advance through at least one visual indicator as to when related media content changes will take place during the reviewing by said user of said news story.

9. The computer-implemented method of claim 5, wherein the display of said first new select segment in said main text body and the modified related media content in said news story is accompanied by a likewise continued, modified presentation of a visual advertisement, wherein said likewise continued, modified presentation of said visual advertisement is at least in part configured to mirror alterations in said modified related media content in said news story, and wherein said likewise continued, modified presentation of said visual advertisement includes at least one of a zooming-in on at least one depicted advertising subject, a zooming-out on at least one depicted advertising subject, a panning across at least one depicted advertising subject, and a change in camera perspective of at least one depicted advertising subject.

10. A computer-implemented method for presenting on a computer output device a news story, wherein said news story is presented at least primarily on a single electronic page, wherein said news story includes a primary body of text, wherein a user activates a scrolling-oriented electronic touch screen control to synchronize text presented within said news story to related media content presented, including visual imagery configured primarily to illustrate associated text in said news story, and wherein said scrolling-oriented electronic touch screen control commences displaying each successive presentation of said visual imagery automatically no later than effectively simultaneous to a reviewing of each associated text segment by said user, said computer-implemented method comprising:

- displaying on said computer output device a current presentation of said news story that is retrieved from a non-transitory computer-useable storage medium, wherein said current presentation at least includes a current segment of text from said primary body of text and at least one associated visual image;
- detecting through a computer processor a maneuvering by said user of said scrolling-oriented electronic touch screen control to choose a select next segment of text within said primary body of text;
- performing through said computer processor an operation responsive to said detecting of said maneuvering by said user of said scrolling-oriented electronic touch screen control to choose said select next segment of text, said operation causing a next media presentation to be retrieved from said non-transitory computer-useable storage medium, wherein said next media presentation includes displaying said select next segment of text and at least one changed component of related media content, wherein at least one of the changed components includes a continued, modified presentation of at least one of said at least one associated visual image on said single electronic page of said computer output device;
- displaying on said computer output device said next media presentation that includes said select next segment of text and said at least one changed component of related media content, wherein said changed component relates to said select next segment of text, wherein at least one of the changed components includes said continued, modified presentation of at least one of said at least one associated visual image relating to said select next segment of text, wherein said continued, modified presentation of at least one of said at least one associated visual image includes at least one visual enhancement presented on said single electronic page of said computer output device, and wherein said visual enhancement is a result of at least one of changing at least one associated camera's visual perspective of at least one depicted subject, zooming-in on at least one depicted subject, zooming-out on at least one depicted subject, panning across at least one depicted subject, moving at least one camera toward at least one depicted subject, and moving at least one camera away from at least one depicted subject;

detecting through said computer processor a new maneuvering by said user of said scrolling-oriented electronic touch screen control to choose a new select next segment of text within said primary body of text;

performing through said computer processor a new operation responsive to said detecting of said new maneuvering by said user of said scrolling-oriented electronic touch screen control to choose said new select next segment of text, said new operation causing a new next media presentation to be retrieved from said non-transitory computer-useable storage medium, wherein said new next media presentation includes displaying said new select next segment of text and at least one newly changed component of related media content on said single electronic page of said computer output device;

displaying on said computer output device said new next media presentation that includes said new select next segment of text and said at least one newly changed component of related media content, wherein said at least one newly changed component relates to said new select next segment of text displayed on said single electronic page of said computer output device.

11. The computer-implemented method of claim 10, wherein said at least one associated visual image includes a digital photograph.

12. The computer-implemented method of claim 10, wherein said at least one associated visual image includes a video.

13. A computer-implemented method for presenting on a computer output device a financial news story, wherein said financial news story includes a main text body, wherein a scrolling-oriented multimedia control is implemented to synchronize a reviewing by a user of select text segments within said main text body of said financial news story to presentations of related media content, including at least one financial graphic configured primarily to illustrate at least part of said main text body in said financial news story, and wherein said scrolling-oriented multimedia control automatically commences displaying each successive presentation of said at least one financial graphic no later than effectively simultaneous to the reviewing of each associated text segment by said user, said computer-implemented method comprising:

displaying on said computer output device a current presentation of said financial news story that is retrieved from a non-transitory computer-useable storage medium, wherein said current presentation includes at least part of said main text body, a related financial graphic, and at least part of said scrolling-oriented multimedia control;

detecting through a computer processor a choosing of a select segment of text within said main text body by said scrolling-oriented multimedia control;

performing through said computer processor an operation, said operation responsive to said detecting of the choosing of said select segment of text by said scrolling-oriented multimedia control, said operation causing a next presentation to be retrieved from said non-transitory computer-useable storage medium, wherein said next presentation includes displaying at least one changed component of related media content, wherein at least one of the changed components includes a continued, modified presentation of said related financial graphic on said computer output device;

displaying on said computer output device said next presentation that includes said at least one changed component of related media content, wherein said at least one of the changed components includes said continued, modified presentation of said related financial graphic to help illustrate said select segment of text, wherein said related financial graphic includes one or more securities charts, and wherein a predetermined portion of at least one of said one or more securities charts is visually modified when said current presentation is replaced by said next presentation;

detecting through said computer processor a choosing of a next select segment of text within said main text body by said scrolling-oriented multimedia control;

performing through said computer processor a new operation, said new operation responsive to said detecting of the choosing of said next select segment of text by said scrolling-oriented multimedia control, said new operation causing a new next presentation to be retrieved from said non-transitory computer-useable storage medium, wherein said new next presentation includes displaying at least one newly changed component of related media content, wherein at least one of the newly changed components includes a changed financial graphic that helps to illustrate said next select segment of text;

displaying on said computer output device said new next presentation that includes said at least one newly changed component of related media content, wherein said at least one of the newly changed components is said changed financial graphic that helps to illustrate said next select segment of text.

14. The computer-implemented method of claim 13, wherein said predetermined portion of at least one of said one or more securities charts is visually modified by at least one of adding at least one technical indicator, removing at least one technical indicator, changing at least one technical indicator, adding at least one trendline, removing at least one trendline, changing at least one trendline, adding visual price data, and removing visual price data.

15. A computer program product for presenting an electronic document, wherein said electronic document is defined as at least one of a news story, an informational article, and an electronic book, wherein a manual choosing by a user of select text segments within said electronic document is synchronized through a scrolling-oriented multimedia control with presentations of related media content, including an associated video configured primarily to illustrate at least part of a primary body of text in said electronic document, and wherein said scrolling-oriented multimedia control commences displaying each successive presentation of visual imagery automatically no later than effectively simultaneous to a reading of each associated text segment by said user, said computer program product comprising:

a computer processor having a computer output device;

a non-transitory computer-useable storage medium having a computer-readable program embedded therein, said computer-readable program being executable by said computer processor, said computer-readable program including at least part of said scrolling-oriented multimedia control;

said computer program arranged to cause said computer processor to store on said non-transitory computer-useable storage medium and display on said computer output device a current presentation of said electronic document, wherein said current presentation includes at least part of said primary body of text, said associated video, and at least part of said scrolling-oriented multimedia control;

said computer program then arranged to cause said computer processor to detect an activating by said user of said scrolling-oriented multimedia control to select a next segment of text within said primary body of text;

said computer program then arranged to cause said computer processor to retrieve from said non-transitory computer-useable storage medium and display on said computer output device a next presentation of said electronic document, wherein said next presentation includes displaying one or more changed components of related media content, wherein at least one of the changed components includes a continued, modified presentation of said associated video to help illustrate said next segment of text chosen from said primary body of text, wherein said continued, modified presentation of said associated video includes at least one visual enhancement, wherein said at least one visual enhancement includes at least one of zooming-in on at least one depicted subject in said associated video, zooming-out on at least one depicted subject in said associated video, appearing to move at least one associated camera toward at least one depicted subject in said associated video, appearing to move at least one associated camera away from at least one depicted subject in said associated video, and panning across at least one depicted subject in said associated video;

said computer program then arranged to cause said computer processor to detect a new activating by said user of said scrolling-oriented multimedia control to select a new next segment of text within said primary body of text;

said computer program then arranged to cause said computer processor to retrieve from said non-transitory computer-useable storage medium and display on said computer output device a new next presentation of said electronic document, wherein said new next presentation includes displaying one or more changed components of related media content to help illustrate said of said new next segment of text chosen from said primary body of text.

16. The computer program product of claim 15, wherein said at least one visual enhancement further includes at least one of changing a visual perspective of at least one depicted subject in said associated video and visually highlighting at least one element in said associated video.

17. The computer program product of claim 15, wherein the display of said next segment text and said related media content within said electronic document are accompanied by a likewise continued, modified presentation of at least one visual advertisement, wherein said likewise continued, modified presentation of said at least one visual advertisement is at least in part configured to mirror alterations in said related media content within said electronic document, and wherein said likewise continued, modified presentation of said at least one visual advertisement includes at least one of zooming-in on at least one depicted advertising subject, zooming-out on at least one depicted advertising subject, panning across at least one depicted advertising subject, and a change in camera perspective of at least one depicted advertising subject.

18. A computer program product for presenting an electronic document, wherein said electronic document is defined as at least one of a news story, an informational article, and an electronic book, wherein an automatic tracking multimedia control synchronizes a reviewing by a user of select text segments within said electronic document with presentations of related media content, including an associated video configured primarily to illustrate at least part of a primary body of text in said electronic document, wherein said automatic tracking multimedia control tracks eye scrolling movements of said user to direct changes of visual imagery, and wherein said automatic tracking multimedia control commences displaying each successive presentation of said visual imagery automatically no later than effectively simultaneous to the reviewing of each associated text segment by said user, said computer program product comprising:

a computer processor having a computer output device;

a non-transitory computer-useable storage medium having a computer-readable program embedded therein, said computer-readable program being executable by said computer processor, said computer-readable program including at least part of said automatic tracking multimedia control;

said computer program arranged to cause said computer processor to store on said non-transitory computer-useable storage medium and display on said computer output device a current presentation of said electronic document, wherein said current presentation includes at least part of said primary body of text and said associated video;

said computer program then arranged to cause said computer processor to detect an activating of said automatic tracking multimedia control to select a next segment of text within said primary body of text;

said computer program then arranged to cause said computer processor to retrieve from said non-transitory computer-useable storage medium and display on said computer output device a next presentation of said electronic document, wherein said next presentation includes displaying one or more changed components of related media content, wherein at least one of the changed components includes a continued, modified presentation of said associated video to help illustrate said next segment of text chosen from said primary body of text, wherein said continued, modified presentation of said associated video includes at least one visual enhancement, wherein said at least one visual enhancement includes at least one of zooming-in on at least one depicted subject in said associated video, zooming-out on at least one depicted subject in said associated video, appearing to move at least one associated camera toward at least one depicted subject in said associated video, appearing to move at least one associated camera away from at least one depicted subject in said associated video, and panning across at least one depicted subject in said associated video;

said computer program then arranged to cause said computer processor to detect a new activating of said automatic tracking multimedia control to select a new next segment of text within said primary body of text;

said computer program then arranged to cause said computer processor to retrieve from said non-transitory computer-useable storage medium and display on said computer output device a new next presentation of said electronic document, wherein said new next presentation includes displaying one or more changed components of related media content to help illustrate said new next segment of text chosen from said primary body of text.

19. The computer program product of claim 18, wherein said at least one visual enhancement further includes at least one of changing a visual perspective of at least one depicted subject in said associated video and visually highlighting at least one element of said associated video.

20. A computer program product for presenting an electronic document, wherein said electronic document is defined as at least one of a news story, an informational article, and an electronic book, wherein a choosing by a user of select text segments within said electronic document is synchronized through a scrolling-oriented multimedia control with presentations of related media content, including at least one digital photograph configured primarily to illustrate at least part of a primary body of text in said electronic document, and wherein said scrolling-oriented multimedia control commences displaying each successive presentation of visual imagery automatically no later than effectively simultaneous to a reading of each associated text segment by said user, said computer program product comprising:
- a computer processor having a computer output device;
- a non-transitory computer-useable storage medium having a computer-readable program embedded therein, said computer-readable program being executable by said computer processor, said computer-readable program including at least part of said scrolling-oriented multimedia control;
- said computer program arranged to cause said computer processor to store on said non-transitory computer-useable storage medium and display on said computer output device a current presentation of said electronic document, wherein said current presentation includes at least part of said primary body of text and at least one associated digital photograph;
- said computer program then arranged to cause said computer processor to detect an activating of said scrolling-oriented multimedia control to select a next segment of text within said primary body of text;
- said computer program then arranged to cause said computer processor to retrieve from said non-transitory computer-useable storage medium and display on said computer output device a next presentation of said electronic document, wherein said next presentation includes displaying one or more changed components of related media content, wherein at least one of the changed components includes a continued, modified presentation of at least one of the associated digital photographs to help illustrate said next segment of text chosen from said primary body of text, wherein said continued, modified presentation of at least one of the associated digital photographs includes at least one visual enhancement, wherein said at least one visual enhancement includes at least one of zooming-in, zooming-out, and panning across at least one depicted subject in at least one of the associated digital photographs;
- said computer program then arranged to cause said computer processor to detect a new activating of said scrolling-oriented multimedia control to select a new next segment of text within said primary body of text;
- said computer program then arranged to cause said computer processor to retrieve from said non-transitory computer-useable storage medium and display on said computer output device a new next presentation of said electronic document, wherein said new next presentation includes displaying one or more changed components of related media content to help illustrate said new next segment of text chosen from said primary body of text.

21. The computer program product of claim 20, wherein said at least one visual enhancement further includes visually highlighting at least one element in at least one of the associated digital photographs presented.

22. The computer program product of claim 20, wherein said at least one visual enhancement further includes one of increasing a display size of at least one of the associated digital photographs displayed and decreasing the display size of at least one of the associated digital photographs displayed.

23. The computer program product of claim 20, wherein the display of said next segment text and said related media content within said electronic document are accompanied by a likewise continued, modified presentation of at least one visual advertisement, wherein said likewise continued, modified presentation of said at least one visual advertisement is at least in part configured to mirror alterations in said related media content within said electronic document, and wherein said likewise continued, modified presentation of said at least one visual advertisement includes at least one of zooming-in on at least one depicted advertising subject, zooming-out on at least one depicted advertising subject, panning across at least one depicted advertising subject, and a change in camera perspective of at least one depicted advertising subject.

24. A computer program product for presenting an electronic document, wherein said electronic document is defined as at least one of a news story, an informational article, and an electronic book, wherein a scrolling-oriented multimedia control synchronizes a reviewing by a user of select text segments with presentations of related media content, including at least one holographic image configured primarily to illustrate at least part of a primary body of text in said electronic document, and wherein said scrolling-oriented multimedia control automatically commences displaying each successive presentation of holographic imagery no later than effectively simultaneous to the reviewing of each associated text segment by said user, said computer program product comprising:
- a computer processor having a computer output device;
- a non-transitory computer-useable storage medium having a computer-readable program embedded therein, said computer-readable program being executable by said computer processor, said computer-readable program including at least part of said scrolling-oriented multimedia control;
- said computer program arranged to cause said computer processor to store on said non-transitory computer-useable storage medium and display on said computer output device a current presentation of said electronic document, wherein said current presentation includes at least part of said primary body of text and at least one associated holographic image;
- said computer program then arranged to cause said computer processor to detect an activating of said scrolling-oriented multimedia control to select a next segment of text within said primary body of text;
- said computer program then arranged to cause said computer processor to retrieve from said non-transitory computer-useable storage medium and display on said computer output device a next presentation of said electronic document, wherein said next presentation includes displaying one or more changed components of related media content, wherein at least one of the changed components includes a continued, modified presentation of said at least one associated holographic image to help illustrate said next segment of text chosen within said primary body of text, wherein alteration of said at least one associated holographic image includes at least one visual enhancement, wherein said at least one visual enhancement includes at least one of zooming-in on at least one holographically depicted subject, zooming-out on at least one holographically depicted subject, panning across at least one holographically depicted subject, and chancing at least one camera's perspective of at least one holographically depicted subject;

said computer program then arranged to cause said computer processor to detect a new activating of said scrolling-oriented multimedia control to select a new next segment of text within said primary body of text;

said computer program then arranged to cause said computer processor to retrieve from said non-transitory computer-useable storage medium and display on said computer output device a new next presentation of said electronic document, wherein said new next presentation includes displaying one or more changed components of related media content to help illustrate said new next segment of text chosen within said primary body of text.

25. The computer program product of claim 24, wherein the at least one visual enhancement further includes at least one of enlarging a size of at least one associated holographic image displayed and decreasing the size of at least one associated holographic image displayed.

26. The computer program product of claim 24, wherein the at least one visual enhancement further includes visually highlighting at least one element of at least one associated holographic image.

27. A computer program product for presenting an electronic document, wherein said electronic document is defined as at least one of a news story, an informational article, and an electronic book, wherein a choosing by a user of select text within said electronic document is synchronized through a scrolling-oriented multimedia control with a related media content presentation, including at least one visual image configured primarily to illustrate at least part of a primary body of text in said electronic document, wherein said scrolling-oriented multimedia control automatically commences displaying each successive presentation of visual imagery no later than effectively simultaneous to a reading of each associated text segment by said user, and wherein a rate of speed reviewing select text by said user modifies the presentation of said at least one visual image, said computer program product comprising:

a computer processor having a computer output device;

a non-transitory computer-useable storage medium having a computer-readable program embedded therein, said computer-readable program being executable by said computer processor, said computer-readable program including at least part of said scrolling-oriented multimedia control;

said computer program arranged to cause said computer processor to store on said non-transitory computer-useable storage medium and display on said computer output device a current presentation of said electronic document, wherein said current presentation includes at least part of said primary body of text and at least one associated visual image;

said computer program then arranged to cause said computer processor to detect an activating of said scrolling-oriented multimedia control to select a next segment of text within said primary body of text;

said computer program then arranged to cause said computer processor to retrieve from said non-transitory computer-useable storage medium and display on said computer output device a next presentation of said electronic document, wherein said next presentation includes displaying one or more changed components of related media content, wherein at least one of the changed components includes a continued, modified presentation of said at least one associated visual image, with said continued, modified presentation configured primarily to help illustrate said next segment of text chosen within said primary body of text, wherein said at least one associated visual image is at least one of a video and a digital photograph, wherein said at least one associated visual image is modified based on said rate of speed reviewing said next segment of text by said user, and wherein alteration of said at least one associated visual image includes at least one of a zooming-in on at least one depicted subject, a zooming-out on at least one depicted subject, and a panning across at least one depicted subject;

said computer program then arranged to cause said computer processor to detect a new activating of said scrolling-oriented multimedia control to select a new next segment of text within said primary body of text;

said computer program then arranged to cause said computer processor to retrieve from said non-transitory computer-useable storage medium and display on said computer output device a new next presentation of said electronic document, wherein said new next presentation includes displaying one or more changed components of related media content to help illustrate said new next segment of text chosen within said primary body of text.

28. The computer program product of claim 27, wherein at least one of a speed and an extent of at least one of said zooming-in on at least one depicted subject and said zooming-out on at least one depicted subject changes based on the rate of speed by said user to read at least one associated text segment.

29. The computer program product of claim 27, wherein at least one of a speed and an extent of said panning across at least one depicted subject changes based on the rate of speed by said user to read at least one associated text segment.

30. The computer program product of claim 27, wherein at least one of zooming and panning is activated as a result of a detection of a predetermined reading speed for said user.

31. A computer-implemented method for presenting on a computer output device a financial news story, wherein said financial news story includes a main text body, wherein an automatic tracking multimedia control is implemented to synchronize a reviewing by a user of select text segments within said main text body of said financial news story to presentations of related media content, including at least one financial graphic configured primarily to illustrate at least part of said main text body in said financial news story, wherein said automatic tracking multimedia control tracks eye scrolling movements of said user to direct changes of said at least one financial graphic, and wherein said automatic tracking multimedia control automatically commences displaying each successive presentation of said at least one financial graphic no later than effectively simultaneous to the reviewing of each associated text segment by said user, said computer-implemented method comprising:

displaying on said computer output device a current presentation of said financial news story that is retrieved from a non-transitory computer-useable storage medium, wherein said current presentation includes at least part of said main text body, a related financial graphic, and at least part of said automatic tracking multimedia control;

detecting through a computer processor a choosing of a select segment of text within said main text body by said automatic tracking multimedia control;

performing through said computer processor an operation, said operation responsive to said detecting of the choosing of said select segment of text by said automatic tracking multimedia control, said operation causing a next presentation to be retrieved from said non-transitory computer-useable storage medium, wherein said next presentation includes displaying at least one changed component of related media content, wherein at least one of the changed components includes a continued, modified presentation of said related financial graphic on said computer output device;

displaying on said computer output device said next presentation that includes said at least one changed component of related media content, wherein said at least one of the changed components includes said continued, modified presentation of said related financial graphic to help illustrate said select segment of text, wherein said related financial graphic includes one or more securities charts, and wherein a predetermined portion of at least one of said one or more securities charts is visually modified when said current presentation is replaced by said next presentation;

detecting through said computer processor a choosing of a next select segment of text within said main text body by said automatic tracking multimedia control;

performing through said computer processor a new operation, said new operation responsive to said detecting of the choosing of said next select segment of text by said automatic tracking multimedia control, said new operation causing a new next presentation to be retrieved from said non-transitory computer-useable storage medium, wherein said new next presentation includes displaying at least one newly changed component of related media content, wherein at least one of the newly changed components includes a changed financial graphic that helps to illustrate said next select segment of text;

displaying on said computer output device said new next presentation that includes said at least one newly changed component of related media content, wherein said at least one of the newly changed components is said changed financial graphic that helps to illustrate said next select segment of text.

32. The computer-implemented method of claim 31, wherein said predetermined portion of at least one of said one or more securities charts is visually modified by at least one of adding at least one technical indicator, removing at least one technical indicator, changing at least one technical indicator, adding at least one trendline, removing at least one trendline, changing at least one trendline, adding visual price data, and removing visual price data.

33. A computer program product for presenting an electronic document, wherein said electronic document is defined as at least one of a news story, an informational article, and an electronic book, wherein a choosing by a user of select text segments to review within said electronic document is synchronized through an automatic tracking multimedia control with presentations of related media content, including at least one digital photograph configured primarily to illustrate at least part of a primary body of text in said electronic document, wherein said automatic tracking multimedia control tracks eye scrolling movements of said user to direct changes of visual imagery, and wherein said automatic tracking multimedia control commences displaying each successive presentation of said visual imagery automatically no later than effectively simultaneous to the reviewing of each associated text segment by said user, said computer program product comprising:

a computer processor having a computer output device;

a non-transitory computer-useable storage medium having a computer-readable program embedded therein, said computer-readable program being executable by said computer processor, said computer-readable program including at least part of said automatic tracking multimedia control;

said computer program arranged to cause said computer processor to store on said non-transitory computer-useable storage medium and display on said computer output device a current presentation of said electronic document, wherein said current presentation includes at least part of said primary body of text and at least one associated digital photograph;

said computer program then arranged to cause said computer processor to detect an activating of said automatic tracking multimedia control to select a next segment of text within said primary body of text;

said computer program then arranged to cause said computer processor to retrieve from said non-transitory computer-useable storage medium and display on said computer output device a next presentation of said electronic document, wherein said next presentation includes displaying one or more changed components of related media content, wherein at least one of the changed components includes a continued, modified presentation of at least one of the associated digital photographs to help illustrate presentation of said next segment of text chosen from said primary body of text, wherein said continued, modified presentation of at least one of the associated digital photographs includes at least one visual enhancement, wherein said at least one visual enhancement includes at least one of zooming-in, zooming-out, and panning across at least one depicted subject in at least one of the associated digital photographs;

said computer program then arranged to cause said computer processor to detect a new activating of said automatic tracking multimedia control to select a new next segment of text within said primary body of text;

said computer program then arranged to cause said computer processor to retrieve from said non-transitory computer-useable storage medium and display on said computer output device a new next presentation of said electronic document, wherein said new next presentation includes displaying one or more changed components of related media content to help illustrate said new next segment of text chosen from said primary body of text.

34. The computer program product of claim 33, wherein said at least one visual enhancement further includes visually highlighting at least one element in at least one of the associated digital photographs presented.

35. The computer program product of claim 33, wherein at least one of a speed and an extent of at least one of said zooming-in and said zooming-out is changed based on a reading speed by said user for at least one associated text segment.

36. The computer program product of claim 33, wherein at least one of a speed and an extent of said panning across at least one depicted subject in at least one of the associated digital photographs is changed based on a reading speed by said user for at least one associated text segment.

* * * * *

UNITED STATES PATENT AND TRADEMARK OFFICE
CERTIFICATE OF CORRECTION

| | | |
|---|---|---|
| PATENT NO. | : 8,739,019 B1 | |
| APPLICATION NO. | : 13/135399 | |
| DATED | : May 27, 2014 | |
| INVENTOR(S) | : Joel Nevins | |

It is certified that error appears in the above-identified patent and that said Letters Patent is hereby corrected as shown below:

In the Claims

Claim 1, column 31, line 55, between the words "with" and "of", delete "a presentation" and insert --presentations--.

Claim 15, column 37, line 53, at the end of the line delete "said of".

Claim 17, column 37, line 62, between the words "segment" and "text", insert --of--.

Claim 17, column 37, line 63, between the words "document" and "accompanied", delete "are" and insert --is--.

Claim 23, column 40, line 20, between the words "segment" and "text", insert --of--.

Claim 23, column 40, line 21, between the words "document" and "accompanied", delete "are" and insert --is--.

Claim 24, column 41, line 15, between the words "and" and "at least", delete "chancing" and insert --changing--.

Claim 33, column 44, line 42, between the words "illustrate" and "said", delete "presentation of". (Please note that, in the published patent document, the line numbers in column 44 are slightly off, and line 42 appears to be line 43.)

Signed and Sealed this
Twenty-second Day of July, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,739,019 B1 | Page 1 of 1 |
| APPLICATION NO. | : 13/135399 | |
| DATED | : May 27, 2014 | |
| INVENTOR(S) | : Joel Nevins | |

It is certified that error appears in the above-identified patent and that said Letters Patent is hereby corrected as shown below:

In the Specification

Column 1, line 11, cancel the text beginning with "Copyright Notice" to and ending "Dec. 2, 2010." in column 1, line 29.

Column 1, line 11 to line 29, insert the following replacement text in the order shown below:

--PRIORITY CLAIMS
This patent claims the benefit of provisional patent application US 61/400,152, filed on July 24, 2010. This patent further claims the benefit of provisional patent application US 61/404,994 filed on October 13, 2010.

COPYRIGHT NOTICE
A portion of the disclosure of this patent document contains material which is subject to copyright protection. The copyright owner has no objection to the facsimile reproduction by anyone of the patent disclosure, as it appears in the Patent and Trademark Office files or records, but otherwise reserves all copyrights whatsoever.--.

Signed and Sealed this
Sixteenth Day of December, 2014

Michelle K. Lee
*Deputy Director of the United States Patent and Trademark Office*